US012793182B2

(12) United States Patent
Houben et al.

(10) Patent No.: US 12,793,182 B2
(45) Date of Patent: Nov. 10, 2026

(54) METHOD AND SYSTEM OF IMAGE ANALYSIS AND CRITICAL DIMENSION MATCHING FOR CHARGED-PARTICLE INSPECTION APPARATUS

(71) Applicant: ASML Netherlands B.V., Veldhoven (NL)

(72) Inventors: Tim Houben, Eindhoven (NL); Maxim Pisarenco, Son en Breugel (NL); Thomas Jarik Huisman, Eindhoven (NL); Lingling Pu, San Jose, CA (US); Jian Zhou, San Jose, CA (US); Liangjiang Yu, Pleasanton, CA (US); Yi-Hsin Chang, Milpitas, CA (US); Yun-Ling Yeh, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 356 days.

(21) Appl. No.: 18/708,929

(22) PCT Filed: Oct. 14, 2022

(86) PCT No.: PCT/EP2022/078619

§ 371 (c)(1),
(2) Date: May 9, 2024

(87) PCT Pub. No.: WO2023/083559

PCT Pub. Date: May 19, 2023

(65) Prior Publication Data

US 2025/0003899 A1 Jan. 2, 2025

Related U.S. Application Data

(60) Provisional application No. 63/317,453, filed on Mar. 7, 2022, provisional application No. 63/279,060, filed on Nov. 12, 2021.

(51) Int. Cl.
*G06T 5/60* (2024.01)
*G01N 23/2251* (2018.01)
*G06T 7/00* (2017.01)

(52) U.S. Cl.
CPC .......... *G06T 5/60* (2024.01); *G01N 23/2251* (2013.01); *G06T 7/001* (2013.01);
(Continued)

(58) Field of Classification Search
CPC ...................... G06T 5/60; G06T 7/001; G06T 2207/10061; G06T 2207/20081;
(Continued)

(56) References Cited

FOREIGN PATENT DOCUMENTS

| | | | |
|---|---|---|---|
| EP | 4020085 | A1 | 6/2022 |
| WO | 2017117568 | A1 | 7/2017 |
| WO | 2022128373 | A1 | 6/2022 |

OTHER PUBLICATIONS

Boyuan, et al ("Data augmentation in microscopic images for material data mining" arxiv.org, Cornell University Library, 201 Olin Library Cornell University Ithaca, NY 14853, May 12, 2019) (Year: 2019).*

(Continued)

*Primary Examiner* — Michael Maskell
(74) *Attorney, Agent, or Firm* — Finnegan, Henderson, Farabow, Garrett & Dunner LLP

(57) ABSTRACT

Systems and methods for image analysis include obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference
(Continued)

100 between first intensity gradients of the plurality of simulation images and second intensity gradients of the plurality of non-simulation images.

20 Claims, 23 Drawing Sheets

(52) U.S. Cl.
CPC .................. *G01N 2223/401* (2013.01); *G06T 2207/10061* (2013.01); *G06T 2207/20081* (2013.01); *G06T 2207/20084* (2013.01); *G06T 2207/30148* (2013.01)

(58) Field of Classification Search
CPC G06T 2207/20084; G06T 2207/30148; G01N 23/2251; G01N 2223/401
USPC ................................ 250/306, 307, 310, 311
See application file for complete search history.

(56) References Cited

OTHER PUBLICATIONS

PCT International Search Report, corresponding with a PCT Application No. PCT/EP2022/077738, mailed on Mar. 1, 2023. (3 pages).
Zhu et al., "Unpaired image-to-image translation using cycle-consistent adversarial networks", in proceedings of the IEEE international Conference on Computer Vision, Mar. 2017, pp. 2223-2232.
Zhao et al., "Unpaired Image-to-Image Translation using Adversarial Consistency Loss", Hyperplane Lab, CFCS, Computer Science Dept., Peking University, Peng Cheng Lab, https://arxiv.org/abs/2003.04858v7, Jan. 18, 2021 (18 pages).
Liu et al., "Unsupervised Image-to-Image Translation Networks", NVIDIA, https://arxiv.org/abs/1703.00848, Jul. 23, 2018 (11 pages).
Atapour-Abarghouei et al., "Real-Time Monocular Depth Estimation using Synthetic Data with Domain Adaptation via Image Style Transfer" 2018 IEEE/CVF Conference on Computer Vision and Pattern Recognition, https://ieeexplore.ieee.org/stamp/stamp.jsp?tp=&arnumber=8578394 (11 pages).
Ma et al., "Data augmentation in microscopic images for material data mining", arxiv.org, Cornell University Library, 201 Olin Library Cornell University Ithaca, NY 14853, May 12, 2019, XP081510428 (17 pages).
Luo et al., "Deep Wavelet Network with Domain Adaptation for Single Image Demoireing", 2020 IEEE/CVF Conference on Computer Vision and Pattern Recognition Workshop (CVPRW), IEEE, 14 Jun. 14, 2020, pp. 1687-1694, XP033798973, DOI: 10.1109/CVPRW50498.2020.00218, [retrieved on Jul. 27, 2020] (8 pages).

* cited by examiner

500

1601

1701

METHOD AND SYSTEM OF IMAGE ANALYSIS AND CRITICAL DIMENSION MATCHING FOR CHARGED-PARTICLE INSPECTION APPARATUS

CROSS-REFERENCE TO RELATED APPLICATIONS

This application claims priority to International Application No. PCT/EP2022/078619 which was filed 14 Oct. 2022, and published as WO 2023083559 A1, which claims priority of U.S. application 63/279,060, which was filed on 12 Nov. 2021, and of U.S. application 63/317,453, which was filed on 7 Mar. 2022. The contents of these applications are incorporated herein by reference in their entireties.

FIELD

The description herein relates to the field of image inspection apparatus, and more particularly to calibration between simulation images and non-simulation images, calibration between metrology measurements, and calibration of topological information.

BACKGROUND

An image inspection apparatus (e.g., a charged-particle beam apparatus or an optical beam apparatus) is able to produce a two-dimensional (2D) image of a wafer substrate by detecting particles (e.g., photons, secondary electrons, backscattered electrons, mirror electrons, or other kinds of electrons) from a surface of a wafer substrate upon impingement by a beam (e.g., a charged-particle beam or an optical beam) generated by a source associated with the inspection apparatus. Various image inspection apparatuses are used on semiconductor wafers in semiconductor industry for various purposes such as wafer processing (e.g., e-beam direct write lithography system), process monitoring (e.g., critical dimension scanning electron microscope (CD-SEM)), wafer inspection (e.g., e-beam inspection system), or defect analysis (e.g., defect review SEM, or say DR-SEM and Focused Ion Beam system, or say FIB).

To control quality of a manufactured structures on the wafer substrate, the 2D image of the wafer substrate may be analyzed to detect potential defects in the wafer substrate. In some applications, the 2D image may be compared with a simulation image. The simulation image may be generated by a simulation technique configured to simulate an image measured by the image inspection apparatus. In some applications, 2D geometric features (e.g., edges) or three-dimensional (3D) geometric features may be extracted from the 2D image based on the simulation image. The quality of the simulation image may be an important factor for performance and accuracy of those applications.

SUMMARY

Embodiments of the present disclosure provide systems and methods for image analysis. In some embodiments, a method for image analysis may include obtaining a plurality of simulation images and a plurality of non-simulation images both associated with a sample under inspection, at least one of the plurality of simulation images being a simulation image of a location on the sample not imaged by any of the plurality of non-simulation images. The method may also include training an unsupervised domain adaptation technique using the plurality of simulation images and the plurality of non-simulation images as inputs to reduce a difference between first intensity gradients of the plurality of simulation images and second intensity gradients of the plurality of non-simulation images.

In some embodiments, a system may include an image inspection apparatus configured to scan a sample and generate a non-simulation image of the sample, and a controller including circuitry. The controller may be configured for obtaining a plurality of simulation images and a plurality of non-simulation images both associated with a sample under inspection, at least one of the plurality of simulation images being a simulation image of a location on the sample not imaged by any of the plurality of non-simulation images. The controller may also be configured for training an unsupervised domain adaptation technique using the plurality of simulation images and the plurality of non-simulation images as inputs to reduce a difference between first intensity gradients of the plurality of simulation images and second intensity gradients of the plurality of non-simulation images.

In some embodiments, a non-transitory computer-readable medium may store a set of instructions that is executable by at least one processor of an apparatus to cause the apparatus to perform a method. The method may include obtaining a plurality of simulation images and a plurality of non-simulation images both associated with a sample under inspection, at least one of the plurality of simulation images being a simulation image of a location on the sample not imaged by any of the plurality of non-simulation images. The method may also include training an unsupervised domain adaptation technique using the plurality of simulation images and the plurality of non-simulation images as inputs to reduce a difference between first intensity gradients of the plurality of simulation images and second intensity gradients of the plurality of non-simulation images.

In some embodiments, a method of critical dimension matching for a charged-particle inspection apparatus may include obtaining a set of reference inspection images for regions on a sample, each of the set of reference inspection images being associated with one of the regions. The method may also include generating a set of inspection images of the sample using the charged-particle inspection apparatus to inspect the regions on the sample. The method may further include determining, based on the set of inspection images, a first set of inspection images for training a machine learning model and a second set of inspection images. The method may further include training the machine learning model using the set of reference inspection images and the first set of inspection images as inputs, wherein the machine learning model is configured to receive an inspection image and output a predicted image, and the predicted image includes a first image feature existing in the set of reference inspection images and a second image feature existing in the set of inspection images.

In some embodiments, a system may include an image inspection apparatus configured to scan a sample and generate an inspection image of the sample, and a controller including circuitry. The controller may be configured for obtaining a set of reference inspection images for regions on a sample, each of the set of reference inspection images being associated with one of the regions. The controller may also be configured for generating a set of inspection images of the sample using the charged-particle inspection apparatus to inspect the regions on the sample. The controller may further be configured for determining, based on the set of inspection images, a first set of inspection images for training a machine learning model and a second set of inspection images. The controller may further be configured for training the machine learning model using the set of reference inspection images and the first set of inspection images as inputs, wherein the machine learning model is configured to receive an inspection image and output a predicted image, and the predicted image includes a first image feature existing in the set of reference inspection images and a second image feature existing in the set of inspection images.

In some embodiments, a non-transitory computer-readable medium may store a set of instructions that is executable by at least one processor of an apparatus to cause the apparatus to perform a method. The method may include obtaining a set of reference inspection images for regions on a sample, each of the set of reference inspection images being associated with one of the regions. The method may also include generating a set of inspection images of the sample using the charged-particle inspection apparatus to inspect the regions on the sample. The method may further include determining, based on the set of inspection images, a first set of inspection images for training a machine learning model and a second set of inspection images. The method may further include training the machine learning model using the set of reference inspection images and the first set of inspection images as inputs, wherein the machine learning model is configured to receive an inspection image and output a predicted image, and the predicted image includes a first image feature existing in the set of reference inspection images and a second image feature existing in the set of inspection images.

In some embodiments, a method may include generating an inspection image using a charged-particle inspection apparatus to inspect a region on a sample. The method may also include generating, using a machine learning model, a predicted image using the inspection image as an input. The method may further include determining a metrology characteristic in the region based on the predicted image.

In some embodiments, a system may include a charged-particle inspection apparatus configured to scan a sample, and a controller including circuitry. The controller may be configured for generating an inspection image using the charged-particle inspection apparatus to inspect a region on the sample. The controller may also be configured for generating, using a machine learning model, a predicted image using the inspection image as an input. The controller may further be configured for determining a metrology characteristic in the region based on the predicted image.

In some embodiments, a non-transitory computer-readable medium may store a set of instructions that is executable by at least one processor of an apparatus to cause the apparatus to perform a method. The method may include generating an inspection image using a charged-particle inspection apparatus to inspect a region on a sample. The method may also include generating, using a machine learning model, a predicted image using the inspection image as an input. The method may further include determining a metrology characteristic in the region based on the predicted image.

In some embodiments, a method may include training an unsupervised domain adaptation technique using a first set of simulation images and a first set of non-simulation images, training a first surface estimation model using a second set of simulation images and a set of surface maps corresponding to the second set of simulation images, using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model, calibrating the generated surface estimation data based on observed data corresponding to the input non-simulation image, and training a second surface estimation model using the input non-simulation image and the calibrated surface estimation data.

In some embodiments, a system may include a charged-particle inspection apparatus configured to scan a sample, and a controller including circuitry. The controller may be configured for training an unsupervised domain adaptation technique using a first set of simulation images and a first set of non-simulation images, training a first surface estimation model using a second set of simulation images and a set of surface maps corresponding to the second set of simulation images, using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model, calibrating the generated surface estimation data based on observed data corresponding to the input non-simulation image, and training a second surface estimation model using the input non-simulation image and the calibrated surface estimation data.

In some embodiments, a non-transitory computer-readable medium may store a set of instructions that is executable by at least one processor of an apparatus to cause the apparatus to perform a method. The method may include training an unsupervised domain adaptation technique using a first set of simulation images and a first set of non-simulation images, training a first surface estimation model using a second set of simulation images and a set of surface maps corresponding to the second set of simulation images, using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model, calibrating the generated surface estimation data based on observed data corresponding to the input non-simulation image, and training a second surface estimation model using the input non-simulation image and the calibrated surface estimation data.

In some embodiments, a method may include obtaining an inspection image of a sample generated by a charged-particle inspection apparatus; and generating, using a second surface estimation model using the inspection image as an input, surface estimation data of the sample. The second surface estimation model may be pretrained by: using an unsupervised domain adaptation technique to generate a domain-adapted image by inputting an input non-simulation image to the domain adaptation technique, and using a first surface estimation model to generate surface estimation data by inputting the domain-adapted image to the first surface estimation model; calibrating the generated surface estimation data based on observed data corresponding to the input non-simulation image; and training the second surface estimation model using the input non-simulation image and the calibrated surface estimation data.

In some embodiments, a system may include a charged-particle inspection apparatus configured to scan a sample, and a controller including circuitry. The controller may be configured for obtaining an inspection image of a sample generated by a charged-particle inspection apparatus; and generating, using a second surface estimation model using the inspection image as an input, surface estimation data of the sample. The second surface estimation model may be pretrained by: using an unsupervised domain adaptation technique to generate a domain-adapted image by inputting an input non-simulation image to the domain adaptation technique, and using a first surface estimation model to generate surface estimation data by inputting the domain-adapted image to the first surface estimation model; calibrating the generated surface estimation data based on observed data corresponding to the input non-simulation image; and training the second surface estimation model using the input non-simulation image and the calibrated surface estimation data.

In some embodiments, a non-transitory computer-readable medium may store a set of instructions that is executable by at least one processor of an apparatus to cause the apparatus to perform a method. The method may include obtaining an inspection image of a sample generated by a charged-particle inspection apparatus; and generating, using a second surface estimation model using the inspection image as an input, surface estimation data of the sample. The second surface estimation model may be pretrained by: using an unsupervised domain adaptation technique to generate a domain-adapted image by inputting an input non-simulation image to the domain adaptation technique, and using a first surface estimation model to generate surface estimation data by inputting the domain-adapted image to the first surface estimation model; calibrating the generated surface estimation data based on observed data corresponding to the input non-simulation image; and training the second surface estimation model using the input non-simulation image and the calibrated surface estimation data.

DETAILED DESCRIPTION

Figure 1:
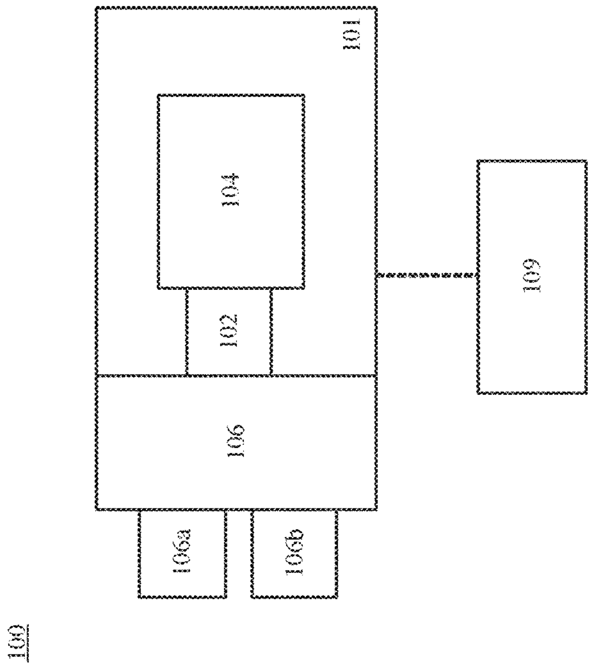
FIG. 1 is a schematic diagram illustrating an example charged-particle beam inspection (CPBI) system, consistent with some embodiments of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the subject matter recited in the appended claims. Without limiting the scope of the present disclosure, some embodiments may be described in the context of providing detection systems and detection methods in systems utilizing electron beams ("e-beams"). However, the disclosure is not so limited. Other types of charged-particle beams (e.g., including protons, ions, muons, or any other particle carrying electric charges) may be similarly applied. Furthermore, systems and methods for detection may be used in other imaging systems, such as optical imaging, photon detection, x-ray detection, ion detection, or the like.

Electronic devices are constructed of circuits formed on a piece of semiconductor material called a substrate. The semiconductor material may include, for example, silicon, gallium arsenide, indium phosphide, or silicon germanium, or the like. Many circuits may be formed together on the same piece of silicon and are called integrated circuits or ICs. The size of these circuits has decreased dramatically so that many more of them may be fit on the substrate. For example, an IC chip in a smartphone may be as small as a thumbnail and yet may include over 2 billion transistors, the size of each transistor being less than 1/1000th the size of a human hair.

Making these ICs with extremely small structures or components is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process; that is, to improve the overall yield of the process.

One component of improving yield is monitoring the chip-making process to ensure that it is producing a sufficient number of functional integrated circuits. One way to monitor the process is to inspect the chip circuit structures at various stages of their formation. Inspection may be carried out using a scanning charged-particle microscope ("SCPM"). For example, an SCPM may be a scanning electron microscope (SEM). A SCPM may be used to image these extremely small structures, in effect, taking a "picture" of the structures of the wafer. The image may be used to determine if the structure was formed properly in the proper location. If the structure is defective, then the process may be adjusted, so the defect is less likely to recur.

The working principle of a SCPM (e.g., a SEM) is similar to a camera. A camera takes a picture by receiving and recording intensity of light reflected or emitted from people or objects. An SCPM takes a "picture" by receiving and recording energies or quantities of charged particles (e.g., electrons) reflected or emitted from the structures of the wafer. Typically, the structures are made on a substrate (e.g., a silicon substrate) that is placed on a platform, referred to as a stage, for imaging. Before taking such a "picture." a charged-particle beam may be projected onto the structures, and when the charged particles are reflected or emitted ("exiting") from the structures (e.g., from the wafer surface, from the structures underneath the wafer surface, or both), a detector of the SCPM may receive and record the energies or quantities of those charged particles to generate an inspection image. To take such a "picture." the charged-particle beam may scan through the wafer (e.g., in a line-by-line or zig-zag manner), and the detector may receive exiting charged particles coming from a region under charged particle-beam projection (referred to as a "beam spot"). The detector may receive and record exiting charged particles from each beam spot one at a time and join the information recorded for all the beam spots to generate the inspection image. Some SCPMs use a single charged-particle beam (referred to as a "single-beam SCPM," such as a single-beam SEM) to take a single "picture" to generate the inspection image, while some SCPMs use multiple charged-particle beams (referred to as a "multi-beam SCPM." such as a multi-beam SEM) to take multiple "sub-pictures" of the wafer in parallel and stitch them together to generate the inspection image. By using multiple charged-particle beams, the SEM may provide more charged-particle beams onto the structures for obtaining these multiple "sub-pictures." resulting in more charged particles exiting from the structures. Accordingly, the detector may receive more exiting charged particles simultaneously and generate inspection images of the structures of the wafer with higher efficiency and faster speed.

To control quality of the manufactured semiconductor structures, various inspection techniques may be used to detect potential defects in the structures. In some embodiments, an inspection image (e.g., a non-simulated, actually measured SEM image) may be compared with a simulation image (e.g., a simulated SEM image) corresponding to the inspection image. The simulation image may be generated by a simulation technique for simulating graphical representations of inspection images measured by the image inspection apparatus. For example, the simulation technique may include a Monte-Carlo based simulation for ray-tracing of individual charged particles (e.g., electrons). The simulation image may also be used to benchmark various image analysis techniques or algorithms. Such image analysis techniques or algorithms may be used to detect potential defects in the manufactured structures, to extract 2D geometric features of the manufactured structures (e.g., feature edge positions) from the inspection image, or to extract or reconstruct 3D geometric features (e.g., a height profile map) of the manufactured structures from the inspection image.

Unlike actually measured experimental SEM images, an advantage of using simulation images for the above-described application scenarios is that exact geometric features or profiles in the simulation images are known, which may provide a more accurate benchmark for the image analysis techniques or algorithms. Another advantage of using simulation images is that they enable systematic uncertainty studies. For example, to study a contributing factor to a systematic uncertainty of a scanning charged-particle microscope, other contributing factors should be fixed such that and the contributing factor under study may be varied independently. For actually measured, experimental inspection images, it may be challenging to change a single contributing factor (e.g., a geometric feature of the inspected structure) independently without changing other contributing factors (e.g., a current of a primary charged-particle beam or a spot size of the primary charged-particle beam). In contrast, simulation images enable such independent variations of a single contributing factor in the systematic uncertainty studies.

Embodiments of the present disclosure may provide methods, apparatuses, and systems for image generation and analysis. In some disclosed embodiments, a cycle-consistent unsupervised machine learning model may be trained using multiple simulation images and multiple inspection images as inputs. The simulation images and inspection images may include similar pattern geometries. At least one of the simulation images is not a simulation of any of the inspection images. After training the cycle-consistent unsupervised machine learning model, it may be used to generate a first domain-adapted image by inputting an inspection image to the cycle-consistent unsupervised machine learning model or to generate a second domain-adapted inspection image by inputting a simulation image to the cycle-consistent unsupervised machine learning model. Compared with the discrepancies between a conventional simulation image and a conventional inspection image, the discrepancies between the first domain-adapted image and the inspection image and the discrepancies between the second domain-adapted inspection image and the simulation image may be greatly reduced.

Further, metrology of the manufactured semiconductor structures may include measurement of metrology characteristics. For example, the metrology characteristics may include a critical dimension, an edge placement error, an overlap between structure elements (e.g., an overlap between an edge of a contact and a metal extending beyond the edge of the contact from above or below), or the like. A critical dimension, as used herein, may refer to a minimum feature size in the manufactured semiconductor structures. For example, a critical dimension may be twice of a half pitch of the manufactured semiconductor structures. The critical dimension may be measured based on an inspection image (e.g., a SEM image). Consistent and robust critical dimension measurements may be an important factor for manufacturing process monitoring and improvement. One task in critical dimension measurements is to perform critical dimension matching between different inspection apparatuses or between an inspection apparatus and a process of record ("POR"). A process of record, as used herein, may refer to a system or data records with specified operations or procedures for a semiconductor wafer to process through. For example, a process of record may include an inspection apparatus, a process recipe, parameters associated with each operation of the inspection apparatus, or any other data for configuring the specified operations or procedures. Critical dimension matching, as used herein, may refer to operations for uniformizing or calibrating critical dimension measurement results generated across different inspection apparatuses or between an inspection apparatus and a POR. A difference between two different critical dimension measurement results or a difference between a critical dimension measurement result and a process of record may be referred to as a critical dimension delta in this disclosure. The critical dimension measurement delta may be caused by deviations or discrepancies existing between inspection images generated across different inspection apparatuses (or between an inspection image generated by an inspection apparatus and an inspection image in a POR). Some of the deviations or discrepancies may be caused by difference in metrology properties or performance capabilities between different inspection apparatuses. Some of the deviations or discrepancies may be caused by operations or environment of a metrology process. A large critical dimension measurement delta may be used as an indicator of inconsistent performance of an inspection apparatus, and may further cause difficulty in evaluating its performance expectation.

Typically, by uniformizing parameters, algorithms, and operations between different inspection apparatuses or between an inspection apparatus and a POR, such deviations or discrepancies existing between the inspection images may be reduced. In some situations, some deviations or discrepancies may still exist between the different inspection apparatuses or between the inspection apparatus and the process of record even if the parameters (e.g., charged-particle beam doses), algorithms (e.g., critical dimension measurement algorithms), and operations are uniformized. Such remaining deviations or discrepancies may be caused by operations or environment of a metrology process rather than the difference in metrology properties or performance capabilities between different inspection apparatuses.

To remove the deviations or discrepancies not caused by the difference in metrology properties or performance capabilities between different inspection apparatuses and to reduce critical dimension measurement delta, various existing image processing techniques may be used to process the inspection images before performing the critical dimension matching. For example, a histogram matching technique may be used to process the inspection images, which may directly map a gray level histogram of an inspection apparatus to a process of record for reducing deviations in image characteristics. The histogram matching technique may reduce contrast discrepancies and critical dimension measurement differences in the inspection images. However, several challenges exist in the conventional image processing techniques (e.g., the histogram matching technique) for critical dimension matching. For example, the conventional image processing techniques may only be capable of processing a limited number of image features, which may prevent further reducing the critical dimension measurement delta to a lower level (e.g., lower than one nanometer).

Embodiments of the present disclosure may provide methods, apparatuses, and systems for critical dimension matching for a charged-particle inspection apparatus. In some disclosed embodiments, a machine learning model may be trained for converting an inputted inspection image to a predicted image, where artifacts in the inspection image that reduce image quality, such as charging effects, may be reduced in the predicted image, enabling improved accuracy of critical dimensions determined based on the predicated image as compared to critical dimensions determined based on the inspection image. The predicted image may include image features of the inputted inspection image and image features of a reference inspection image (e.g., provided by another charged-particle inspection apparatus, generated by the same charged-particle inspection apparatus at a previous time, or generated using a POR). The critical dimension matching may be performed based on the predicted image and the reference inspection image. Compared with conventional techniques, the predicted image may be more similar to the reference inspection image while maintaining essential image features of the inputted inspection image. By doing so, more image features may be processed, and thus the deviations or discrepancies not caused by the difference in metrology properties or performance capabilities between different inspection apparatuses may be reduced. In some cases, with the disclosed technical solutions applied, the critical dimension measurement delta (e.g., a mean absolute error of critical dimension measurements) may be reduced by over 60%. Compared with the conventional histogram matching technique, the disclosed technical solutions may reduce the critical dimension measurement delta to a sub-nanometer level.

While the unsupervised domain adaptation technique can be trained to learn a mapping between two different domains without paired data for translating inputted data from a source domain to a target domain, accuracy of the learned mapping is not guaranteed. For example, valuable topological information could be lost when converting inputted data from a source domain to a target domain. For example, height information of an inspection image may be lost when the inspection image is converted to a domain-adapted image (e.g., looking like a simulation image) as some height information may be entangled with physical effects (e.g., a charging effect or edge blooming) that are removed when translating the inspection image to a domain-adapted image by the unsupervised domain adaptation technique.

According to some embodiments of the present disclosure, a trained unsupervised domain adaptation technique can be utilized in training a machine learning model for performing subsequent tasks such as height prediction, surface prediction, side wall angle prediction, semantic segmentation, contour detection, etc. According to some embodiments of the present disclosure, topological information lost when converting an inspection image to a domain-adapted image by the unsupervised domain adaptation technique can be compensated when training a machine learning model for performing subsequent tasks. According to some embodiments of the present disclosure, a neural network configured to receive an inspection image as an input and configured to generate surface estimation data corresponding to the input inspection image can be trained based on the unsupervised domain adaptation technique without topological information loss.

Relative dimensions of components in drawings may be exaggerated for clarity. Within the following description of drawings, the same or like reference numbers refer to the same or like components or entities, and only the differences with respect to the individual embodiments are described.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an exemplary charged-particle beam inspection (CPBI) system 100 consistent with some embodiments of the present disclosure. CPBI system 100 may be used for imaging. For example, CPBI system 100 may use an electron beam for imaging. As shown in FIG. 1, CPBI system 100 includes a main chamber 101, a load/lock chamber 102, a beam tool 104, and an equipment front end module (EFEM) 106. Beam tool 104 is located within main chamber 101. EFEM 106 includes a first loading port **106*a* and a second loading port 106*b*. EFEM 106 may include additional loading port(s). First loading port 106*a* and second loading port 106*b*** receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by beam tool 104. Beam tool 104 may be a single-beam system or a multi-beam system.

A controller 109 is electronically connected to beam tool 104. Controller 109 may be a computer that may execute various controls of CPBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

Figure 2:
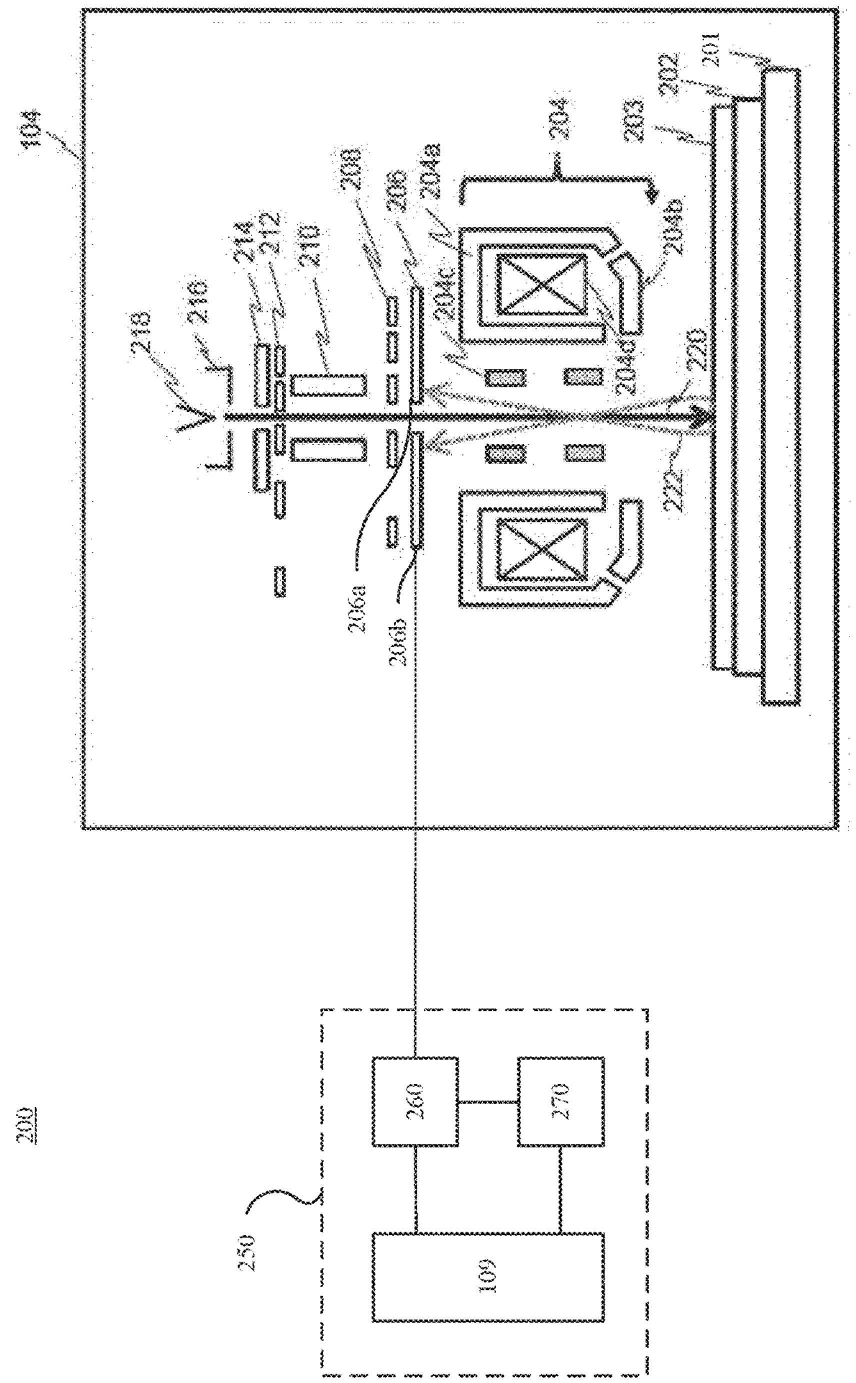
FIG. 2 is a schematic diagram illustrating an example charged-particle beam tool, consistent with some embodiments of the present disclosure that may be a part of the example charged-particle beam inspection system of FIG. 1.

FIG. 2 illustrates an example imaging system 200 according to embodiments of the present disclosure. Beam tool 104 of FIG. 2 may be configured for use in CPBI system 100. Beam tool 104 may be a single beam apparatus or a multi-beam apparatus. As shown in FIG. 2, beam tool 104 includes a motorized sample stage 201, and a wafer holder 202 supported by motorized sample stage 201 to hold a wafer 203 to be inspected. Beam tool 104 further includes an objective lens assembly 204, a charged-particle detector 206 (which includes charged-particle sensor surfaces **206*a* and 206*b*), an objective aperture 208, a condenser lens 210, a beam limit aperture 212, a gun aperture 214, an anode 216, and a cathode 218. Objective lens assembly 204, in some embodiments, may include a modified swing objective retarding immersion lens (SORIL), which includes a pole piece 204*a*, a control electrode 204*b*, a deflector 204*c*, and an exciting coil 204*d*. Beam tool 104 may additionally include an Energy Dispersive X-ray Spectrometer (EDS) detector (not shown) to characterize the materials on wafer 203**.

A primary charged-particle beam 220 (or simply "primary beam 220"), such as an electron beam, is emitted from cathode 218 by applying an acceleration voltage between anode 216 and cathode 218. Primary beam 220 passes through gun aperture 214 and beam limit aperture 212, both of which may determine the size of charged-particle beam entering condenser lens 210, which resides below beam limit aperture 212. Condenser lens 210 focuses primary beam 220 before the beam enters objective aperture 208 to set the size of the charged-particle beam before entering objective lens assembly 204. Deflector **204*c* deflects primary beam 220 to facilitate beam scanning on the wafer. For example, in a scanning process, deflector 204c may be controlled to deflect primary beam 220 sequentially onto different locations of top surface of wafer 203 at different time points, to provide data for image reconstruction for different parts of wafer 203. Moreover, deflector 204c may also be controlled to deflect primary beam 220 onto different sides of wafer 203 at a particular location, at different time points, to provide data for stereo image reconstruction of the wafer structure at that location. Further, in some embodiments, anode 216 and cathode 218 may generate multiple primary beams 220, and beam tool 104 may include a plurality of deflectors 204c to project the multiple primary beams 220 to different parts/sides of the wafer at the same time, to provide data for image reconstruction for different parts of wafer 203**.

Exciting coil 204d and pole piece 204a generate a magnetic field that begins at one end of pole piece 204a and terminates at the other end of pole piece 204a. A part of wafer 203 being scanned by primary beam 220 may be immersed in the magnetic field and may be electrically charged, which, in turn, creates an electric field. The electric field reduces the energy of impinging primary beam 220 near the surface of wafer 203 before it collides with wafer 203. Control electrode 204b, being electrically isolated from pole piece 204a, controls an electric field on wafer 203 to prevent micro-arching of wafer 203 and to ensure proper beam focus.

A secondary charged-particle beam 222 (or "secondary beam 222"), such as secondary electron beams, may be emitted from the part of wafer 203 upon receiving primary beam 220. Secondary beam 222 may form a beam spot on sensor surfaces 206a and 206b of charged-particle detector 206. Charged-particle detector 206 may generate a signal (e.g., a voltage, a current, or the like.) that represents an intensity of the beam spot and provide the signal to an image processing system 250. The intensity of secondary beam 222, and the resultant beam spot, may vary according to the external or internal structure of wafer 203. Moreover, as discussed above, primary beam 220 may be projected onto different locations of the top surface of the wafer or different sides of the wafer at a particular location, to generate secondary beams 222 (and the resultant beam spot) of different intensities. Therefore, by mapping the intensities of the beam spots with the locations of wafer 203, the processing system may reconstruct an image that reflects the internal or surface structures of wafer 203.

Imaging system 200 may be used for inspecting a wafer 203 on motorized sample stage 201 and includes beam tool 104, as discussed above. Imaging system 200 may also include an image processing system 250 that includes an image acquirer 260, storage 270, and controller 109. Image acquirer 260 may include one or more processors. For example, image acquirer 260 may include a computer, server, mainframe host, terminals, personal computer, any kind of mobile computing devices, and the like, or a combination thereof. Image acquirer 260 may connect with a detector 206 of beam tool 104 through a medium such as an electrical conductor, optical fiber cable, portable storage media, IR, Bluetooth, internet, wireless network, wireless radio, or a combination thereof. Image acquirer 260 may receive a signal from detector 206 and may construct an image. Image acquirer 260 may thus acquire images of wafer 203. Image acquirer 260 may also perform various post-processing functions, such as generating contours, superimposing indicators on an acquired image, and the like. Image acquirer 260 may perform adjustments of brightness and contrast, or the like. of acquired images. Storage 270 may be a storage medium such as a hard disk, cloud storage, random access memory (RAM), other types of computer readable memory, and the like. Storage 270 may be coupled with image acquirer 260 and may be used for saving scanned raw image data as original images, post-processed images, or other images assisting of the processing. Image acquirer 260 and storage 270 may be connected to controller 109. In some embodiments, image acquirer 260, storage 270, and controller 109 may be integrated together as one control unit.

In some embodiments, image acquirer 260 may acquire one or more images of a sample based on an imaging signal received from detector 206. An imaging signal may correspond to a scanning operation for conducting charged particle imaging. An acquired image may be a single image including a plurality of imaging areas. The single image may be stored in storage 270. The single image may be an original image that may be divided into a plurality of regions. Each of the regions may include one imaging area containing a feature of wafer 203.

A phenomenon in defect detection is artifacts introduced by the inspection tools (e.g., a scanning charged-particle microscope). The artifacts do not originate from actual defects of the final products. The artifacts may distort or deteriorate the quality of the image to be inspected, and cause difficulties or inaccuracies in defect detection. For example, when inspecting electrically insulating materials using a SEM, the qualities of the SEM images typically suffer from SEM-induced charging artifacts.

Figure 3:
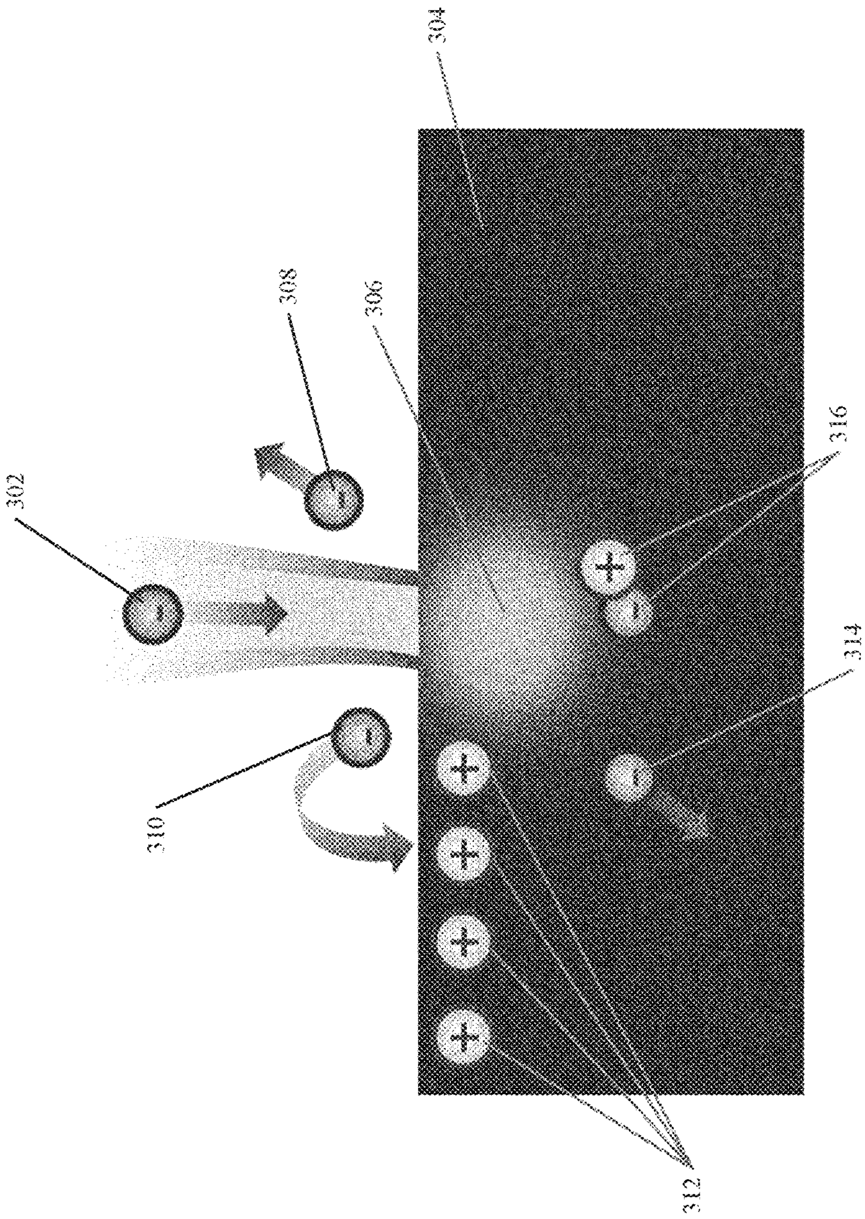
FIG. 3 is a schematic diagram illustrating an example process of a charging effect induced by a charged-particle beam tool, consistent with some embodiments of the present disclosure.

FIG. 3 is a schematic diagram illustrating an example process of a charging effect induced by a charged-particle beam tool (e.g., a scanning charged-particle microscope), consistent with some embodiments of the present disclosure. A scanning charged-particle microscope ("SCPM") generates a primary charged-particle beam (e.g., primary charged-particle beam 220 in FIG. 2) for inspection. For example, the primary charged-particle beam may be a primary electron beam. In FIG. 3, electrons of a primary electron beam 302 are projected onto a surface of insulator sample 304. Insulator sample 304 may be of insulating materials, such as a non-conductive resist, a silicon dioxide layer, or the like.

The electrons of primary electron beam 302 may penetrate the surface of insulator sample 304 for a certain depth (e.g., several nanometers), interacting with particles of insulator sample 304 in interaction volume 306. Some electrons of primary electron beam 302 may elastically interact with (e.g., in a form of elastic scattering or collision) the particles in interaction volume 306 and may be reflected or recoiled out of the surface of insulator sample 304. An elastic interaction conserves the total kinetic energies of the bodies (e.g., electrons of primary electron beam 302 and particles of insulator sample 304) of the interaction, in which no kinetic energy of the interacting bodies convert to other forms of energy (e.g., heat, electromagnetic energy, etc.). Such reflected electrons generated from elastic interaction may be referred to as backscattered electrons (BSEs), such as BSE 308 in FIG. 3. Some electrons of primary electron beam 302 may inelastically interact with (e.g., in a form of inelastic scattering or collision) the particles in interaction volume 306. An inelastic interaction does not conserve the total kinetic energies of the bodies of the interaction, in which some or all of the kinetic energy of the interacting bodies may covert to other forms of energy. For example, through the inelastic interaction, the kinetic energy of some electrons of primary electron beam 302 may cause electron excitation and transition of atoms of the particles. Such inelastic interaction may also generate electrons exiting the surface of insulator sample 304, which may be referred to as secondary electrons (SEs), such as SE 310 in FIG. 3. Yield or emission rates of BSEs and SEs may depend on, for example, the energy of the electrons of primary electron beam 302 and the material under inspection, among other factors. The energy of the electrons of primary electron beam 302 may be imparted in part by its acceleration voltage (e.g., the acceleration voltage between anode 216 and cathode 218 in FIG. 2). The quantity of BSEs and SEs may be more or fewer (or even the same) than the injected electrons of primary electron beam 302. An imbalance of incoming and outgoing electrons can cause accumulation of electric charge (e.g., positive or negative charge) on the surface of insulator sample 304. Because insulator sample 304 is non-conductive and cannot be grounded, the extra charge may build up locally on or near the surface of insulator sample 304, which may be referred to as a SCPM-induced (e.g., SEM-induced) charging effect.

Typically, insulating materials (e.g., many types of resists) may be positively charged, because the outgoing electrons (e.g., BSEs or SEs) typically exceeds the incoming electrons of the primary electron beam of a SEM, and extra positive charge builds up on or near the surface of the insulator material. FIG. 3 shows a case where the SEM-induced charging effect occurs and causes positive charge accumulated on the surface of insulator sample 304. The positive charge may be physically modelled as holes 312. In FIG. 3, the electrons of primary electron beam 302 injected into interaction volume 306 may diffuse to the neighboring volume of interaction volume 306, which may be referred to as diffused electrons, such as diffused charge 314. The diffused electrons may recombine with positive charge (e.g., holes 312) in insulator sample 304, such as recombination pair 316. The diffusion and recombination of charge may affect the distribution of holes 312. Holes 312 may cause a problem by, for example, attracting BSEs and SEs back to the surface of insulator sample 304, increasing the landing energy of the electrons of primary electron beam 302, causing the electrons of primary electron beam 302 to deviate from their intended landing spot, or interfering with an electric field between the surface of insulator sample 304 and an electron detector of BSEs and SEs, such as electron detector 206 in FIG. 2.

The SCPM-induced charging effect may attenuate and distort the SCPM signals received by the electron detector, which may further distort generated SCPM images. Also, because insulator sample 304 is non-conductive, as primary electron beam 302 scans across its surface, positive charge may be accumulated along the path of primary electron beam 302. Such accumulation of positive charge may increase or complicate the distortion in the generated SEM images. Such distortion caused by the SCPM-induced charging effect may be referred to as SCPM-induced charging artifacts. The SCPM-induced charging artifacts may induce error in estimating geometrical size of fabricated structures or cause misidentification of defects in an inspection.

With reference to FIG. 3 as an example, the surface of insulator sample 304 may include various features, such as lines, slots, corners, edges, holes, or the like. Those features may be at different heights. When primary electron beam 302 scans across a feature that has a height change, especially a sudden height change, SEs may be generated and collected from the surface, and additionally from an edge or even a hidden surface (e.g., a sidewall of the edge) of the feature. Those additional SEs may cause brighter edges or contours in the SEM image. Such an effect may be referred to as "edge enhancement" or "edge blooming." The SEM-induced charging effect may also be aggravated due to the escape of the additional SEs (i.e., leaving additional positive charge on the sample surface). The aggravated charging effect may cause different charging artifacts in edge bloom regions of the SEM image, depending on whether the height of the surface elevates or lowers as primary electron beam 302 scans by. A contour identification technique may be applied to identify one or more contours in the SEM image. The identified contours indicate locations of edge blooms (i.e., regions with additional positive charge).

Figure 4:
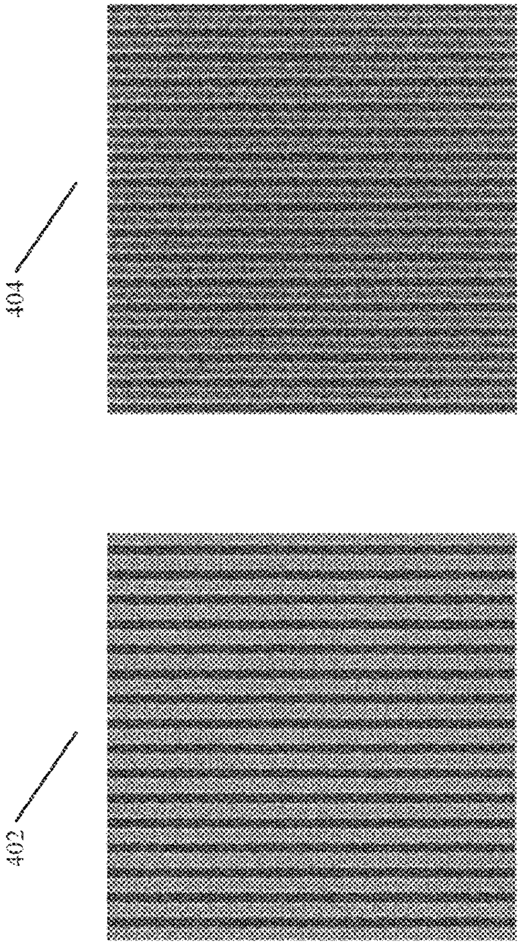
FIG. 4 is a diagram illustrating an example simulation image and an example inspection image of an inspected sample, consistent with some embodiments of the present disclosure.

A challenge in using the simulation images for the various application scenarios described herein is that the simulation technique for generating the simulation images may have difficulties in fully representing reality (e.g., the scanning charged-particle microscope induced charging effect or the edge blooming as described herein). FIG. 4 is a diagram illustrating an example simulation image 402 and an example inspection image 404 of an inspected sample, consistent with some embodiments of the present disclosure. Inspection image 404 may be generated after a scanning charged-particle microscope scanning the inspected sample. Simulation image 402 may be generated by a simulation technique that simulates an image of the inspected sample measured by the scanning charged-particle microscope. As illustrated in FIG. 4, simulation image 402 includes image artifacts to inspection image 404. Among the image artifacts, for example, edge blooming (represented by white parts along line edges) in simulation image 402 is less severe than edge blooming in inspection image 404. As another example, the edge blooming in inspection image 404 includes asymmetric intensities (represented by asymmetric brightness of the white parts by both sides of a line edge), which may be caused by a charging effect incurred by a primary electron beam of a SEM scanning along a direction. However, simulation image 402 does not present such asymmetric intensities in its edge blooming. As a third example, inspection image 404 presents an overall intensity gradient (represented by brightness gradient of the white parts of multiple line edges), which may be caused by the SEM-induced charging effect and other distortion sources. However, simulation image 402 does not present such an overall intensity gradient. As illustrated in FIG. 4, if simulation image 402 and inspection image 404 presents such discrepancies, the value of using simulation image 402 may be diminished.

Consistent with some embodiments of this disclosure, a computer-implemented method for image analysis may include obtaining a plurality of simulation images and a plurality of non-simulation images both associated with a sample under inspection. At least one of the plurality of simulation images is a simulation image of a location on the sample not imaged by any of the plurality of non-simulation images. The obtaining, as used herein, may refer to accepting, taking in, admitting, gaining, acquiring, retrieving, receiving, reading, accessing, collecting, or any operation for inputting data. In some embodiments, the plurality of non-simulation images (e.g., actual inspection images) may be generated by a charged-particle inspection apparatus (e.g., a scanning charged-particle microscope or a SEM). The plurality of simulation images may be generated by a simulation technique that may simulate graphical representations of inspection images measured by the charged-particle inspection apparatus. For example, the simulation technique may include a Monte-Carlo based technique that may simulate a ray trace of a charged-particle (e.g., an electron) incident into a sample (e.g., a structure on wafer), ray traces of one or more secondary charged-particle (e.g., secondary electrons) coming out of the sample as a result of an interaction between the incident charged-particle and atoms of the sample, as well as parameters (e.g., energy, momentum, or any other energetic or kinematic features) of the incident charged-particle and the secondary charged-particles. The Monte-Carlo based technique may further simulate interactions between the secondary charged-particles and materials of a detector (e.g., detector 206 in FIG. 2) of the charged-particle inspection apparatus, and simulate a graphical representation of an inspection image generated by the detector as a result of the interactions between the secondary charged-particles and the materials of the detector. Such a simulated graphical representation may be a simulation image.

An association between a simulation image and a non-simulation image, as used herein, may refer to a corresponding relationship between the non-simulation image and the simulation image, in which the non-simulation image is generated by a measurement apparatus (e.g., an inspection apparatus), and the simulation image is generated by a simulation technique that simulates the non-simulation image under the same measurement conditions. For example, the non-simulation image may be generated by the measurement apparatus that is tuned with a parameter set. Such a parameter set may include only parameters that are less than all tunable parameters of the measurement apparatus. The simulation technique may adopt the same parameter set to perform the simulation for generating the simulation image. In such a case, the simulation image and the non-simulation image may be deemed as being associated. When the simulation image is generated by the simulation technique using a different parameter set, the simulation image and the non-simulation image may be deemed as not being associated. In some embodiments, when a simulation image and a non-simulation image is not being associated, they may have a random corresponding relationship.

In some embodiments, the plurality of non-simulation images may be generated by the charged-particle inspection apparatus using a plurality of parameter sets. As an example, each of the plurality of non-simulation images may be generated using one of the plurality of parameter sets. At least one of the plurality of simulation images may be generated by the simulation technique using none of the plurality of parameter sets. In such a case, the at least one of the plurality of simulation images is not a simulation image associated with any of the plurality of non-simulation images. As another example, each of the plurality of non-simulation images may be generated as an inspection image of a location on the sample using one of the plurality of parameter sets. The plurality of simulation images may be generated by the simulation technique using one or more of the plurality of parameter sets, and at least one of the plurality of simulation images may be a simulation image of a particular location on the sample, in which the particular location is not imaged by any of the plurality of non-simulation images. In such a case, the at least one of the plurality of simulation images is a simulation image of a location on the sample not imaged by any of the plurality of non-simulation images.

In some embodiments, the plurality of non-simulation images may include an image artifact not representing a defect in the sample, and the plurality of simulation images do not include the image artifact. The image artifact may be caused by a physical effect (e.g., a charging effect or edge blooming as described herein) during inspection of the sample by a charged-particle inspection apparatus. By way of example, the image artifact may include at least one of an edge blooming effect including asymmetry, irregular drops in intensity (e.g., irregular drops in the middle of a line segment of a chart representing an intensity distribution), or an intensity gradient (e.g., an absolute intensity gradient over a whole image) exceeding a predetermined value.

In some embodiments, the plurality of simulation images and the plurality of non-simulation images may include similar image features. For example, the plurality of non-simulation images may include a first geometric feature. The plurality of simulation images may include a second geometric feature different from the first geometric feature. A value representing similarity between the first geometric feature and the second geometric feature may be within a preset range. By way of example, the first and second geometric features may include 2D geometric features, such as at least one of a type of geometric patterns (e.g., a line, an apex, an edge, a corner, a pitch, etc.), a distribution of geometric patterns, a characteristic of geometric patterns (e.g., a line width, a line structure, a line roughness, an edge placement, etc.), or the like. The value representing similarity between the first geometric feature and the second geometric feature may be, for example, an absolute difference between an average line width of the plurality of non-simulation images and an average line width of the plurality of simulation images.

By way of example, the simulation images may be generated in a particular manner to ensure they have similar image features to the non-simulation images. A set of statistic variables (e.g., means, variance, standard errors, or the like) may be determined for image features (e.g., geometric patterns) of the non-simulation images. Such a set of statistic variables may have an upper limit and a lower limit for each statistic variable. The simulation images may be generated with their image features (e.g., geometric patterns) constructed in accordance with a random manner (e.g., in accordance with a uniform distribution). The parameters of such a uniform distribution may be selected to ensure the statistic variables of the image features of the simulation images are within (e.g., neither above nor below a 10% error margin) the upper limits and lower limits of the statistic variables of the non-simulation images. Such generated simulation images may be ensured that they have similar image features to the non-simulation images.

It is noted that at least one of the plurality of simulation images is not corresponding to or paired with (e.g., having a one-to-one relationship) any of the plurality of non-simulation images. For example, at least one of the plurality of simulation images is not simulated using any condition or parameter that is used under inspection for any of the plurality of non-simulation images. In some embodiments, none of the plurality of simulation images is a simulation image associated with any of the plurality of non-simulation images. In some embodiments, none of the plurality of simulation images is a simulation image of any location on the sample imaged by any of the plurality of non-simulation images.

Consistent with some embodiments of this disclosure, the method for image analysis may also include training an unsupervised domain adaptation technique using the plurality of simulation images and the plurality of non-simulation images as inputs to reduce a difference between first intensity gradients (e.g., an absolute intensity gradient over a whole image) of the plurality of simulation images and second intensity gradients (e.g., an absolute intensity gradient over a whole image) of the plurality of non-simulation images. A domain, as used herein, may refer to a rendering, a feature space, or a setting for presenting data. A domain adaptation technique, as used herein, may refer to a machine learning model or statistical model that may translate inputted data from a source domain to a target domain. The source domain and the target domain may share common data features but have different distributions or representations of the common data features. In some embodiments, the unsupervised domain adaptation technique may include a cycle-consistent domain adaptation technique. For example, the cycle-consistent domain adaptation technique may translate a photo of a landscape in summer into the same or similar landscape in winter, in which the photo is the inputted data, the source domain is the summer season, and the target domain is the winter season. The cycle consistency, as used herein, may refer to a characteristic of a domain adaptation technique (e.g., a machine learning model) in which the domain adaptation technique may bidirectionally and indistinguishably translate data between a source domain and a target domain. For example, a cycle-consistent domain adaptation technique may obtain first data (e.g., a first photo of a landscape) in the source domain (e.g., in the summer season) and output second data (e.g., a second photo of the same or similar landscape) in the target domain (e.g., in the winter season), and may also receive the second data and output third data (e.g., a third photo of the same or similar landscape) in the source domain, in which the third data is indistinguishable from the first data.

In some embodiments, the domain adaptation technique may include a neural network model (or simply a "neural network") that is trained using unsupervised training. A neural network, as used herein, may refer to a computing model for analyzing underlying relationships in a set of input data by way of mimicking human brains. Similar to a biological neural network, the neural network may include a set of connected units or nodes (referred to as "neurons"), structured as different layers, where each connection (also referred to as an "edge") may obtain and send a signal between neurons of neighboring layers in a way similar to a synapse in a biological brain. The signal may be any type of data (e.g., a real number). Each neuron may obtain one or more signals as an input and output another signal by applying a non-linear function to the inputted signals. Neurons and edges may typically be weighted by corresponding weights to represent the knowledge the neural network has acquired. During a training process (similar to a learning process of a biological brain), the weights may be adjusted (e.g., by increasing or decreasing their values) to change the strengths of the signals between the neurons to improve the performance accuracy of the neural network. Neurons may apply a thresholding function (referred to as an "activation function") to its output values of the non-linear function such that a signal is outputted only when an aggregated value (e.g., a weighted sum) of the output values of the non-linear function exceeds a threshold determined by the thresholding function. Different layers of neurons may transform their input signals in different manners (e.g., by applying different non-linear functions or activation functions). The output of the last layer (referred to as an "output layer") may output the analysis result of the neural network, such as, for example, a categorization of the set of input data (e.g., as in image recognition cases), a numerical result, or any type of output data for obtaining an analytical result from the input data.

Training of the neural network, as used herein, may refer to a process of improving the accuracy of the output of the neural network. Typically, the training may be categorized into three types: supervised training, unsupervised training, and reinforcement training. In the supervised training, a set of target output data (also referred to as "labels" or "ground truth") may be generated based on a set of input data using a method other than the neural network. The neural network may then be fed with the set of input data to generate a set of output data that is typically different from the target output data. Based on the difference between the output data and the target output data, the weights of the neural network may be adjusted in accordance with a rule. If such adjustments are successful, the neural network may generate another set of output data more similar to the target output data in a next iteration using the same input data. If such adjustments are not successful, the weights of the neural network may be adjusted again. After a sufficient number of iterations, the training process may be terminated in accordance with one or more predetermined criteria (e.g., the difference between the final output data and the target output data is below a predetermined threshold, or the number of iterations reaches a predetermined threshold). The trained neural network may be applied to analyze other input data.

In the unsupervised training, the neural network is trained without any external gauge (e.g., labels) to identify patterns in the input data rather than generating labels for them. Typically, the neural network may analyze shared attributes (e.g., similarities and differences) and relationships among the elements of the input data in accordance with one or more predetermined rules or algorithms (e.g., principal component analysis, clustering, anomaly detection, or latent variable identification). The trained neural network may extrapolate the identified relationships to other input data.

In the reinforcement learning, the neural network is trained without any external gauge (e.g., labels) in a trial-and-error manner to maximize benefits in decision making. The input data sets of the neural network may be different in the reinforcement training. For example, a reward value or a penalty value may be determined for the output of the neural network in accordance with one or more rules during training, and the weights of the neural network may be adjusted to maximize the reward values (or to minimize the penalty values). The trained neural network may apply its learned decision-making knowledge to other input data.

During the training of a neural network, a loss function (or referred to as a "cost function") may be used to evaluate the output data. The loss function, as used herein, may map output data of a machine learning model (e.g., the neural network) onto a real number (referred to as a "loss" or a "cost") that intuitively represents a loss or an error (e.g., representing a difference between the output data and target output data) associated with the output data. The training of the neural network may seek to maximize or minimize the loss function (e.g., by pushing the loss towards a local maximum or a local minimum in a loss curve). For example, one or more parameters of the neural network may be adjusted or updated purporting to maximize or minimize the loss function. After adjusting or updating the one or more parameters, the neural network may obtain new input data in a next iteration of its training. When the loss function is maximized or minimized, the training of the neural network may be terminated.

Figure 5:
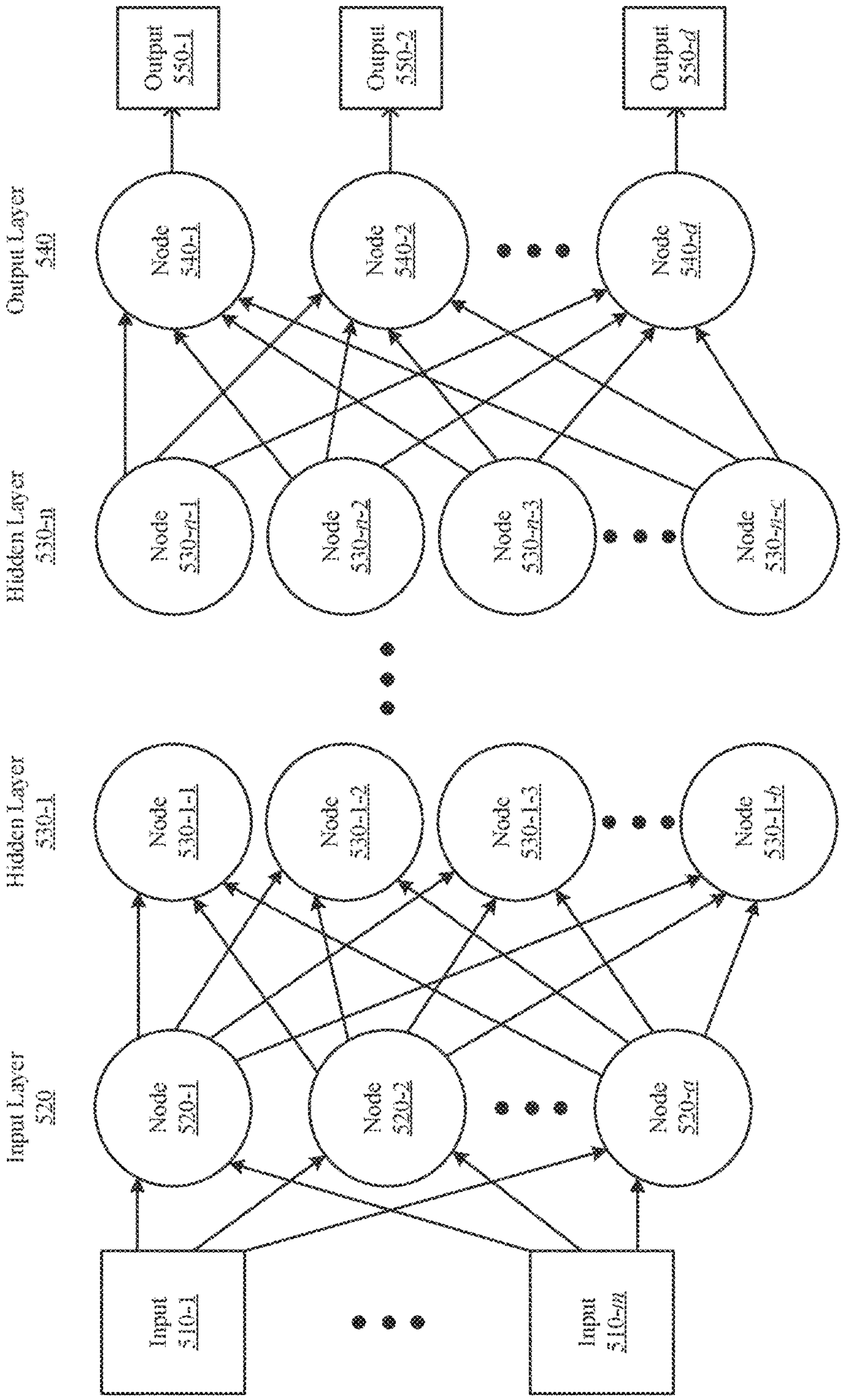
FIG. 5 is a schematic diagram illustrating an example neural network, consistent with some embodiments of the present disclosure.

By way of example, FIG. 5 is a schematic diagram illustrating an example neural network 500, consistent with some embodiments of the present disclosure. As depicted in FIG. 5, neural network 500 may include an input layer 520 that receives inputs, including input 510-1 . . . input 510-*m* (m being an integer). For example, an input of neural network 500 may include any structure or unstructured data (e.g., an image such as a simulation image or an inspection image). In some embodiments, neural network 500 may obtain a plurality of inputs simultaneously. For example, in FIG. 5, neural network 500 may obtain m inputs simultaneously. In some embodiments, input layer 520 may obtain m inputs in succession such that input layer 520 receives input 510-1 in a first cycle (e.g., in a first inference) and pushes data from input 510-1 to a hidden layer (e.g., hidden layer 530-1), then receives a second input in a second cycle (e.g., in a second inference) and pushes data from input the second input to the hidden layer, and so on. Input layer 520 may obtain any number of inputs in the simultaneous manner, the successive manner, or any manner of grouping the inputs.

Input layer 520 may include one or more nodes, including node 520-1, node 520-2 . . . , node 520-*a* (a being an integer). A node (also referred to as a "machine perception" or a "neuron") may model the functioning of a biological neuron. Each node may apply an activation function to received inputs (e.g., one or more of input 510-1 . . . input 510-*m*). An activation function may include a Heaviside step function, a Gaussian function, a multiquadratic function, an inverse multiquadratic function, a sigmoidal function, a rectified linear unit (ReLU) function (e.g., a ReLU6 function or a Leaky ReLU function), a hyperbolic tangent ("tanh") function, or any non-linear function. The output of the activation function may be weighted by a weight associated with the node. A weight may include a positive value between 0 and 1, or any numerical value that may scale outputs of some nodes in a layer more or less than outputs of other nodes in the same layer.

As further depicted in FIG. 5, neural network 500 includes multiple hidden layers, including hidden layer 530-1 . . . hidden layer 530-*n* (n being an integer). When neural network 500 includes more than one hidden layer, it may be referred to as a "deep neural network" (DNN). Each hidden layer may include one or more nodes. For example, in FIG. 5, hidden layer 530-1 includes node 530-1-1, node 530-1-2, node 530-1-3, . . . , node 530-1-*b* (b being an integer), and hidden layer 530-*n* includes node 530-*n*-1, node 530-*n*-2, node 530-*n*-3, . . . , node 530-*n*-*c* (c being an integer). Similar to nodes of input layer 520, nodes of the hidden layers may apply the same or different activation functions to outputs from connected nodes of a previous layer, and weight the outputs from the activation functions by weights associated with the nodes.

As further depicted in FIG. 5, neural network 500 may include an output layer 540 that finalizes outputs, including output 550-1, output 550-2 . . . output 550-*d* (d being an integer). Output layer 540 may include one or more nodes, including node 540-1, node 540-2 . . . , node 540-*d*. Similar to nodes of input layer 520 and of the hidden layers, nodes of output layer 540 may apply activation functions to outputs from connected nodes of a previous layer and weight the outputs from the activation functions by weights associated with the nodes.

Although nodes of each hidden layer of neural network 500 are depicted in FIG. 5 to be connected to each node of its previous layer and next layer (referred to as "fully connected"), the layers of neural network 500 may use any connection scheme. For example, one or more layers (e.g., input layer 520, hidden layer 530-1 . . . hidden layer 530-*n*, or output layer 540) of neural network 500 may be connected using a convolutional scheme, a sparsely connected scheme, or any connection scheme that uses fewer connections between one layer and a previous layer than the fully connected scheme as depicted in FIG. 5.

Moreover, although the inputs and outputs of the layers of neural network 500 are depicted as propagating in a forward direction (e.g., being fed from input layer 520 to output layer 540, referred to as a "feedforward network") in FIG. 5, neural network 500 may additionally or alternatively use backpropagation (e.g., feeding data from output layer 540 towards input layer 520) for other purposes. For example, the backpropagation may be implemented by using long short-term memory nodes (LSTM). Accordingly, although neural network 500 is depicted similar to a convolutional neural network (CNN), neural network 500 may include a recurrent neural network (RNN) or any other neural network.

In some embodiments, to achieve cycle consistency, the domain adaptation technique (e.g., a machine learning model such as neural network) may enable bidirectional mappings (e.g., by providing two neural networks) between a source domain and a target domain, and the bidirectional mappings may be associated with a particular term in its loss function for their trainings, which may be referred to as a "cycle-consistency loss." In some embodiments, the cycle-consistency loss may include a forward cycle-consistency loss and a backward cycle-consistency loss. For example, the forward cycle-consistency loss may be used to evaluate consistency (e.g., a level of indistinguishableness) of adapting data from a source domain to a target domain and back to the source domain again. The backward cycle-consistency loss may be used to evaluate consistency (e.g., a level of indistinguishableness) of adapting data from the target domain to the source domain and back to the target domain again. The training of the machine learning model may seek to maximize or minimize the cycle-consistency loss function for achieving cycle consistency. For example, during an iteration of training, one or more parameters of the machine learning model may be adjusted or updated via backpropagation purporting to maximize or minimize the cycle-consistency loss function. After adjusting or updating the one or more parameters, the machine learning model may obtain new input data in a next iteration of its training. When the cycle-consistency loss function is maximized or minimized, the machine learning model may be determined as cycle consistent.

In some embodiments, the unsupervised domain adaptation technique may include a cycle-consistent generative adversarial network ("GAN"). A GAN, as used herein, may refer to a machine learning model that includes a generator (e.g., a first neural network) and a discriminator (e.g., a second neural network different from the first neural network) contesting with each other in a zero-sum game. For example, during training of the GAN, the generator may input original data and output sample data, and the discriminator may attempt to distinguish (e.g., using a classification technique) the sample data from reference data. If the discriminator succeeds in such an attempt, the generator may be updated purporting to generate sample data more similar to the reference data in a next iteration of the training. If the discriminator fails in such an attempt (e.g., by classifying the sample data as the reference data), the training of the GAN may be terminated. The generator in a trained GAN may be used to translate inputted data into sample data that is indistinguishable (by the discriminator of the trained GAN) to the reference data.

Figure 6:
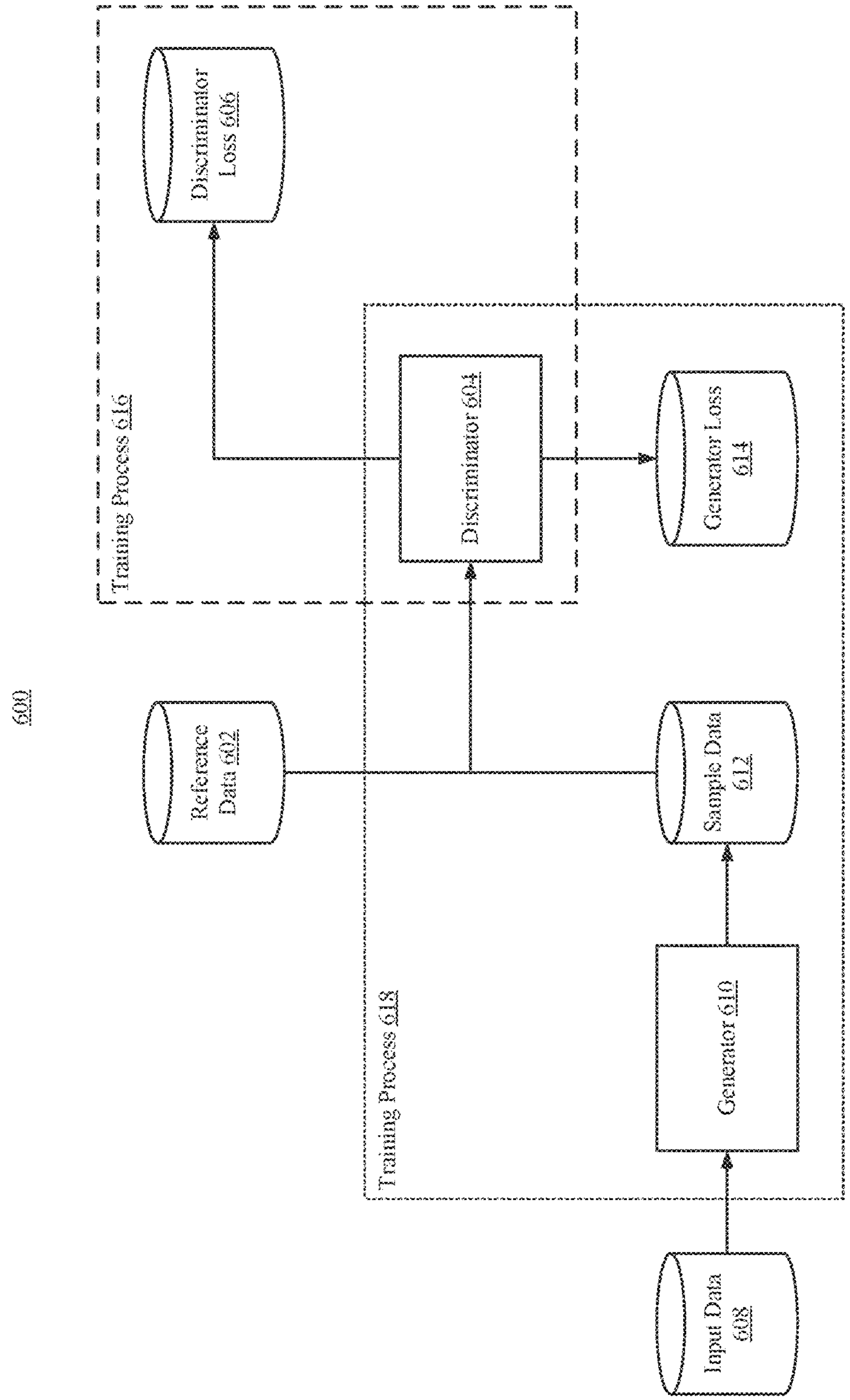
FIG. 6 is a schematic diagram illustrating an example generative adversarial network, consistent with some embodiments of the present disclosure.

By way of example, FIG. 6 is a schematic diagram illustrating an example generative adversarial network ("GAN") 600, consistent with some embodiments of the present disclosure. GAN 600 includes a discriminator 604 and a generator 610. In some embodiments, discriminator 604 and generator 610 may both be neural networks (e.g., neural networks similar to neural network 500 described in association with FIG. 5). In some embodiments, discriminator 604 may be a classifier. As illustrated in FIG. 6, discriminator 604 inputs reference data 602 and sample data 612 and may attempt to distinguish them from each other. Generator 610 may obtain input data 608 and output sample data 612.

The training of GAN 600 includes the training of discriminator 604 and the training of generator 610, represented by a training process 616 (represented by a dash-line box in FIG. 6) and a training process 618 (represented by a dot-line box in FIG. 6), respectively. When discriminator 604 is being trained in training process 616, parameters (e.g., weights) of generator 610 may be fixed (i.e., not being trained). When generator 610 is being trained in training process 618, parameters (e.g., weights) of discriminator 604 may be fixed (i.e., not being trained).

In some embodiments, discriminator 604 may be fully trained in training process 616 before training generator 610 in training process 618. For example, after generator 610 receives input data 608 and outputs sample data 612, the parameters (e.g., weights) of generator 610 may be fixed. Then, discriminator 604 may obtain reference data 602 and sample data 612 to start training process 616. Discriminator 604 may output a classification result, either classifying sample data 612 as reference data 602 or not classifying sample data 612 as reference data 602. To evaluate the classification result outputted by discriminator 604, a loss function may be used in association with discriminator 604. The loss function may include a discriminator loss 606 and a generator loss 614. In training process 616, generator loss 614 may be ignored, and only discriminator loss 606 may be used to evaluate the classification result outputted by discriminator 604. If discriminator loss 606 is not minimized or maximized, the parameters (e.g., weights) of discriminator 604 may be updated via backpropagation from discriminator loss 606 through discriminator 604, and training process 616 may proceed to a next iteration. If discriminator loss 606 is minimized or maximized, training process 616 may be terminated. In an ideal case, a fully trained discriminator 604 may have a 100% probability in distinguishing sample data 612 from reference data 602.

After training process 616 is terminated (i.e., discriminator 604 being deemed as fully trained), the parameters (e.g., weights) of discriminator 604 may be fixed. Then, generator 610 may obtain input data 608 to start training process 618. In some embodiments, input data 608 may be random data (e.g., data conforming to a uniform distribution). Generator 610 may output sample data 612, and discriminator 604 may obtain sample data 612 and reference data 602 again to output a classification result, either classifying sample data 612 as reference data 602 or not classifying sample data 612 as reference data 602. Typically, discriminator 604 do not classify sample data 612 as reference data 602 in initial iterations of training process 618. In training process 618, discriminator loss 606 may be ignored, and only generator loss 614 may be used to evaluate the classification result outputted by discriminator 604. If generator loss 614 is not minimized or maximized, the parameters (e.g., weights) of generator 610 may be updated via backpropagation from generator loss 614 through discriminator 604 to generator 610, and training process 618 may proceed to a next iteration. If generator loss 614 is minimized or maximized, training process 618 may be terminated. In an ideal case, a fully trained generator 610 may generate sample data 612 that discriminator 604 has a 50% probability (e.g., complete random) in distinguishing it from reference data 602. If both discriminator 604 and generator 610 is fully trained, GAN 600 may be deemed as trained.

In some embodiments, to train GAN 600, discriminator 604 and generator 610 may be trained in an alternating manner. For example, after generator 610 receives input data 608 and outputs sample data 612, the parameters (e.g., weights) of generator 610 may be fixed. Then, discriminator 604 may obtain reference data 602 and sample data 612 to start training process 616. Training process 616 may be repeated to train discriminator 604 for one or more epochs before fully training discriminator 604. An epoch, as used herein, may refer to pass of an entire training dataset a machine learning model completes. Datasets may be grouped into one or more batches. Assuming a size of a dataset is s, a total number of epochs is e, a size of a batch is b, and a number of training iteration is i, then a relationship may be established in which $d \times e = i \times b$.

After training discriminator 604 for one or more epochs, the parameters (e.g., weights) of discriminator 604 may be fixed. Then, generator 610 may obtain input data 608 and output sample data 612 to start training process 618. Training process 618 may be repeated to train generator 610 for one or more epochs before fully training generator 610. After training generator 610 for the one or more epochs, the parameters (e.g., weights) of generator 610 may be fixed again, and training process 616 may be repeated again to train discriminator 604 for another one or more epochs. Such an alternate training may be repeated until both discriminator loss 606 and generator loss 614 are minimized or maximized, when GAN 600 may be deemed as trained.

With reference to FIG. 6, a cycle-consistent GAN may include two generators (not shown in FIG. 6) for achieving cycle consistency. For example, if GAN 600 is a cycle-consistent GAN, generator 610 may include a first generator (e.g., a first neural network) for mapping data from a source domain to a target domain, and a second generator (e.g., a second neural network) for mapping data from the target domain to the source domain. If fully trained, the first generator may obtain input data 608 and feed its output to the second generator, in which the data outputted by the second generator may be indistinguishable to input data 608 by discriminator 604. During training of the cycle-consistent GAN, generator loss 614 may also include a forward cycle-consistency loss associated with the first generator and a backward cycle-consistency loss associated with the second generator. The training of the cycle-consistent GAN aims to minimize or maximize both the forward cycle-consistency loss and the backward cycle-consistency loss.

In some embodiments, in the method for image analysis, to reduce a difference between the first intensity gradients of the plurality of simulation images and the second intensity gradients of the plurality of non-simulation images, the unsupervised domain adaptation technique may include a cycle-consistent domain adaptation technique. The cycle-consistent domain adaptation technique (e.g., a cycle-consistent GAN) may include an edge-preserving loss for the training. For example, the edge-preserving loss may be a sum of a first value and a second value. The first value may represent an average of geometry difference between a simulation image of the plurality of simulation images and a first domain-adapted image generated by the cycle-consistent domain adaptation technique using the simulation image as an input. For example, the simulation image may be in a source domain representing simulation, and the first domain-adapted image may be in a target domain representing actual inspection or measurement. The second value may represent an average of geometry difference between a non-simulation image of the plurality of non-simulation images and a second domain-adapted image generated by the cycle-consistent domain adaptation technique using the non-simulation image as an input. For example, the non-simulation image may be in the target domain, and the second domain-adapted image may be in the source domain. A geometry difference, as used herein, may refer to a difference of a geometric feature. For example, the geometric feature may include at least one of a total number of geometric patterns (e.g., a line, an apex, an edge, a corner, a pitch, etc.), a distribution of geometric patterns, a characteristic of geometric patterns (e.g., a line width, a line structure, a line roughness, an edge placement, a pattern segmentation, etc.), or the like.

By way of example, the cycle-consistent domain adaptation technique may be a cycle-consistent GAN (e.g., GAN 600 described in association with FIG. 6). The cycle-consistent GAN may be associated with an edge-preserving loss for its training. The edge-preserving loss may be a particular term in a full loss function associated with the cycle-consistent GAN. For example, the edge-preserving loss may be represented by $\mathcal{L}_{edge}(G,F)$ in Equation (1):

$$\mathcal{L}_{edge}(G,F)=\mathbb{E}_{x\sim p_{data}(x)}[\|k(G(x))-k(x)\|_1]+\mathbb{E}_{y\sim p_{data}(y)}[\|k(F(y))-k(y)\|_1] \quad \text{Eq. (1)}$$

In Equation (1), the operation $\mathbb{E}$ [ ] represents determining an expectation value. $\mathbb{E}_{z\sim p(z)}(f(z))$ represents determining an expectation value of a function $f(z)$ where the independent random variable z conforms to a probability distribution function p(z). G represents a mapping (e.g., implemented by a first generator included in generator 610 described in association with FIG. 6) from a source domain (e.g., simulation images) to a target domain (e.g., non-simulation images) performed by the cycle-consistent GAN (e.g., by the first generator). F represents a mapping (e.g., implemented by a second generator included in generator 610) from the target domain to the source domain performed by the cycle-consistent GAN. x represents data in the source domain, and G(x) represents domain-adapted data in the target domain generated by the cycle-consistent GAN using x as an input. y represents data in the target domain, and F(y) represents domain-adapted data in the source domain generated by the cycle-consistent GAN using y as an input. x, G(x), y, and F(y) may be represented as vectors. The operation k( ) represents determining a geometric feature. For example, if the geometric feature is a total number of edges, k( ) may include an edge detection algorithm (e.g., a search-based technique such as a Sobel filter, or a zero-crossing based technique such as a differential filter). k(G(x)) represents the geometric features determined from G(x) (i.e., data in the target domain), k(x) represents the geometric features determined from x (i.e., data in the source domain), and k(G(x))−k(x) represents a geometry difference between k(G(x)) and k(x). k(F(y)) represents the geometric features determined from F(y) (i.e., data in the source domain), k(y) represents the geometric features determined from y (i.e., data in the target domain), and k(F(y))−k(y) represents a geometry difference between k(F(y)) and k(y). The operation $\|v\|_1$ represents determining a 1-norm (e.g., a Taxicab norm or a Manhattan norm) of a vector v.

In some embodiments, the cycle-consistent domain adaptation technique (e.g., a cycle-consistent GAN) further comprises at least one of an adversarial loss (e.g., including at least one of a discriminator loss or a generator loss), a cycle-consistency loss (e.g., including at least one of a forward cycle-consistency loss or a backward cycle-consistency loss), or an identity mapping loss for the training. The identity mapping loss may be used to evaluate preservation of a global image feature (e.g., at least one of color composition, gray level, brightness, contrast, saturation, or tint, etc.) between the input and output data. For example, a full loss function of the cycle-consistent GAN may be a sum of the adversarial loss, the cycle-consistency loss, the identity mapping loss, and an edge-preserving loss (e.g., $\mathcal{L}_{edge}(G,F)$ described in association with Eq. (1)).

Figure 7:
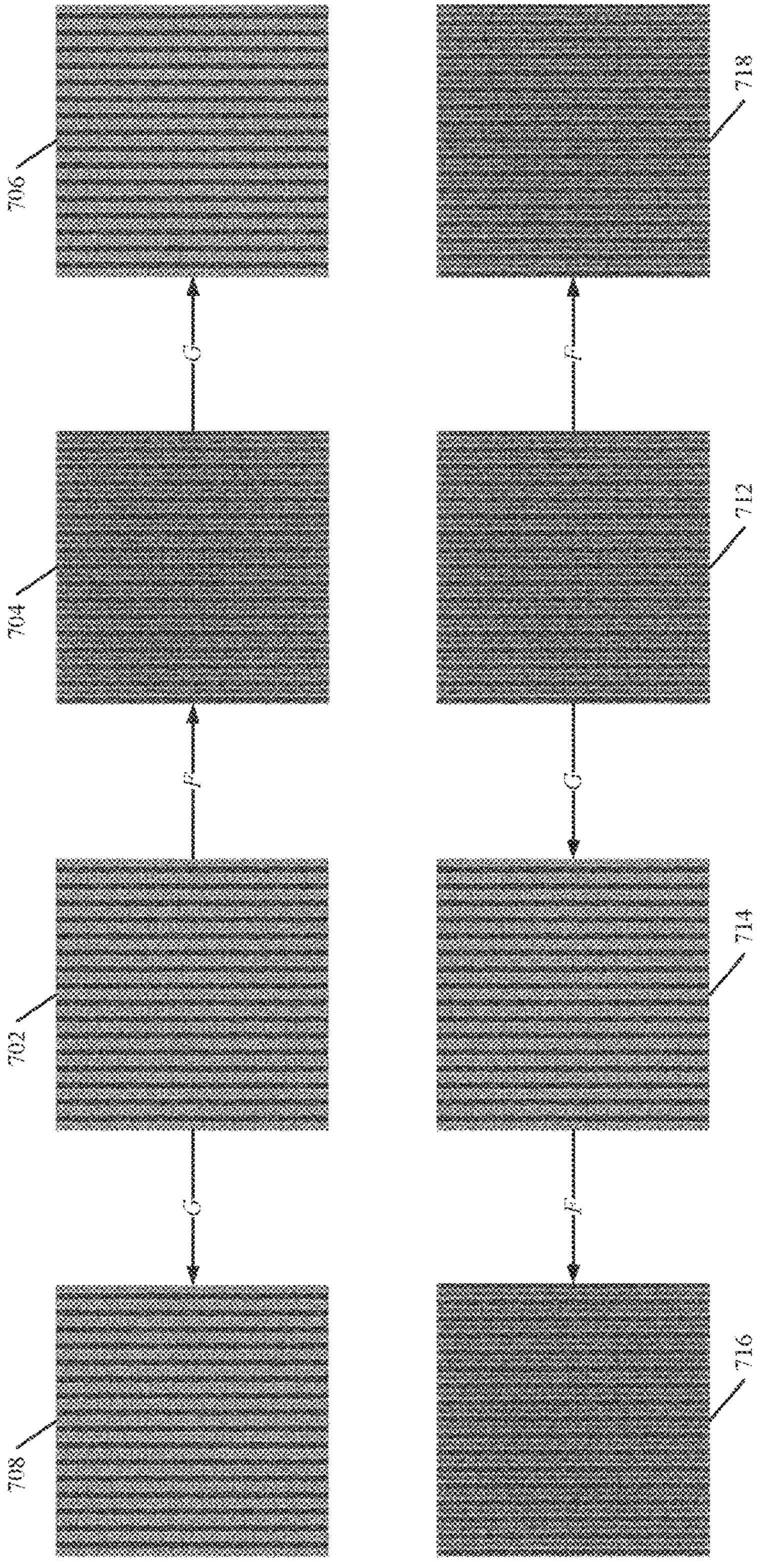
FIG. 7 is a schematic diagram illustrating an example application of losses in training a cycle-consistent generative adversarial network, consistent with some embodiments of the present disclosure.

By way of example, FIG. 7 is a schematic diagram illustrating an example application of losses in training a cycle-consistent GAN, consistent with some embodiments of the present disclosure. FIG. 7 illustrates an input simulation image 702 (e.g., a simulation image generated by a simulation technique that may simulate an image measured for a sample under inspection by a charged-particle inspection apparatus) in a target domain (e.g., a domain representing simulation) and an input non-simulation image 712 (e.g., an actual inspection image of the sample by the charged-particle inspection apparatus) in a source domain (e.g., a domain representing actual inspection or measurement). Image data of input simulation image 702 may be represented as y (e.g., the variable y as described in association with Eq. (1)), and image data of input non-simulation image 712 may be represented as x (e.g., the variable x as described in association with Eq. (1)). The cycle-consistent GAN may include a first generator (e.g., included in generator 610 of FIG. 6) that may convert image data to the target domain, which may be represented as G (e.g., the mapping G as described in association with Eq. (1)). The cycle-consistent GAN may also include a second generator (e.g., included in generator 610 of FIG. 6) that may convert image data to the source domain, which may be represented as F (e.g., the mapping F as described in association with Eq. (1)).

As illustrated in FIG. 7, the first generator of the cycle-consistent GAN may obtain input simulation image 702 and convert it to image 708 in the target domain by applying the mapping G. Image data of image 708 may be represented as G(y). Because input simulation image 702 and image 708 are both in the target domain, in an ideal case, G(y) may be indistinguishable from y. Such a same-domain mapping may be referred to as an identity mapping. During training of the cycle-consistent GAN, an identity mapping loss may be associated with the conversion y→G(y) for optimizing such an identity mapping. For example, the training of the cycle-consistent GAN may aim to minimize or maximize the identity mapping loss.

As illustrated in FIG. 7, the second generator of the cycle-consistent GAN may also receive input simulation image 702 and convert it to image 704 in the source domain by applying the mapping F, and the first generator of the cycle-consistent GAN may further receive image 704 and convert it to image 706 in the target domain by applying the mapping G again. Image data of image 704 may be represented as F(y), and image data of image 706 may be represented as G(F(y)). During training of the cycle-consistent GAN, an edge-preserving loss (e.g., $\mathcal{L}_{edge}(G,F)$ described in association with Eq. (1)) may be associated with the conversion y→F(y) for optimizing such a mapping, and a first cycle-consistency loss (e.g., a forward cycle-consistency loss) may be associated with the conversion y→F(y)→G(F(y)) for optimizing such a mapping. For example, the training of the cycle-consistent GAN may aim to minimize or maximize the edge-preserving loss and the first cycle-consistency loss. In an ideal case, if the cycle-consistent GAN is fully trained, a difference between first intensity gradients of input simulation image 702 and second intensity gradients of image 704 may be reduced or minimized, and input simulation image 702 (including image data y) may be indistinguishable from image 706 (including image data G(F(y))) because input simulation image 702 and image 706 are both in the target domain.

As illustrated in FIG. 7, the second generator of the cycle-consistent GAN may obtain input non-simulation image 712 (including image data x) and convert it to image 718 in the source domain by applying the mapping F. Image data of image 718 may be represented as F(x). Because input non-simulation image 712 and image 718 are both in the source domain, in an ideal case, F(x) may be indistinguishable from x. Such a same-domain mapping may be an identity mapping. During training of the cycle-consistent GAN, the identity mapping loss associated with the conversion y→G(y) may be further associated with the conversion x→F(x) for optimizing it. For example, the training of the cycle-consistent GAN may aim to minimize or maximize the identity mapping loss.

As illustrated in FIG. 7, the first generator of the cycle-consistent GAN may also receive input non-simulation image 712 and convert it to image 714 in the target domain by applying the mapping G. and the second generator of the cycle-consistent GAN may further receive image 714 and convert it to image 716 in the source domain by applying the mapping F again. Image data of image 714 may be represented as G(x), and image data of image 716 may be represented as F(G(x)). During training of the cycle-consistent GAN, the edge-preserving loss associated with the conversion y→F(y) may be further associated with the conversion x→G(x) for optimizing it, and a second cycle-consistency loss (e.g., a backward cycle-consistency loss) may be associated with the conversion x→G(x)→F(G(x)) for optimizing it. For example, the training of the cycle-consistent GAN may aim to minimize or maximize the edge-preserving loss and the second cycle-consistency loss. In an ideal case, if the cycle-consistent GAN is fully trained, a difference between first intensity gradients of input non-simulation image 712 and second intensity gradients of image 714 may be reduced or minimized, and input non-simulation image 712 (including image data x) may be indistinguishable from image 716 (including image data F(G(x))) because input non-simulation image 712 and image 716 are both in the source domain.

In addition to the identity mapping loss, the cycle-consistency loss, and the edge-preserving loss described in association with FIG. 7, during its training, the cycle-consistent GAN may further include a first discriminator and a second discriminator. For example, the first discriminator and the second discriminator may be included as a first part and a second part of discriminator 604 described in association with FIG. 6, respectively. The first discriminator may be used to determine whether first data (e.g., image data y of input simulation image 702) and second data (e.g., image data G(x) of image 714) in the target domain are indistinguishable from each other. The second discriminator may be used to determine whether third data (e.g., image data x of input non-simulation image 712) and fourth data (e.g., image data F(y) of image 704) in the source domain are indistinguishable from each other. During training of the cycle-consistent GAN, a first adversarial loss may be associated with the first discriminator for optimizing it, and a second adversarial loss may be associated with the second discriminator for optimizing it. For example, the training of the cycle-consistent GAN may aim to minimize or maximize the first adversarial loss and the second adversarial loss. In an ideal case, if the cycle-consistent GAN is fully trained, the first discriminator may have a 50% probability to fail to distinguish input simulation image 702 from image 714, and the second discriminator may have a 50% probability to fail to distinguish input non-simulation image 712 from image 704.

In some embodiments, a full loss of the cycle-consistent GAN as described in association with FIG. 7 may be a sum of the identity mapping loss, the first cycle-consistency loss, the second cycle-consistency loss, the edge-preserving loss, the first adversarial loss, and the second adversarial loss as described in association with FIG. 7. For example, the training of the cycle-consistent GAN may aim to minimize or maximize the full loss. In an ideal case, if the cycle-consistent GAN is fully trained, the first generator and the second generator of the cycle-consistent GAN as described in association with FIG. 7 may be provided to receive input images and generate domain-adapted images, in which image artifacts caused by a physics effect (e.g., a SCPM-induced charging effect or edge blooming) during inspection of a sample by a charged-particle inspection apparatus may be enhanced or attenuated in the input images.

In some embodiments, the first generator and the second generator of the cycle-consistent GAN described in association with FIG. 7 may be a first convolutional neural network (CNN) and a second CNN, respectively. By increasing or decreasing receptive fields of the first CNN and the second CNN, the first CNN and the second CNN may enhance or attenuate the above-described image artifacts in various length scales.

Consistent with some embodiments of this disclosure, the computer-implemented method for image analysis may further include obtaining (e.g., by a cycle-consistent GAN) an inspection image (e.g., an actual inspection image) of a sample generated by a charged-particle inspection apparatus. The inspection image may be a non-simulation image and may include an image artifact not representing a defect in the sample. For example, the image artifact may be caused by a physics effect (e.g., a SCPM-induced charging effect, an edge blooming effect, or the like) during inspection of the sample by the charged-particle inspection apparatus. In some embodiments, the image artifact may include at least one of asymmetry in edge blooming intensities of a line caused by the edge blooming effect or an intensity gradient caused by the charging effect. The method may further include generating, using the trained unsupervised (e.g., cycle-consistent) domain adaptation technique (e.g., using a generator of the cycle-consistent GAN), a domain-adapted image using the inspection image as an input. The domain-adapted image may attenuate the image artifact in the received inspection image. In an ideal case, the domain-adapted image may be indistinguishable from a simulation image associated with the sample.

Figure 8:
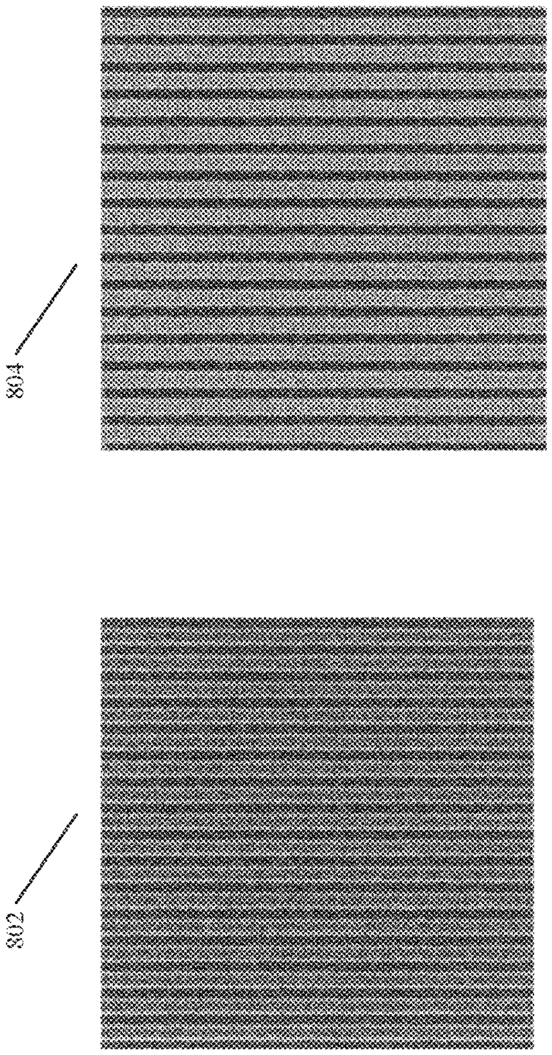
FIG. 8 is a diagram illustrating an example inspection image of an inspected sample and an example domain-adapted image generated based on the inspection image, consistent with some embodiments of the present disclosure.

By way of example, FIG. 8 is a diagram illustrating an example inspection image 802 of an inspected sample and an example domain-adapted image 804 generated based on the inspection image, consistent with some embodiments of the present disclosure. Inspection image 802 and domain-adapted image 804 may be similar to input non-simulation image 712 and image 714 described in association with FIG. 7, respectively. Domain-adapted image 804 may be generated by a trained unsupervised (e.g., cycle-consistent) domain adaptation technique (e.g., the first generator described in association with FIG. 7) that uses inspection image 802 as an input. As illustrated in FIG. 8, inspection image 802 includes image artifacts not representing actual defects in the sample, which may be similar to the image artifacts described in association with inspection image 404 in FIG. 4. Compared with inspection image 804, domain-adapted image 804 attenuates or removes those image artifacts.

Inspection image 802 and domain-adapted image 804 may enable various applications that may not be enabled by inspection image 802 itself. For example, domain-adapted image 804 may be compared with a simulation image of the sample (e.g., similar to input simulation image 702 described in association with FIG. 7) for more accurate defect detection or visual review because the image artifacts not representing actual defects in the sample may be removed or attenuated from inspection image 802. As another example, the trained unsupervised (e.g., cycle-consistent) domain adaptation technique may obtain a set of actual inspection images (e.g., historical inspection images or inspection images generated by a different beam tool) and convert them into a set of domain-adapted images. The set of domain-adapted images are similar to simulation images generated by a simulation technique. The set of actual inspection images and the set of domain-adapted images may be used for training a supervised machine learning model for image analysis (e.g., for image-based defect detection, 3D height profile extraction, or the like).

Consistent with some embodiments of this disclosure, the computer-implemented method for image analysis may further include obtaining (e.g., by the cycle-consistent GAN) a simulation image of a sample generated by a simulation technique that may generate graphical representations of inspection images. For example, the inspection images may be images generated by the charged-particle inspection apparatus inspecting the sample. The method may further include generating, using the trained unsupervised (e.g., cycle-consistent) domain adaptation technique (e.g., using another generator of the cycle-consistent GAN), a domain-adapted image using the simulation image as an input. The domain-adapted image may add or enhance an image artifact not representing a defect in the sample. For example, the image artifact may be caused by a physics effect (e.g., a SCPM-induced charging effect, an edge blooming effect, or the like) during inspection of the sample by the charged-particle inspection apparatus. In some embodiments, the image artifact may include at least one of asymmetry in edge blooming intensities of a line caused by the edge blooming effect or an intensity gradient caused by the charging effect. In an ideal case, the domain-adapted image may be indistinguishable from an inspection image of the sample.

Figure 9:
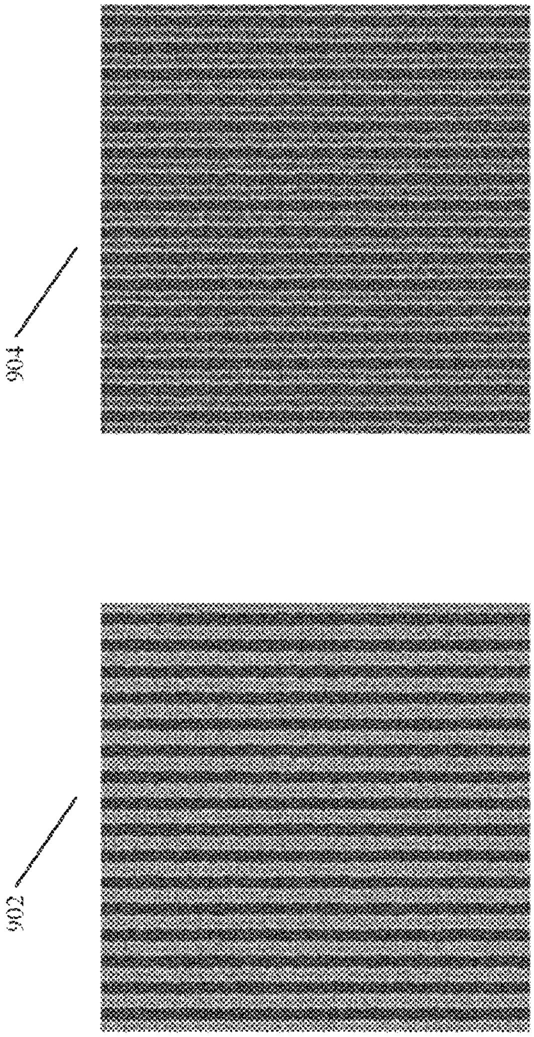
FIG. 9 is a diagram illustrating an example simulation image of an inspected sample and an example domain-adapted image generated based on the simulation image, consistent with some embodiments of the present disclosure.

By way of example, FIG. 9 is a diagram illustrating an example simulation image 902 of an inspected sample and an example domain-adapted image 904 generated based on the simulation image, consistent with some embodiments of the present disclosure. Simulation image 902 and domain-adapted image 904 may be similar to input simulation image 702 and image 704 described in association with FIG. 7, respectively. Domain-adapted image 904 may be generated by a trained unsupervised (e.g., cycle-consistent) domain adaptation technique (e.g., the second generator described in association with FIG. 7) that uses simulation image 902 as an input. As illustrated in FIG. 9, domain-adapted image 904 is more similar to an actual inspection image than simulation image 902 because it adds or enhances image artifacts not representing actual defects in the sample. For example, edge blooming (represented by white parts along line edges) in simulation image 902 is enhanced in domain-adapted image 904. As another example, in contrast to simulation image 902, the edge blooming in domain-adapted image 904 adds or enhances asymmetric intensities (represented by asymmetric brightness of the white parts by both sides of a line edge), which may be caused by a SCPM-induced charging effect. As a third example, domain-adapted image 904 adds or enhances an overall intensity gradient (represented by brightness gradient of the white parts of multiple line edges), which may be caused by the SEM-induced charging effect and other distortion sources.

Simulation image 902 and domain-adapted image 904 may enable various applications that may not be enabled by simulation image 902 itself. For example, by independently varying parameters for generating simulation image 902, a set of simulation images may be generated, and each of the set of simulation images may be converted to a corresponding domain-adapted images by the trained unsupervised (e.g., cycle-consistent) domain adaptation technique. Compared with existing techniques, the set of simulation images and the set of domain-adapted images may be used for more accurate systematic uncertainty studies because each parameter for generating simulation image 902 may be independently controlled, and added or enhanced image artifacts not representing actual defects in the sample may depend on each independently controlled parameter for generating simulation image 902.

As shown and described in FIGS. 8-9, the unsupervised (e.g., cycle-consistent) domain adaptation technique described herein may bidirectionally and reversibly convert images associated with a sample under inspection between a source domain and a target domain while keeping some image features unchanged before and after the domain adaptation. For example, such image features may include at least one of a type of geometric patterns (e.g., a line, an apex, an edge, a corner, a pitch, etc.), a distribution of geometric patterns, a characteristic of geometric patterns (e.g., a line width, a line structure, a line roughness, an edge placement, a pattern segmentation, etc.), a global image feature (e.g., at least one of color composition, gray level, brightness, contrast, saturation, or tint, etc.), or the like. In addition, based on the domain-adapted images converted by the unsupervised domain adaptation technique based on actual inspection images, 3D geometric features (e.g., a height profile map) of manufactured structures on a surface of a sample may be determined with higher accuracy.

Figure 10:
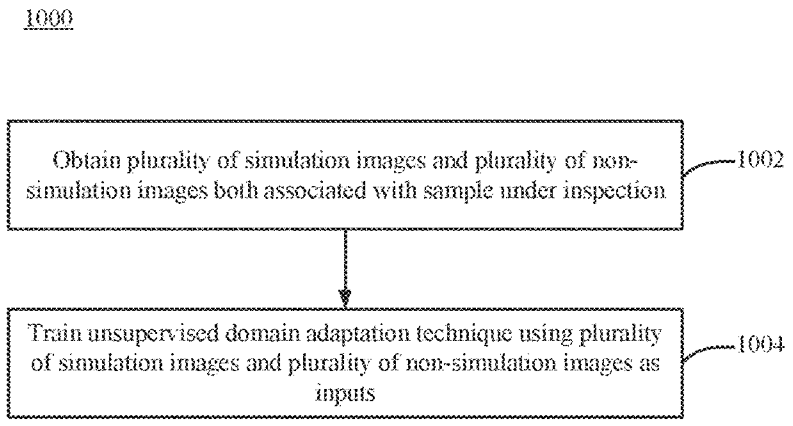
FIG. 10 is a flowchart illustrating an example method for image analysis, consistent with some embodiments of the present disclosure.

By way of example, FIG. 10 is a flowchart illustrating an example method 1000 for image analysis, consistent with some embodiments of the present disclosure. Method 1000 may be performed by a controller that may be coupled with a charged-particle beam tool (e.g., charged-particle beam inspection system 100) or an optical beam tool. For example, the controller may be controller 109 in FIG. 2. The controller may be programmed to implement method 1000.

At step 1002, the controller may obtain a plurality of simulation images (e.g., each being similar to simulation image 902 described in association with FIG. 9) and a plurality of non-simulation images (e.g., each being similar to inspection image 802 described in association with FIG. 8) both associated with a sample (e.g., a structure on wafer 203 in FIG. 2) under inspection. At least one of the plurality of simulation images is a simulation image of a location on the sample not imaged by any of the plurality of non-simulation images. In some embodiments, the plurality of non-simulation images may be generated by a charged-particle inspection apparatus (e.g., imaging system 200 in FIG. 2) inspecting the sample. The plurality of simulation images may be generated by a simulation technique (e.g., a Monte-Carlo based simulation for ray-tracing of individual charged particles) that may generate graphical representations of inspection images. For example, the inspection images may be images generated by the charged-particle inspection apparatus inspecting the sample.

In some embodiments, the plurality of non-simulation images may be generated by the charged-particle inspection apparatus using a plurality of parameter sets. Each of the plurality of non-simulation images may be generated using one of the plurality of parameter sets. At least one of the plurality of simulation images may be generated by the simulation technique using none of the plurality of parameter sets.

In some embodiments, the plurality of non-simulation images may include an image artifact (e.g., similar to the image artifacts described in association with inspection image 404 in FIG. 4) not representing a defect in the sample. The plurality of simulation images do not include the image artifact. For example, the image artifact may include at least one of an edge blooming effect including asymmetry or an intensity gradient exceeding a predetermined value.

In some embodiments, the plurality of non-simulation images may include a first geometric feature. The plurality of simulation images may include a second geometric feature different from the first geometric feature. A value representing similarity between the first geometric feature and the second geometric feature may be within a preset range.

At step 1004, the controller may train an unsupervised domain adaptation technique using the plurality of simulation images and the plurality of non-simulation images as inputs to reduce a difference between first intensity gradients of the plurality of simulation images and second intensity gradients of the plurality of non-simulation images. In some embodiments, the unsupervised domain adaptation technique may include a cycle-consistent generative adversarial network (e.g., a cycle-consistent GAN described in association with FIGS. 5-9).

In some embodiments, the unsupervised domain adaptation technique comprises a cycle-consistent domain adaptation technique. The cycle-consistent domain adaptation technique may include an edge-preserving loss (e.g., $\mathcal{L}_{edge}(G,F)$ described in association with Eq. (1)) for the training. The edge-preserving loss may be a sum of a first value and a second value. The first value may represent an average of geometry difference between a simulation image of the plurality of simulation images and a first domain-adapted image generated by the cycle-consistent domain adaptation technique using the simulation image as an input. For example, the first value may be the term $\mathbb{E}_{x \sim p_{data}(x)}[\|k(G(x))-k(x)\|_1]$ described in association with Eq. (1). The second value may represent an average of geometry difference between a non-simulation image of the plurality of non-simulation images and a second domain-adapted image generated by the cycle-consistent domain adaptation technique using the non-simulation image as an input. For example, the second value may be the term $\mathbb{E}_{y \sim p_{data}(y)}[\|k(F(y))-k(y)\|_1]$ described in association with Eq. (1).

In some embodiments, the cycle-consistent domain adaptation technique may further include at least one of an adversarial loss (e.g., including at least one of discriminator loss 606 or generator loss 614 described in association with FIG. 6), a cycle-consistency loss, or an identity mapping loss for the training. For example, the adversarial loss, the cycle-consistency loss (e.g., including at least one of a forward cycle-consistency loss or a backward cycle-consistency loss), or the identity mapping loss may be the adversarial loss, the cycle-consistency loss, or the identity mapping loss described in association with FIG. 7.

Consistent with some embodiments of this disclosure, besides performing steps 1002-1004, the controller may further receive (e.g., by the cycle-consistent GAN described in association with FIG. 7) an inspection image (e.g., input non-simulation image 712 described in association with FIG. 7) of a sample (e.g., a structure on wafer 203 in FIG. 2) generated by a charged-particle inspection apparatus (e.g., imaging system 200 in FIG. 2). The inspection image may be a non-simulation image and may include an image artifact not representing a defect in the sample. The controller may then generate, using the trained unsupervised domain adaptation technique (e.g., using the second generator of the cycle-consistent GAN described in association with FIG. 7), a first domain-adapted image (e.g., image 714 described in association with FIG. 7) using the inspection image as an input. The first domain-adapted image may attenuate the image artifact in the received inspection image. In an ideal case, the first domain-adapted image may be indistinguishable from a simulation image (e.g., input simulation image 702 described in association with FIG. 7) associated with the sample.

Consistent with some embodiments of this disclosure, besides performing steps 1002-1004, the controller may further receive (e.g., by the cycle-consistent GAN described in association with FIG. 7) a simulation image (e.g., input simulation image 702 described in association with FIG. 7) of a sample (e.g., a structure on wafer 203 in FIG. 2) generated by a simulation technique that may generate graphical representations of inspection images. For example, the inspection images may be images generated by a charged-particle inspection apparatus (e.g., imaging system 200 in FIG. 2) inspecting the sample. Then, the controller may generate, using the trained unsupervised domain adaptation technique (e.g., using the first generator described in association with FIG. 7), a second domain-adapted image (e.g., image 704 described in association with FIG. 7) using the simulation image as an input. The second domain-adapted image may add or enhance an image artifact not representing a defect in the sample. In an ideal case, the second domain-adapted image may be indistinguishable from an inspection image (e.g., input non-simulation image 712 described in association with FIG. 7) of the sample.

In some embodiments, the image artifact may be caused by a physics effect (e.g., a scanning charged-particle microscope induced charging effect, an edge blooming effect, or the like) during inspection of the sample by the charged-particle inspection apparatus. The physics effect may include at least one of an edge blooming effect or a charging effect. The image artifact may include at least one of asymmetry in edge blooming intensities of a line caused by the edge blooming effect or an intensity gradient caused by the charging effect.

Consistent with some embodiments of this disclosure, a computer-implemented method for critical dimension matching for a charged-particle inspection apparatus (e.g., a scanning charged-particle microscope) may include obtaining a set of reference inspection images for regions on a sample. Each of the set of reference inspection images may be associated with one of the regions. For example, the sample may be a wafer with manufactured semiconductor structures on its surface. In some embodiments, the semiconductor structures may be manufactured as a batch on divided regions of the surface of the sample. Each of the regions may be referred to as a die. For example, each of the set of reference inspection images may be an inspection image of a die on the surface of the sample.

In some embodiments, the set of reference inspection images may be determined using a process of record (POR) before obtaining the set of reference inspection images. For example, the process of record may include an inspection apparatus (e.g., the same as or different from the) and one or more predetermined operation parameters of the inspection apparatus. The inspection images generated by the inspection apparatus under the predetermined operation parameters may be used as the set of reference inspection images. By way of example, if the inspection apparatus is the charged-particle inspection apparatus itself, the set of reference inspection images may include historical inspection images generated at a previous time for the sample under inspection by the charged-particle inspection apparatus using the predetermined operation parameters. As another example, if the inspection apparatus is a different charged-particle inspection apparatus, the set of reference inspection images may include inspection images generated for the sample under inspection by the different charged-particle inspection apparatus using the predetermined operation parameters.

Consistent with some embodiments of this disclosure, the method for critical dimension matching may also include generating a set of inspection images of the sample using the charged-particle inspection apparatus to inspect the regions on the sample. For example, each of the set of inspection images may be an inspection image of the same die associated with one of the set of reference inspection images.

Consistent with some embodiments of this disclosure, the method for critical dimension matching may further include determining, based on the set of inspection images, a first set of inspection images for training a machine learning model. In some embodiments, to determine the first set of inspection images and the second set of inspection images, the method may include dividing, in a random manner, the set of inspection images into the first set of inspection images and a second set of inspection images. For example, the first set of inspection images may include a first percentage (e.g., 90%) of the set of inspection images, and the second set of inspection images may include a second percentage (e.g., 10%) of the set of inspection images.

In some embodiments, the machine learning model may include a generative adversarial network. By way of example, the GAN may be a cycle-consistent GAN (e.g., the GAN described in association with FIGS. 5-6) or an adversarial-consistency loss GAN (ACL-GAN). The ACL-GAN may obtain a source image in a source domain and generate an output image in a target domain, in which the output image may maintain image features of the source image. For example, compared with a generic GAN, an ACL-GAN may include an adversarial-consistency loss in its loss function for evaluating the level of maintaining the image features of the source image in the output image.

Consistent with some embodiments of this disclosure, the method for critical dimension matching may further include training the machine learning model using the set of reference inspection images and the first set of inspection images as inputs. The machine learning model may obtain an inspection image and output a predicted image. The predicted image may include a first image feature existing in the set of reference inspection images and a second image feature existing in the set of inspection images. The reference inspection image and the inspection image are both associated with one of the regions on the sample. For example, the inspection image may be generated using the charged-particle inspection apparatus to inspect a particular region (e.g., a particular die) on the sample. The reference image (e.g., included in the set of reference inspection images) may be generated using a process of record at the particular region.

In some embodiments, before training the machine learning model, the method for critical dimension matching may further include adjusting (e.g., by cropping), for each inspection image of the first set of inspection images, a field of view (FOV) of the inspection image to match a reference FOV associated with the set of reference inspection images. In some embodiments, the reference FOV may be determined using the process of record. For example, the process of record may include an inspection apparatus (e.g., the same as or different from the charged-particle inspection apparatus) and one or more predetermined operation parameters of the inspection apparatus. The predetermined operation parameters may include a FOV used by the inspection apparatus, which may be used as the reference FOV. In some embodiments, to adjust the FOV of the inspection image to match the reference FOV, the method for critical dimension matching may further include adjusting the FOV of the inspection image to cause the FOV of the inspection image and the reference FOV to include the same number of lines.

In some embodiments, the first image feature may include at least one of contrast or a noise distribution. In some embodiments, the second image feature may include at least one of a total number of lines in the inspection image, spacings between the lines, distortion at edges of the lines, shapes of the lines, a critical dimension determined from the inspection image, or a pitch determined from the inspection image. It is noted that, by adjusting the FOV of the inspection image to match the reference FOV, the reference FOV may be excluded from the first image feature.

In some embodiments, to cause the machine learning model (e.g., a cycle-consistent GAN) to output the predicted image that includes the first image feature and the second image feature, the machine learning model may include a critical dimension matching loss in its loss function for training. The critical dimension matching loss may represent an average difference between a critical dimension determined from the predicted image and a critical dimension determined from the received inspection image. By way of example, Equation (2) presents an example critical dimension matching loss $\mathcal{L}_{CDM}$:

$$\mathcal{L}_{CDM} = \|CD_{predicted} - CD_{reference}\| \quad \text{Eq. (2)}$$

In Equation (2), $CD_{predicted}$ represents a critical dimension determined from the predicted image. $CD_{reference}$ represents a critical dimension determined (e.g., using the POR) from the reference inspection image. $CD_{predicted}$ and $CD_{reference}$ may be represented as a scalar or a vector. The operation $\|v\|$ represents determining a norm (e.g., a Taxicab norm or a Manhattan norm) of a vector v or an absolute value of a scalar v.

In some embodiments, to cause the machine learning model (e.g., a cycle-consistent GAN) to output the predicted image that includes the first image feature and the second image feature, the machine learning model may include a noise distribution loss for its training. The noise distribution loss may represent an average difference between a noise distribution determined from the predicted image and a noise distribution determined from the reference inspection image. By way of example, Equation (3) presents an example noise distribution loss $\mathcal{L}_{ND}$:

$$\mathcal{L}_{ND} = \|ND_{predicted} - ND_{reference}\| \quad \text{Eq. (3)}$$

In Equation (3), $ND_{predicted}$ represents a noise distribution determined from the predicted image. $CD_{reference}$ represents a noise distribution determined (e.g., using the POR) from the reference inspection image. $CD_{predicted}$ and $CD_{reference}$ may be represented as a scalar or a vector. The operation $\|v\|$ represents determining a norm (e.g., a Taxicab norm or a Manhattan norm) of a vector v or an absolute value of a scalar v.

In some embodiments, a full loss function of the machine learning model (e.g., a cycle-consistent GAN) may include a sum of the critical dimension matching loss (e.g., $\mathcal{L}_{CDM}$ in Eq. (1)) and the noise distribution loss (e.g., $\mathcal{L}_{ND}$ in Eq. (2)). In some embodiments, the machine learning model may further include at least one of an adversarial loss, a cycle-consistency loss, or an identity mapping loss for the training. By way of example, the adversarial loss (e.g., including at least one of a discriminator loss or a generator loss), the cycle-consistency loss (e.g., including at least one of a forward cycle-consistency loss or a backward cycle-consistency loss), or the identity mapping loss may be the adversarial loss, the cycle-consistency loss, or the identity mapping loss described in association with FIG. 7.

By way of example, with reference to FIG. 6, if the machine learning model is a cycle-consistent GAN, the cycle-consistent GAN may include a first generator (e.g., the first generator included in generator 610 described in association with FIG. 6) for mapping data (e.g., images) from a source domain (e.g., actual inspection images) to a target domain (e.g., process of record images), and a second generator (e.g., the second generator included in generator 610 described in association with FIG. 6) for mapping data from the target domain to the source domain.

Consistent with some embodiments of this disclosure, the method for critical dimension matching may further include generating, using the trained machine learning model (e.g., using the first generator of the cycle-consistent GAN), a domain-adapted image using a particular inspection image of the second set of inspection images as an input. The domain-adapted image may include a third image feature existing in the set of reference inspection images and a fourth image feature existing in the particular inspection image.

Consistent with some embodiments of this disclosure, the method for critical dimension matching may further include generating, using the trained machine learning model (e.g., using the second generator of the cycle-consistent GAN), a domain-adapted image using a particular reference inspection image of the set of reference inspection images as an input. The domain-adapted image may include a fifth image feature existing in the second set of inspection images and a sixth image feature existing in the particular reference inspection image.

Figure 11:
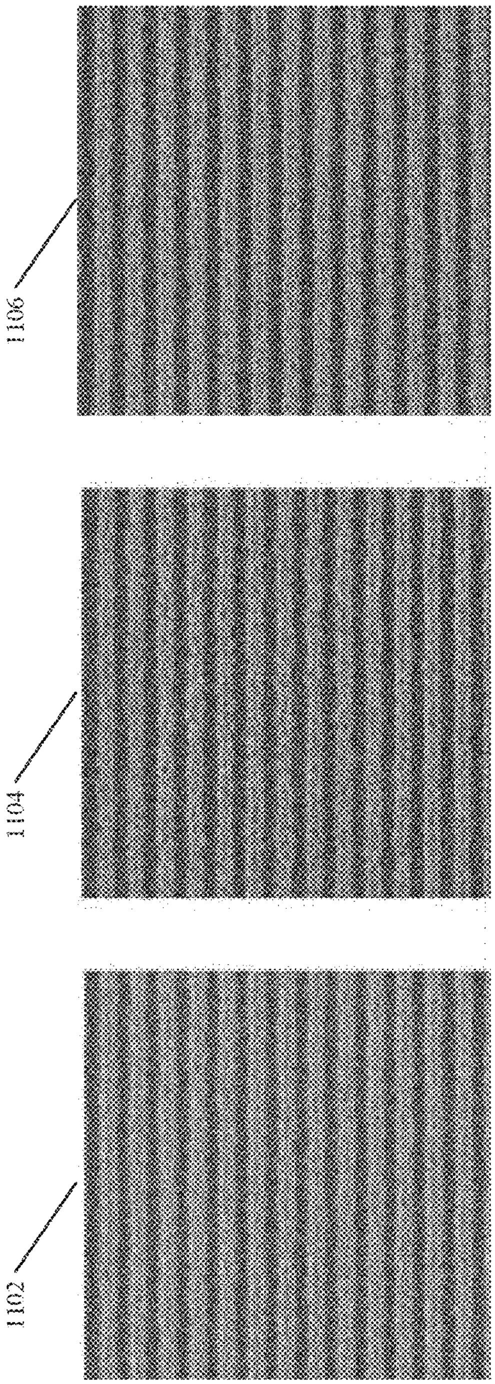
FIG. 11 is a diagram illustrating an example inspection image of a sample, an example reference inspection image associated with the sample, and an example processed image, consistent with some embodiments of the present disclosure.

By way of example, FIG. 11 is a diagram illustrating an example inspection image 1102 of a sample, an example reference inspection image 1106 associated with the sample, and an example processed image 1104, consistent with some embodiments of the present disclosure. For example, inspection image 1102 may be generated using the charged-particle inspection apparatus to inspect a region (e.g., a die) of the sample. Reference inspection image 1106 may be generated using a process of record for the region. Processed image 1104 may be generated by the trained machine learning model to receive inspection image 1102 as an input. As illustrated in FIG. 11, inspection image 1102 and reference inspection image 1106 include visual discrepancies in image features (e.g., image contrast, image brightness, noise distribution within image, etc.). Processed image 1104 may be more similar to reference inspection image 1106 because processed image 1104 includes the image features (e.g., image contrast, image brightness, noise distribution within image, or the like) in reference inspection image 1106. Also, processed image 1104 may still maintain image features (e.g., a total number of lines, spacings between the lines, distortion at edges of the lines, shapes of the lines, etc.) of inspection image 1102.

Figure 12:
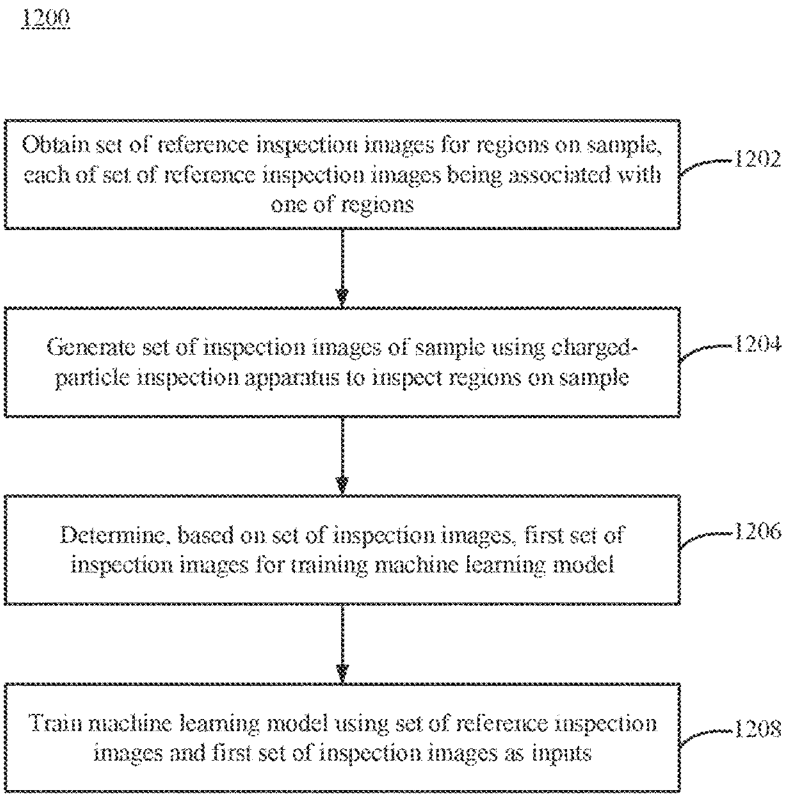
FIG. 12 is a flowchart illustrating an example method for critical dimension matching for a charged-particle inspection apparatus, consistent with some embodiments of the present disclosure.

FIG. 12 is a flowchart illustrating an example method 1200 for critical dimension matching for a charged-particle inspection apparatus (e.g., charged-particle beam inspection system 100 in FIG. 1 or imaging system 200 in FIG. 2), consistent with some embodiments of the present disclosure. Method 1200 may be performed by a controller that may be coupled with the charged-particle inspection apparatus. For example, the controller may be controller 109 in FIG. 2. The controller may be programmed to implement method 1200.

At step 1202, the controller may obtain a set of reference inspection images for regions (e.g., dies) on a sample (e.g., wafer 203 in FIG. 2). Each of the set of reference inspection images may be associated with one of the regions. In some embodiments, the controller may determine the set of reference inspection images using a process of record (POR) before step 1202.

At step 1204, the controller may generate a set of inspection images of the sample using the charged-particle inspection apparatus (e.g., charged-particle beam inspection system 100 in FIG. 1 or imaging system 200 in FIG. 2) to inspect the regions on the sample.

At step 1206, the controller may determine, based on the set of inspection images, a first set of inspection images for training a machine learning model. In some embodiments, the controller may divide, in a random manner, the set of inspection images into the first set of inspection images and a second set of inspection images. In some embodiments, the machine learning model may include a generative adversarial network (e.g., a cycle-consistent GAN described in association with FIGS. 5-6).

In some embodiments, the machine learning model may include a critical dimension matching loss for the training. The critical dimension matching loss may represent an average difference between a critical dimension determined from the predicted image and a critical dimension determined from a reference inspection image. The reference inspection image and the inspection image may be both associated with one of the regions on the sample. For example, the critical dimension matching loss may be the $\mathcal{L}_{CDM}$ described in association with Eq. (1).

In some embodiments, the machine learning model may include a noise distribution loss for the training. The noise distribution loss may represent an average difference between a noise distribution determined from the predicted image and a noise distribution determined from a reference inspection image. For example, the noise distribution loss may be the $\mathcal{L}_{ND}$ described in association with Eq. (2).

In some embodiments, the machine learning model may further include at least one of an adversarial loss, a cycle-consistency loss, or an identity mapping loss for the training.

At step 1208, the controller may train the machine learning model using the set of reference inspection images and the first set of inspection images as inputs. The machine learning model may obtain an inspection image (e.g., inspection image 1102 in FIG. 11) and output a predicted image. The predicted image may include a first image feature existing in the set of reference inspection images (e.g., including reference inspection image 1106 in FIG. 11) and a second image feature existing in the set of inspection images. In some embodiments, the first image feature may include at least one of contrast or a noise distribution. The second image feature may include at least one of a total number of lines in the inspection image, spacings between the lines, distortion at edges of the lines, shapes of the lines, a critical dimension determined from the inspection image, or a pitch determined from the inspection image.

In some embodiments, before training the machine learning model at step 1208, the controller may adjust, for each inspection image of the first set of inspection images, a field of view (FOV) of the inspection image to match a reference FOV associated with the set of reference inspection images. In some embodiments, the controller may determine the reference FOV using the process of record. In some embodiments, the controller may adjust the FOV of the inspection image to cause the FOV of the inspection image and the reference FOV to include the same number of lines.

Consistent with some embodiments of this disclosure, besides steps 1202-1208, the controller may further generate, using the trained machine learning model, a domain-adapted image (e.g., processed image 1104 in FIG. 11) using a particular inspection image (e.g., inspection image 1102 in FIG. 11) of the second set of inspection images as an input. The domain-adapted image may include a third image feature existing in the set of reference inspection images (e.g., including reference inspection image 1106 in FIG. 11) and a fourth image feature existing in the particular inspection image. In some embodiments, the third image feature may include at least one of contrast or a noise distribution. The fourth image feature may include at least one of a total number of lines in the inspection image, spacings between the lines, distortion at edges of the lines, shapes of the lines, a critical dimension determined from the inspection image, or a pitch determined from the inspection image.

Consistent with some embodiments of this disclosure, besides steps 1202-1208, the controller may further generate, using the trained machine learning model, a domain-adapted image (e.g., processed image 1104 in FIG. 11) using a particular reference inspection image (e.g., reference inspection image 1106 in FIG. 11) of the set of reference inspection images as an input. The domain-adapted image may include a fifth image feature existing in the second set of inspection images (e.g., including inspection image 1102 in FIG. 11) and a sixth image feature existing in the particular reference inspection image. In some embodiments, the fifth image feature may include at least one of a total number of lines in the inspection image, spacings between the lines, distortion at edges of the lines, shapes of the lines, a critical dimension determined from the inspection image, or a pitch determined from the inspection image. The six image feature may include at least one of contrast or a noise distribution.

Figure 13:
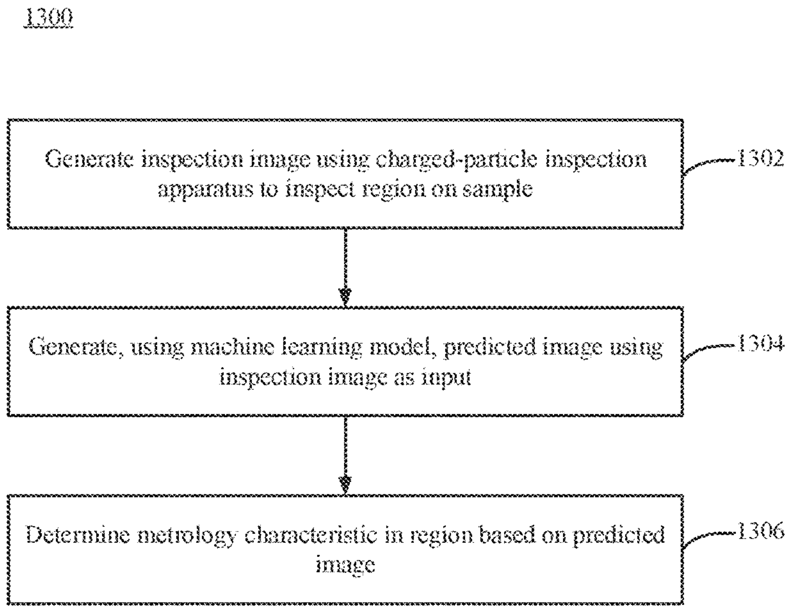
FIG. 13 is a flowchart illustrating another example method for critical dimension matching for a charged-particle inspection apparatus, consistent with some embodiments of the present disclosure.

FIG. 13 is a flowchart illustrating an example method 1300 for critical dimension matching for a charged-particle inspection apparatus (e.g., charged-particle beam inspection system 100 in FIG. 1 or imaging system 200 in FIG. 2), consistent with some embodiments of the present disclosure. Method 1300 may be performed by a controller that may be coupled with the charged-particle inspection apparatus. For example, the controller may be controller 109 in FIG. 2. The controller may be programmed to implement method 1300.

At step 1302, the controller may generate an inspection image (e.g., inspection image 1102 in FIG. 11) using the charged-particle inspection apparatus (e.g., charged-particle beam inspection system 100 in FIG. 1 or imaging system 200 in FIG. 2) to inspect a region (e.g., a die) on a sample (e.g., wafer 203 in FIG. 2).

At step 1304, the controller may generate, using a machine learning model, a predicted image (e.g., processed image 1104 in FIG. 11) using the inspection image as an input. In some embodiments, the machine learning model may include a generative adversarial network (e.g., a cycle-consistent GAN described in association with FIGS. 5-6).

At step 1306, the controller may determine a metrology characteristic in the region based on the predicted image. In some embodiments, accuracy of the metrology characteristic may be higher than accuracy of a metrology characteristic determined in the region based on the inspection image. In some embodiments, the metrology characteristic may include at least one of a critical dimension, an edge placement error, or an overlap.

Consistent with some embodiments of this disclosure, besides steps 1302-1306, the controller may further obtain a reference inspection image of the region and generate, using the machine learning model, a domain-adapted image (e.g., processed image 1104 in FIG. 11) using the reference inspection image (e.g., reference inspection image 1106 in FIG. 11) as an input. The domain-adapted image may include a first image feature existing in the reference inspection image and a second image feature existing in the inspection image (e.g., inspection image 1102 in FIG. 11). In some embodiments, the first image feature may include at least one of contrast or a noise distribution. The second image feature may include at least one of a total number of lines in the inspection image, spacings between the lines, distortion at edges of the lines, shapes of the lines, a critical dimension determined from the inspection image, or a pitch determined from the inspection image.

Consistent with some embodiments of this disclosure, besides steps 1302-1306, the controller may further obtain a set of reference inspection images for regions (e.g., dies) on the sample. Each of the set of reference inspection images may be associated with one of the regions. The controller may also generate a set of inspection images of the sample using the charged-particle inspection apparatus to inspect the regions on the sample. The controller may further determine, based on the set of inspection images, a first set of inspection images for training the machine learning model. For example, the controller may divide, in a random manner, the set of inspection images into the first set of inspection images and a second set of inspection images. The controller may further train the machine learning model using the set of reference inspection images and the first set of inspection images as inputs.

In some embodiments, before training the machine learning model, the controller may adjust, for each inspection image of the first set of inspection images, a field of view (FOV) of the inspection image to match a reference FOV associated with the set of reference inspection images. In some embodiments, the controller may adjust the FOV of the inspection image to cause the FOV of the inspection image and the reference FOV to include the same number of lines. In some embodiments, the controller may determine the set of reference inspection images using a process of record (POR), and determine the reference FOV using the process of record.

In some embodiments, the machine learning model may include a critical dimension matching loss for the training. The critical dimension matching loss may represent an average difference between a critical dimension determined from the predicted image and a critical dimension determined from a reference inspection image. The reference inspection image and the inspection image may be both associated with one of the regions on the sample. For example, the critical dimension matching loss may be the $\mathcal{L}_{CDM}$ described in association with Eq. (1).

In some embodiments, the machine learning model may include a noise distribution loss for the training. The noise distribution loss may represent an average difference between a noise distribution determined from the predicted image and a noise distribution determined from a reference inspection image. For example, the noise distribution loss may be the $\mathcal{L}_{ND}$ described in association with Eq. (2). In some embodiments, the machine learning model may further include at least one of an adversarial loss, a cycle-consistency loss, or an identity mapping loss for the training.

According to some embodiments of the present disclosure, a trained unsupervised domain adaptation technique (e.g., a cycle-consistent GAN described in association with FIGS. 5-9) can be combined with subsequent tasks such as height prediction, surface prediction, side wall angle prediction, semantic segmentation, contour detection, etc. In some embodiments, the unsupervised domain adaptation technique described herein may bidirectionally and reversibly convert images associated with a sample(s) under inspection between a source domain and a target domain while keeping some features unchanged before and after the domain adaption. In some embodiments, the trained unsupervised domain adaptation technique may obtain a set of actual inspection images (e.g., historical inspection images or inspection images generated by a different beam tool) and convert them into a set of domain-adapted images. The set of domain-adapted images are similar to simulation images generated by a simulation technique. The set of actual inspection images and the set of domain-adapted images may be used for training a supervised machine learning model for image analysis (e.g., for image-based defect detection, 3D height profile extraction, or the like).

While the unsupervised domain adaptation technique can be trained to learn a mapping between two different domains without paired data for translating inputted data from a source domain to a target domain, accuracy of the learned mapping is not guaranteed. For example, valuable topological information could be lost when converting inputted data from a source domain to a target domain. For example, height information of an inspection image may be lost when the inspection image is converted to a domain-adapted image (e.g., looking like a simulation image) as some height information may be entangled with physical effects (e.g., a charging effect or edge blooming) that are removed when translating the inspection image to a domain-adapted image by the unsupervised domain adaptation technique.

According to some embodiments of the present disclosure, a trained unsupervised domain adaptation technique (e.g., a cycle-consistent GAN described in association with FIGS. 5-9) can be utilized in training a machine learning model for performing subsequent tasks such as height prediction, surface prediction, side wall angle prediction, semantic segmentation, contour detection, etc. According to some embodiments of the present disclosure, a machine learning model training mechanism that can compensate topological information lost when translating inputted data from a source domain to a target domain by the domain adaptation technique can be provided. According to some embodiments of the present disclosure, topological information lost when converting an inspection image to a domain-adapted image by the unsupervised domain adaptation technique can be compensated when training a machine learning model for performing subsequent tasks such as height prediction, surface prediction, side wall angle prediction, semantic segmentation, contour detection, etc. According to some embodiments of the present disclosure, a neural network configured to receive an inspection image as an input and configured to generate surface estimation data corresponding to the input inspection image can be trained based on the unsupervised domain adaptation technique.

Figure 14A:
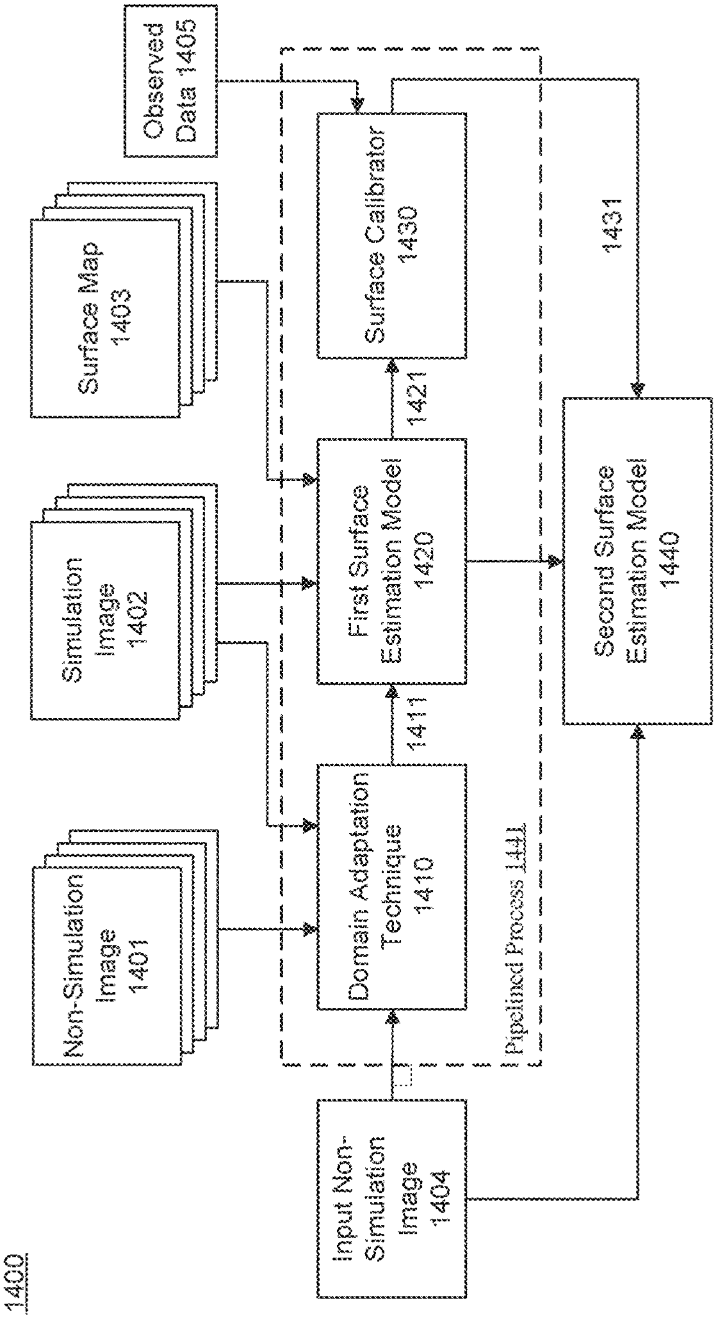
FIG. 14A is a block diagram of an example training system of a surface estimation model based on domain adaptation technique, consistent with some embodiments of the present disclosure.

FIG. 14A is a block diagram of an example training system of a surface estimation model based on a domain adaptation technique, consistent with some embodiments of the present disclosure. It is appreciated that in various embodiments, training system 1400 may be part of or may be separate from a charged particle beam inspection system (e.g., electron beam inspection system 100 of FIG. 1). In some embodiments, training system 1400 may be part of, for example, controller 109 or part of other modules of FIGS. 1 and 2.

Figure 14B:
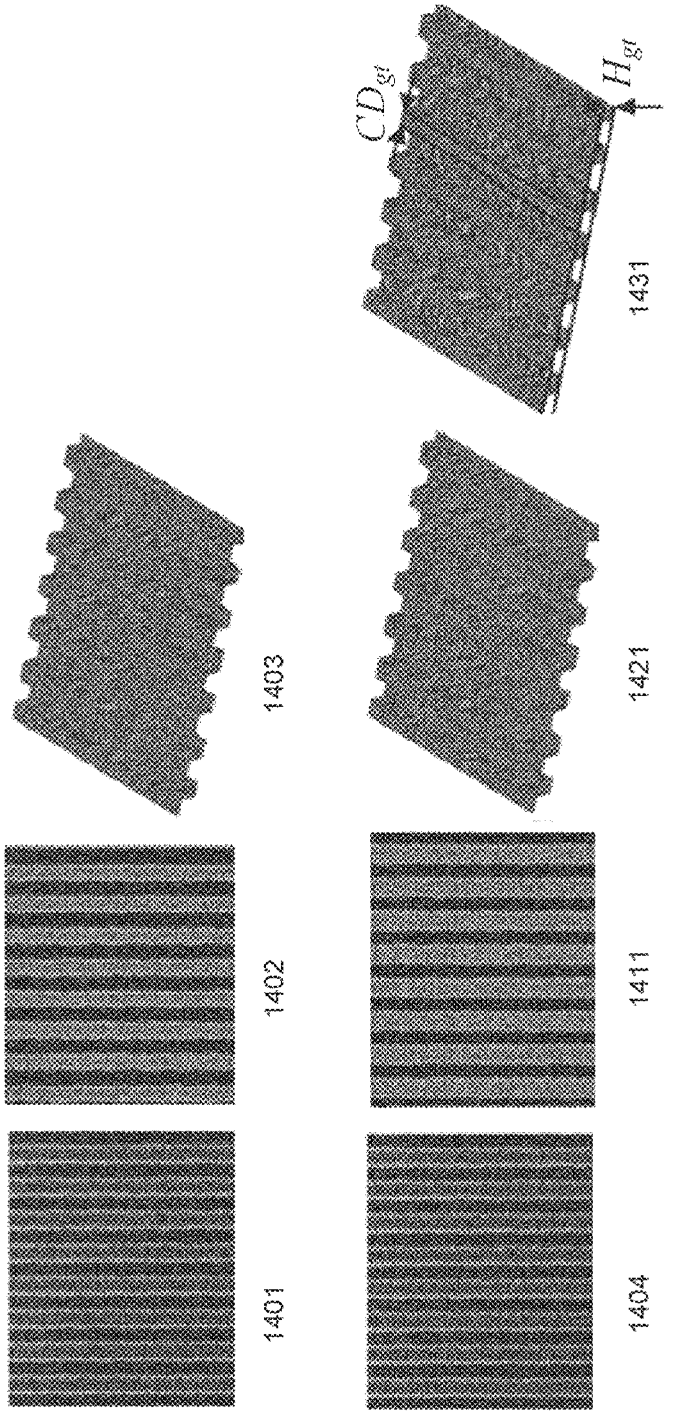
FIG. 14B is a diagram illustrating images that are used or generated in a training system, consistent with some embodiments of the present disclosure.

In some embodiments, training system 1400 can include a domain adaptation technique 1410, a first surface estimation model 1420, a surface calibrator 1430, and a second surface estimation model 1440. In some embodiments, training system 1400 can further include a plurality of non-simulation images 1401, a plurality of simulation images 1402, a plurality of surface maps 1403, an input non-simulation image 1404, and observed data 1405. FIG. 14B illustrates images that are used or generated in a training system during training, consistent with some embodiments of the present disclosure.

According to some embodiments of the present disclosure, domain adaptation technique 1410 can be a cycle-consistent generative adversarial network (e.g., a cycle-consistent GAN described in association with FIGS. 5-9). In some embodiments, domain adaptation technique 1410 can be trained based on a plurality of non-simulation images 1401 and a plurality of simulation images 1402. Non-simulation images 1401 can be similar to inspection image 802 described in association with FIG. 8. Simulation images 1402 can be similar to simulation image 902 described in association with FIG. 9. In some embodiments, domain adaptation technique 1410 can be trained according to method 1000 for image analysis illustrated in association with FIG. 10, and thus detailed explanations for training domain adaptation technique 1410 will be omitted here.

According to some embodiments of the present disclosure, first surface estimation model 1420 can be trained to generate predicted surface estimation data based on input data. In some embodiments, first surface estimation model 1420 can be trained based on a plurality of simulation images 1402 and a plurality of surface maps 1403. While the same reference number 1402 is used for a plurality of simulation images for training domain adaptation technique 1410 and for training first surface estimation model 1420, it should be appreciated that a set of simulation images for training first surface estimation model 1420 can be different from a set of simulation images for training domain adaptation technique 1410. In some embodiments, a set of simulation images for training first surface estimation model 1420 and a set of simulation images for training domain adaptation technique 1410 can at least partially overlap with each other.

In some embodiments, a plurality of surface maps 1403 can be associated with a plurality of simulation images 1402 for training first surface estimation model 1420. For example, surface map 1403 can be paired with corresponding simulation image 1402 for training first surface estimation model 1420. In some embodiments, surface map 1403 can be a simulated image that represents 3D geometric features corresponding to paired simulation image 1402. As shown in FIG. 14B, surface map 1403 can be a simulated 3D image while paired simulation image 1402 is a simulated 2D image. In some embodiments, surface map 1403 can be a simulated 3D image of structure(s) that are used for generating corresponding simulation image 1402. In some embodiments, geometric features represented by surface map 1403 can include a shape, a size, a side wall angle, a relative position, a material, a texture, or a depth related parameter associated with each layer or structure. The 3D simulation image may be generated by a simulation technique for simulating graphical representations of structures that are used for generating corresponding 2D simulation image. The 3D simulation image can be generated via a Monte-Carlo based technique.

According to some embodiments, first surface estimation model 1420 can be a convolutional neural network (CNN). For example, first surface estimation model 1420 can have an encoder-decoder architecture, U-net architecture, Res-net architecture, etc. Consistent with some embodiments of the present disclosure, first surface estimation model 1420 can be trained using paired simulation image 1402 and surface map 1403 under supervised learning. In some embodiments, training of first surface estimation model 1420 can be performed for a plurality of pairs of simulation image 1402 and corresponding surface map 1403. During training, first surface estimation model 1420 can obtain simulation image 1402 as an input and predict surface estimation data (e.g., in a surface map format similar to surface map 1403). The predicted surface estimation data can be compared with surface map 1403 that is paired with the input simulation image 1402. Based on the comparison, one or more parameters (e.g., weights or biases) of one or more layers of a neural network included in first surface estimation model 1420 can be adjusted so that the predicted surface estimation data matches paired surface map 1403. In some embodiments, a difference between the predicted surface estimation data and paired surface map 1403 can be computed. During training of first surface estimation model 1420, parameters (e.g., weights or biases) of first surface estimation model 1420 can be modified so that the difference between predicted surface estimation data and paired surface map 1403 is reduced. In some embodiments, the training process may terminate when the difference cannot be further reduced in subsequent iterations or when the number of iterations reaches a predetermined number. Once the training process ends, the trained first surface estimation model 1420 can be used to predict surface estimation data corresponding to an input image.

According to some embodiments of the present disclosure, second surface estimation model 1440 can be trained to generate predicted surface map based on an input inspection image. To train second surface estimation model 1440, a pipelined process 1441 can be performed consistent with some embodiments of the present disclosure. In some embodiments, pipelined process 1441 can utilize trained domain adaptation technique 1410 and trained first surface estimation model 1420. In some embodiments, pipelined process 1441 can further include surface calibrator 1430.

According to some embodiments of the present disclosure, during pipelined process 1441, trained domain adaptation technique 1410 is configured to receive input non-simulation image 1404 and to predict a domain-adapted image 1411, which looks like a simulation image. Input non-simulation image 1404 may be similar to inspection image 802 described in association with FIG. 8, and domain-adapted image 1411 may be similar to domain-adapted image 804 described in association with FIG. 8. As shown in FIG. 14B, domain-adapted image 1411 has a look similar to a simulation image corresponding to input non-simulation image 1404 and attenuates or removes some image artifacts of input non-simulation image 1404.

According to some embodiments of the present disclosure, during pipelined process 1441, trained first surface estimation model 1420 is configured to receive domain-adapted image 1411, which is predicted by domain adaptation technique 1410, and to generate predicted surface estimation data 1421. As first surface estimation model 1420 is trained to predict surface estimation data using simulation image 1402 as an input during training, trained first surface estimation model 1420 can be used to perform prediction using domain-adapted image 1411 as an input because domain-adapted image 1411 has distributions or representations in a domain of a simulation image. As shown in FIG. 14B, predicted surface estimation data 1421 can represent predicted 3D geometric features corresponding to domain-adapted image 1411 and can have a format similar to that of surface map 1403, which is used to train first surface estimation model 1420.

As some topological information of interest can be lost when translating input non-simulating image 1404 to domain-adapted image 1411, precited surface estimation data 1421 generated by first surface estimation model 1420 using domain-adapted image 1411 as an input may not have corresponding topological information. According to some embodiments of the present disclosure, predicted surface estimation data 1421 can be calibrated to compensate inaccurate topological information of predicted surface estimation data. According to some embodiments of the present disclosure, surface calibrator 1430 can be configured to receive predicted surface estimation data 1421 and to calibrate predicted surface estimation data 1421 using observed data 1405.

In some embodiments, observed data 1405 is paired with input non-simulation image 1404 and is measured data of structure(s) of a sample, which is measured by input non-simulation image 1404. In some embodiments, observed data 1405 can be obtained from one or more metrology tools. The metrology tool can be an optical metrology tool configured to measure structure(s) of the patterned substrate and extract depth information based on diffraction-based measurements of the patterned substrate, an atomic force microscope (AFM), or a transmission electron microscopy (TEM). For example, observed data 1405 comprises height profile of the structure(s) captured by an atomic force microscope tool, or shape parameter data captured by an optical scatterometry tool (e.g., Yieldstar). In some embodiments, the metrology tool can be an optical metrology tool configured to measure structure(s) of the patterned substrate and extract depth information based on diffraction-based measurement of the patterned substrate.

In some embodiments, observed data 1405 can include one-dimensional height data of the structure traced from input non-simulation image 1404. For example, one-dimensional height data includes height profile of the structure(s) along a cut line. In some embodiments, observed data 1405 can include two-dimensional height data of the structure(s) traced from input non-simulation image 1404. For example, two-dimensional height data comprises height data of the structure(s) along a first direction and a second direction. In some embodiments, observed data 1405 can include shape parameters obtained from the optical metrology tool used to measure structure(s) of the patterned substrate. For example, shape parameters comprise one or more of a top critical distance (CD) measured at a top of the structure(s), a bottom critical distance measured at a bottom of the structure(s), a side wall angle of the structure(s), etc.

According to some embodiments of the present disclosure, predicted surface estimation data 1421 by first surface prediction model 1420 can be calibrated based on observed data 1405. Predicted surface estimation data 1421 is adjusted by comparing predicted surface estimation data 1421 and observed data 1405. In some embodiments, adjusting of predicted estimation data 1421 can include: extracting, from predicted surface estimation data 1421, one dimensional height profile of the structure(s) along a given direction; comparing the predicted height profile with one dimensional height profile of observed data 1405 of the structure(s) along the given direction; and modifying the predicted height profile to match the height profile of observed data 1405 of the structure(s).

In some embodiments, adjusting of predicted surface estimation data 1421 can include: extracting predicted shape parameters of the structure(s) from predicted surface map 1421, and real shape parameters from observed data 1405; comparing the predicted shape parameters with the real shape parameters of the structure(s); and modifying the predicted shape parameters to match the real shape parameters.

In some embodiments, adjusting of predicted surface map 1421 can include: deriving a predicted average height of the structure(s) from predicted surface estimation data 1421 of the structure(s), and a real average height of the structure(s) from observed data 1405; and scaling the predicted average height to match the real average height. For example, a scaling factor can be a ratio of an average height computed from the predicted surface estimation data 1421 and an average height obtained from the optical scatterometry tool (e.g., Yieldstar). While pipelined process 1441 is explained for one cycle using one pair of input non-simulation image 1404 and output calibrated surface map 1431, it will be appreciated that pipelined process 1441 can be performed for a plurality of cycles for a plurality of pairs of input non-simulation images 1404 and output calibrated surface maps 1431. FIG. 14B shows that a height (e.g., $H_{gt}$) and a top critical dimension (e.g., $CD_{gt}$) of the structure(s) are adjusted from predicted surface estimation data 1421 based on observed data 1405. While compensating some example topological information (e.g., height or depth data or shape parameters) is described, it will be appreciated that any inaccurate topological information of predicted surface estimation data 1421 (e.g., caused by domain adaptation technique 1410) can be compensated using observed data 1405 by surface calibrator 1430.

According to some embodiments, second surface estimation model 1440 can be a convolutional neural network (CNN). For example, second surface estimation model 1440 can have an encoder-decoder architecture, U-net architecture, Res-net architecture, etc. According to some embodiments of the present disclosure, second surface estimation model 1440 can be trained using input data and output data of pipelined process 1441. In some embodiments, second surface estimation model 1440 can be trained using paired input non-simulation image 1404 and calibrated surface map 1431 under supervised learning. In some embodiments, training of second surface estimation model 1440 can be performed for a plurality of pairs of input non-simulation image 1404 and corresponding calibrated surface map 1431. During training, second surface estimation model 1440 can obtain input non-simulation image 1404 as an input and predict surface estimation data (e.g., in a surface map format similar to surface map 1403). The predicted surface estimation data can be compared with calibrated surface map 1431 that is paired with the input non-simulation image 1404. Based on the comparison, one or more parameters (e.g., weights or biases) of one or more layers of a neural network included in second surface estimation model 1440 can be adjusted so that the predicted surface estimation data matches paired calibrated surface map 1431. In some embodiments, a difference between the predicted surface estimation data and paired calibrated surface map 1431 can be computed. During training of second surface estimation model 1440, parameters (e.g., weights or biases) of second surface estimation model 1440 can be modified so that the difference between predicted surface estimation data and paired calibrated surface map 1431 is reduced. In some embodiments, the training process may terminate when the difference cannot be further reduced in subsequent iterations or when the number of iterations reaches a predetermined threshold. Once the training process ends, the trained second surface estimation model 1440 can be used to predict surface estimation data directly from an input non-simulation image.

In some embodiments, second surface estimation model 1440 is set to have parameters of trained first surface estimation model 1420 at the outset of training second surface estimation model 1440. In some embodiments, by utilizing parameters (e.g., weights) of a neural network included in trained first surface estimation model 1420 as initial weights of second surface estimation model 1440, training time of second surface estimation model 1440 can be reduced and even prediction performance of second surface estimation model 1440 can be improved. In some embodiments, second surface estimation model 1440 is trained to predict surface maps directly from inspection images while first surface estimation model 1420 is trained to predict surface maps from simulation images 1402. Therefore, even when parameters of trained first surface estimation model 1420 are used as parameters of second surface estimation model 1440, second surface estimation model 1440 can be further trained to properly predict surface maps using inspection images as inputs. While training second surface estimation model 1440, parameters (e.g., weights or biases) of second surface estimation model 1440 can be adjusted to cause second surface estimation model 1440 to accurately predict surface estimation dada corresponding to an input inspection image.

Figure 15A:
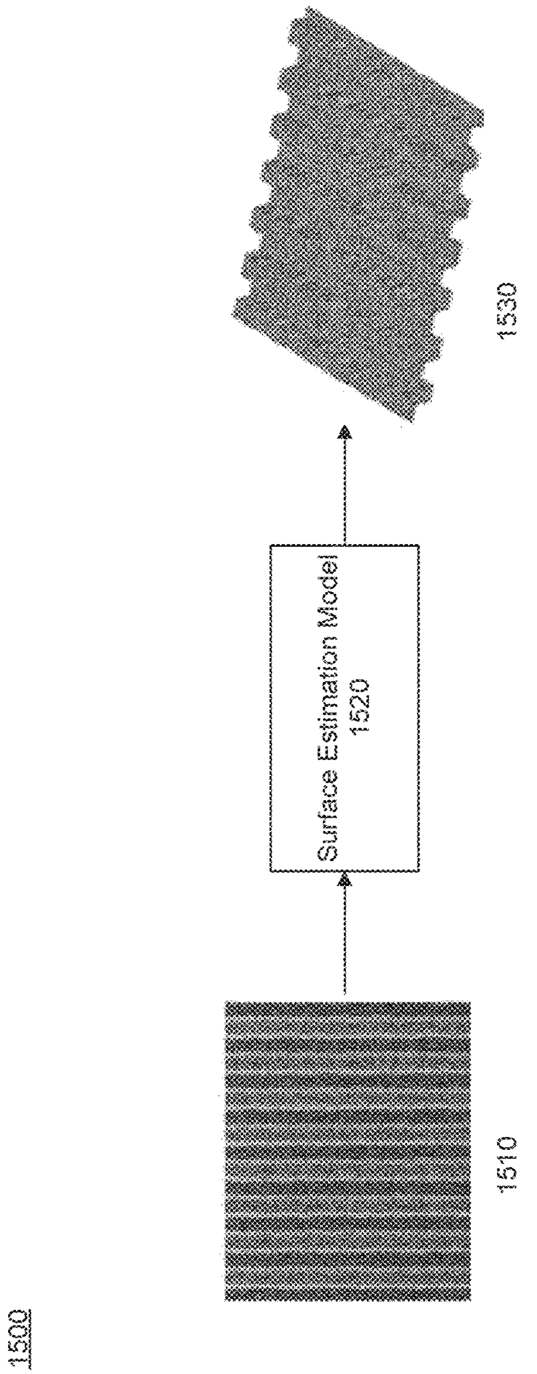
FIG. 15A is a block diagram of an example surface estimation system, consistent with some embodiments of the present disclosure.

FIG. 15A is a block diagram of an example surface estimation system, consistent with some embodiments of the present disclosure. According to some embodiments of the present disclosure, surface estimation system 1500 can include a surface estimation model 1520. In some embodiments, surface estimation model 1520 is trained second surface estimation model 1440 by training system 1400, which is described in association with FIG. 14A.

According to some embodiments of the present disclosure, surface estimation model 1520 is configured to receive an inspection image 1510 as an input and to generate predicted surface estimation data 1530. In some embodiments, inspection image 1510 can be similar to inspection image 802 described in association with FIG. 8. As shown in FIG. 15A, surface estimation model 1520 is configured to predict surface estimation data directly from an inspection image. By training one network (e.g., surface estimation model 1520) to directly map between an inspection image and a surface map that is calibrated by observed real data, the trained network can predict surface estimation data from an inspection image without loss of topological information caused by a domain adaptation technique (e.g., domain adaptation technique 410). According to some embodiments of the present disclosure, prediction performance of surface estimation model 1520 can be improved, which will be described with respect to FIGS. 16A to 17C. For example, surface estimation model 1520 consistent with some embodiments of the present disclosure shows improvement in surface estimation compared to a two-step surface estimation system using a domain adaptation technique.

Figure 15B:
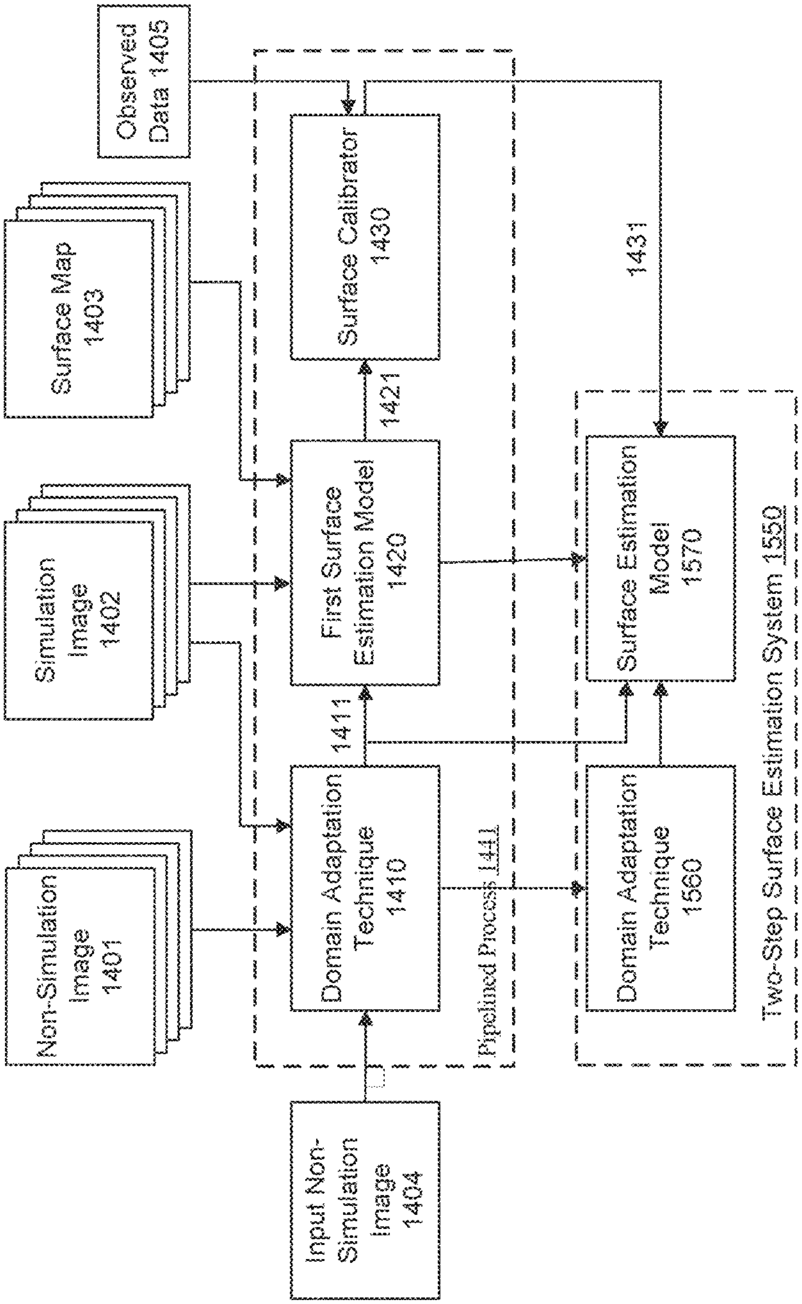
FIG. 15B is a block diagram of a two-step surface estimation system.

FIG. 15B is a block diagram of a two-step surface estimation system 1550 using a domain adaptation technique. FIG. 15B illustrates two-step surface estimation system 1550 in a training system, which is similar to training system 1400 of FIG. 14B. The same numbers in FIG. 14A and FIG. 15B represent the same or similar elements unless otherwise explained or represented. Descriptions of the same training processes that are described with respect to FIG. 14A will be omitted here. As shown in FIG. 15B, two-step surface estimation system 1550 replaces second surface estimation model 1440 in FIG. 14A and includes a domain adaptation technique 1560 and surface estimation model 1570. In this implementation, domain adaptation technique 1560 can be trained domain adaptation technique 1410 described in association with FIG. 14B.

In FIG. 15B, surface estimation model 1570 can be a convolutional neural network (CNN). For example, surface estimation model 1570 can have an encoder-decoder architecture, U-net architecture, Res-net architecture, etc. Surface estimation model 1570 can be trained using paired domain-adapted image 1411 and calibrated surface map 1431 under supervised learning. In some embodiments, training of surface estimation model 1570 can be performed for a plurality of pairs of domain-adapted image 1411 and corresponding calibrated surface map 1431. During training, surface estimation model 1570 can obtain domain-adapted image 1411 that is generated by domain adaptation technique 1410 using input non-simulation image 1404 as an input and can predict surface estimation data (e.g., in a surface map format similar to surface map 1403). The predicted surface estimation data can be compared with calibrated surface map 1431 that is paired with domain-adapted image 1411 and corresponds to input non-simulation image 1404. Based on the comparison, one or more parameters (e.g., weights or biases) of one or more layers of a neural network included in surface estimation model 1570 can be adjusted so that the predicted surface estimation data matches paired calibrated surface map 1431. A difference between the predicted surface estimation data and paired calibrated surface map 1431 can be computed. During training of surface estimation model 1570, parameters (e.g., weights or biases) of surface estimation model 1570 can be modified so that the difference between predicted surface estimation data and paired calibrated surface map 1431 is reduced. In some embodiments, the training process may terminate when the difference cannot be further reduced in subsequent iterations or when the number of iterations reaches a predetermined threshold. After the training process ends, the trained surface estimation model 1570 can be used to predict surface estimation data from a domain-adapted image that is generated by trained domain adaptation technique 1560 using an inspection image as an input.

In this implementation, surface estimation model 1570 is set to have parameters of trained first surface estimation model 1420 at the outset of training surface estimation model 1440. For example, weights of a neural network included in trained first surface estimation model 1420 can be utilized as initial weights of surface estimation model 1570 for training surface estimation model 1570. Here, surface estimation model 1570 is trained to predict calibrated surface estimation data (e.g., corresponding to calibrated surface maps 1431) while first surface estimation model 1420 is trained to predict surface maps without calibration. Therefore, surface estimation model 1570 can be further trained to properly predict calibrated surface maps using domain-adapted images as inputs.

As shown in FIG. 15B, trained domain adaptation technique 1560 and trained surface estimation model 1570 can be utilized to predict surface estimation data by inputting an inspection image as an input to two-step surface estimation system 1550. During an inference phase, trained domain adaptation technique 1560 is configured to receive an inspection image (e.g., inspection image 802 of FIG. 8) and to generate a domain-adapted image (e.g., domain-adapted image 804 of FIG. 8). In turn, surface estimation model 1570 is configured to receive the domain-adapted image generated by trained domain adaptation technique 1560 and to generate surface estimation data corresponding to the domain-adapted image generated by trained domain adaptation technique 1560.

Figure 16A:
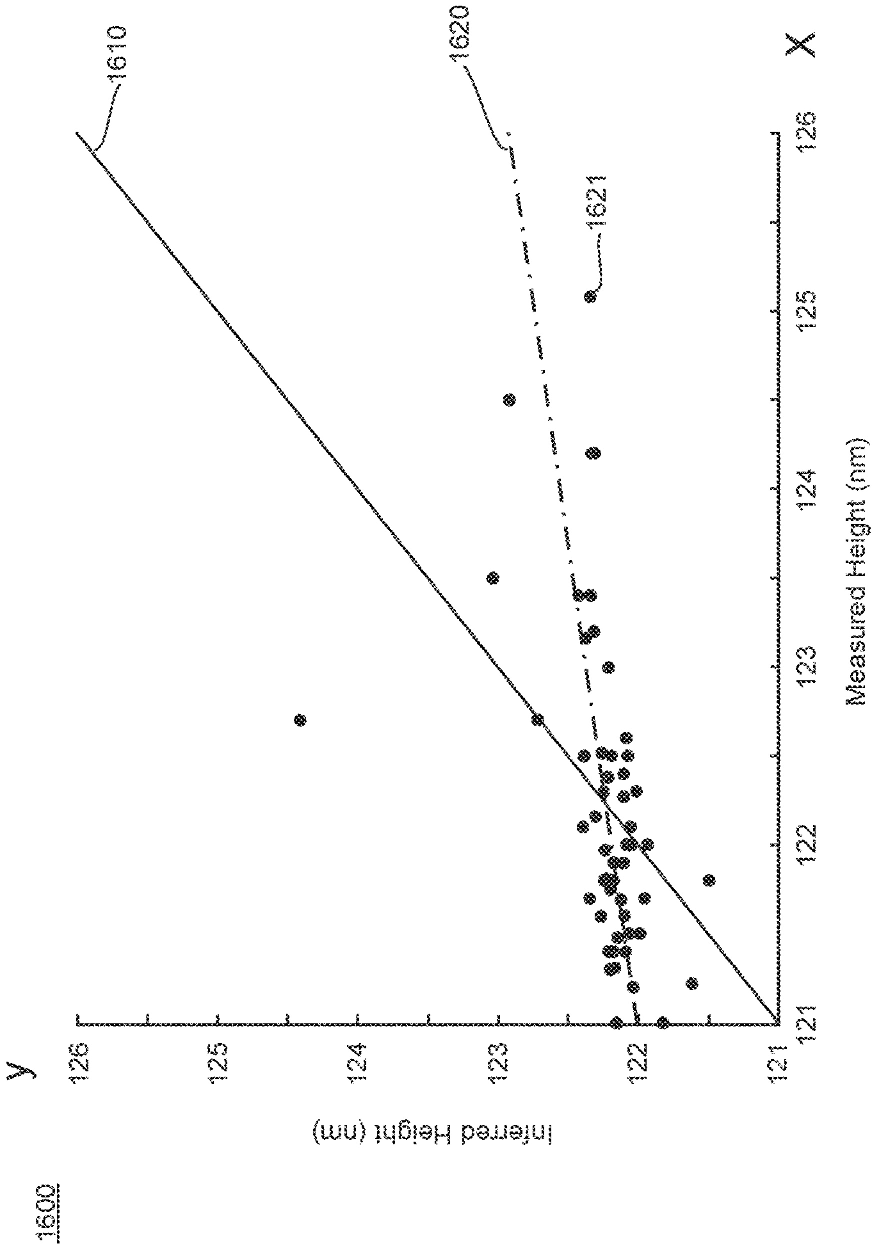
FIG. 16A is a graph illustrating height inference performance of a two-step surface estimation system of FIG. 15B.

FIG. 16A is a graph 1600 illustrating height inference performance of two-step surface estimation system 1550 of FIG. 15B. In graph 1600, an x-axis represents a measured average height of a target region of a sample and a y-axis represents an inferred average height of the corresponding region using two-step surface estimation system 1550. In FIG. 16A, a line 1610 indicates an ideal line where an inferred average height is the same as a measured average height, and thus line 1610 has slope 1. In graph 1600, each dot 1621 indicates an inferred average height value for a region of a sample having a corresponding measured average height. For example, dot 1621 indicates that an inferred average height for a region having measured average height about 125.1 nm is about 122.3 nm. Graph 1600 includes a plurality of dots 1621 each of which is associated with an individual inference event. Line 1620 represents a linear line of best fit of a plurality of dots 1621. In FIG. 16A, line 1620 has slope 0.18, and a root mean square error (RMSE) of inferred results is 0.80. It is confirmed that the performance indices of two-step surface estimation system 1550 are worse than those of a regression model for a same sample. In comparison, the regression model is also a neural network trained to predict an average height by using an inspection image as an input and by using a measured average height (e.g., measured average height by Yieldstar) for evaluation. In an example, regression model's inference results have linear line slope 0.54 and RMSE 0.59. From graph 1600, it can be inferred that topological information (e.g., height information) of an inspection image may not be preserved during data translation by domain adaptation technique 1560 and the lost topological information is not fully compensated in two-step surface estimation system 1550 (e.g., by calibrating surface estimation data based on observed data).

Figure 16B:
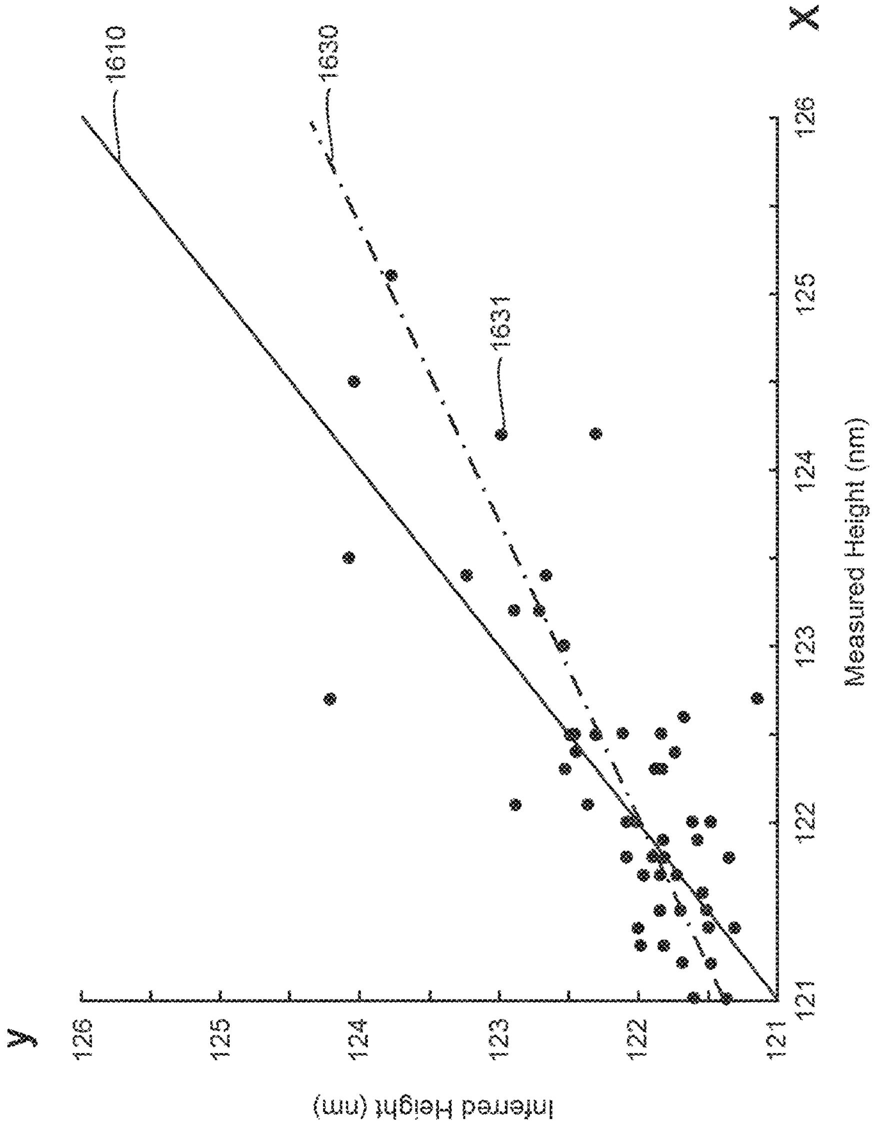
FIG. 16B is a graph illustrating height inference performance of a surface estimation system of FIG. 15A, consistent with some embodiments of the present disclosure.

FIG. 16B is a graph 1601 illustrating height inference performance of a surface estimation system of FIG. 15A. In graph 1601, an x-axis represents a measured average height of a target region of a sample and a y-axis represents an inferred average height of the target region using surface estimation system 1500. Line 1610 indicates an ideal line having slope 1. In graph 1601, each dot 1631 indicates an inferred average height for a target region having a corresponding measured average height. For example, dot 1631 indicates that an inferred average height of a target region having measured average height about 124.2 nm is about 122.8 nm. Graph 1601 includes a plurality of dots 1631 each of which is associated with an individual inference event. Line 1630 represents a linear line of best fit of a plurality of dots 1631. In FIG. 16B, line 1630 has slope 0.59, and a RMSE of inferred results is 0.61. When compared to inference performance shown in FIG. 16A, line 1630 is much closer to ideal line 1610 than line 1620 as line 1630 has slope 0.59 and line 1620 has slope 0.18. Further, a lower RMSE (e.g., 0.61) of graph 1601 compared to RMSE 0.80 of graph 1600 also indicates height inference performance of surface estimation system of FIG. 15A is better than that of two-step surface estimation system of FIG. 15B. This experiment results show that at least some topological information lost by domain adaptation process can be compensated in surface estimation system of FIG. 15A.

Figure 17A:
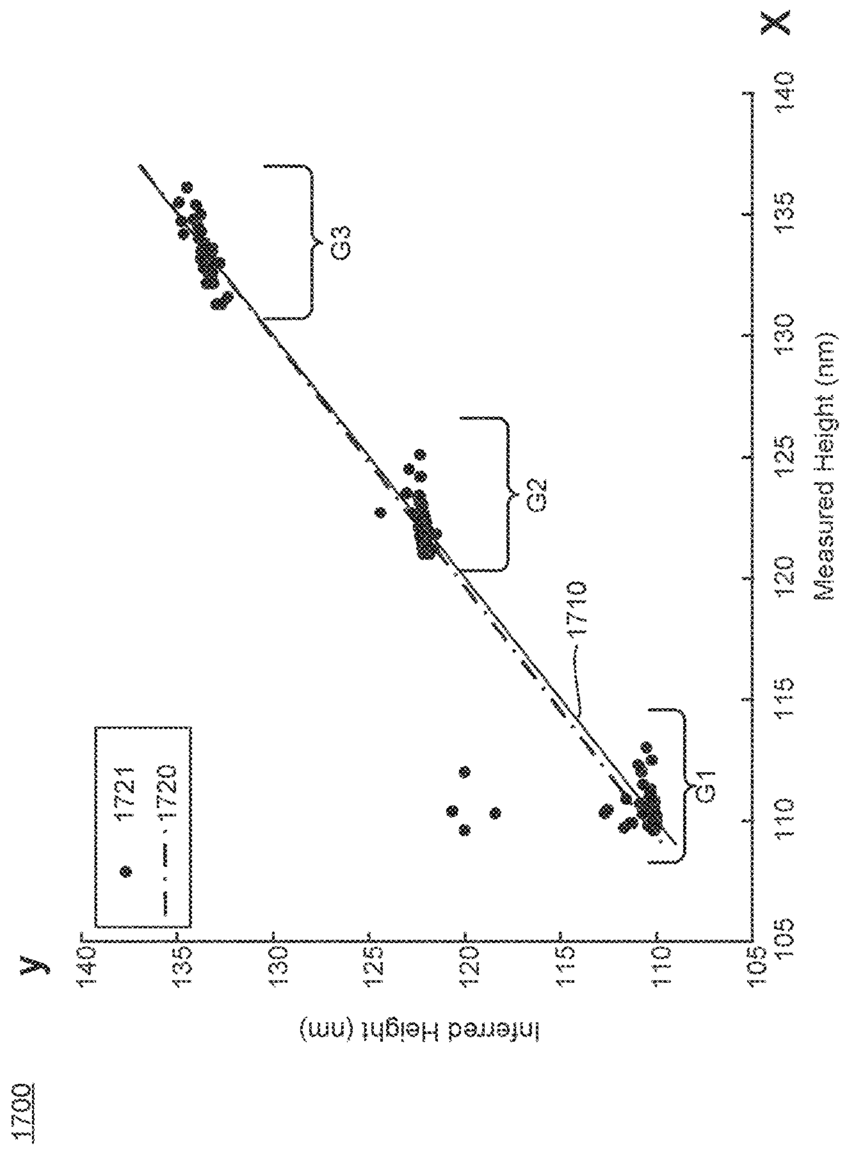
FIG. 17A is a graph illustrating height inference performance of a surface estimation system of FIG. 15B for three samples, consistent with some embodiments of the present disclosure.

FIG. 17A is a graph illustrating height inference performance using three samples of two-step surface estimation system of FIG. 15B. In graph 1700, an x-axis represents a measured average height of a target region of samples and a y-axis represents an inferred average height of the target region using two-step surface estimation system 1550. In FIG. 17A, a line 1710 indicates an ideal line having slope 1. In graph 1700, each dot 1721 indicates an inferred average height value for a target region having a corresponding measured average height. In FIG. 17A, dots indicated as first group G1 are inference results from a first sample, dots indicated as second group G2 are inference results from a second sample, and dots indicated as third group G3 are inference results from a third sample. Line 1720 represents a linear line of best fit of a plurality of dots 1721. In FIG. 17A, line 1720 has slope 0.97, and a RMSE of inferred results is 1.61.

Figure 17B:
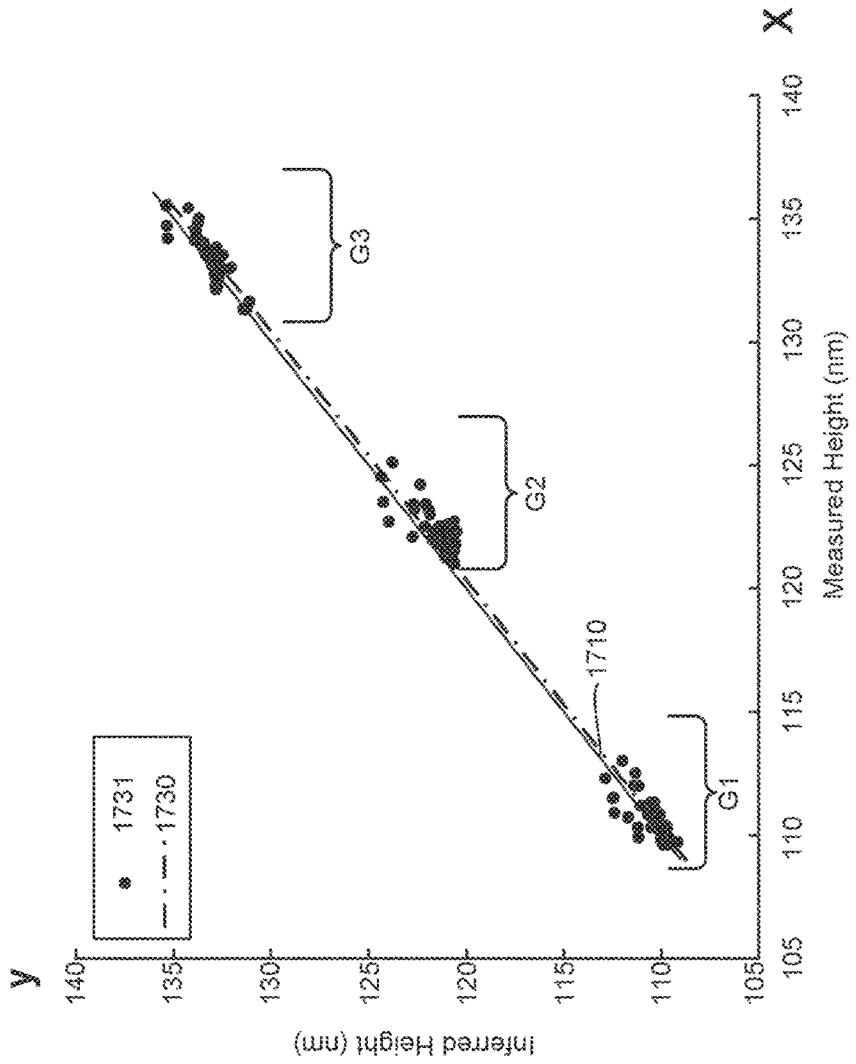
FIG. 17B is a graph illustrating height inference performance of a two-step surface estimation system of FIG. 15A (or 14A) for three samples.

FIG. 17B is a graph illustrating height inference performance using three samples of a surface estimation system of FIG. 15A. In graph 1701, an x-axis represents a measured average height of a target structure of substrates and a y-axis represents an inferred average height of the target structure using one-step surface map prediction system 1500. A line 1710 indicates an ideal line having slope 1. In graph 1701, each dot 1731 indicates an inferred average height value for a target region having a corresponding measured average height. Similar to FIG. 17A, dots are grouped into three groups G1. G2, and G3. Line 1730 represents a linear line of best fit of a plurality of dots 1731. In FIG. 17B, line 1730 has slope 0.99, and a RMSE of inferred results is 0.73. When compared to inference performance shown in FIG. 17A, line 1730 is closer to ideal line 1710 than line 1720. Further, a lower RMSE (e.g., 0.73) of graph 1701 compared to RMSE 1.62 of graph 1700 also indicates height inference performance of surface estimation system of FIG. 15A is improved compared to that of two-step surface estimation system of FIG. 15B. This experiment results also show that at least some topological information lost by domain adaptation process can be compensated in surface estimation system of FIG. 15A.

Figure 17C:
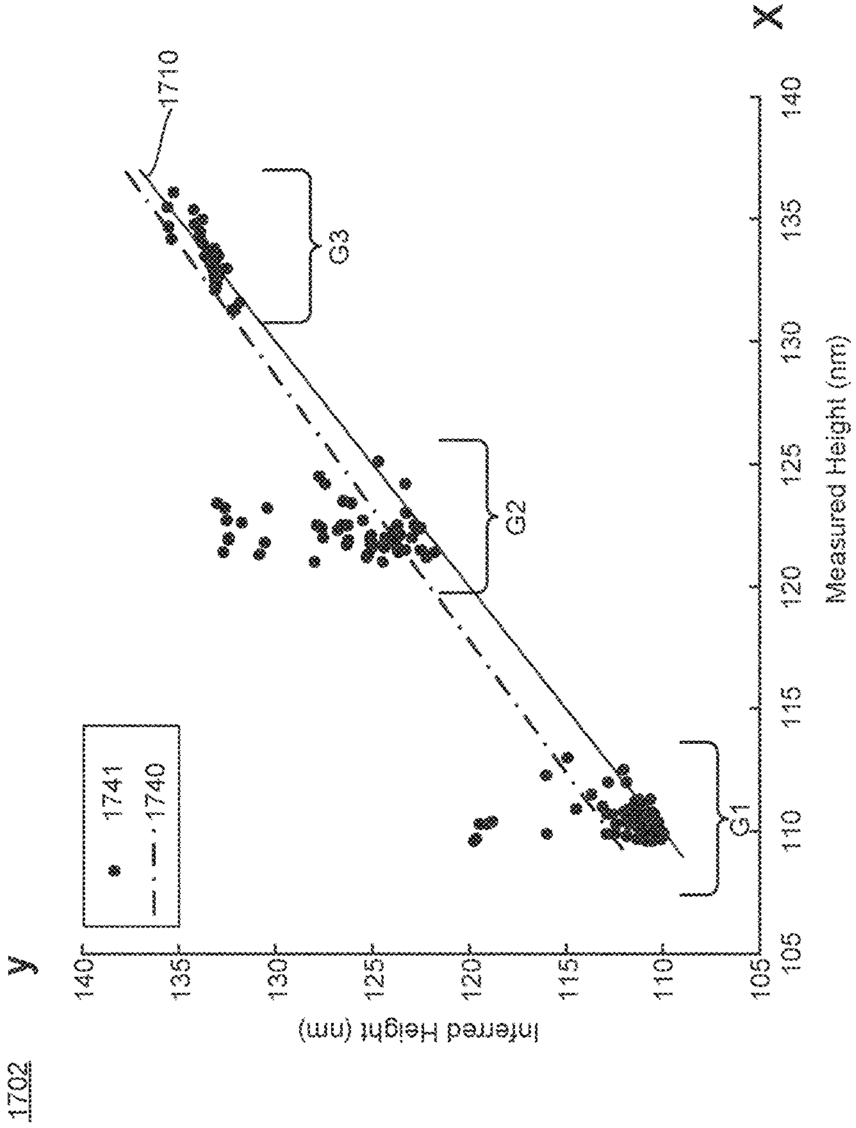
FIG. 17C is a graph illustrating height inference performance of another one-step surface estimation system for comparison.

FIG. 17C is a graph 1702 illustrating height inference performance of one-step surface estimation system that is trained without using parameters (e.g., weights) of a pre-trained surface estimation map. In this implementation, one-step surface estimation model is trained in a similar manner as second surface estimation model 1440 except the fact that parameters of trained first surface estimation model 1420 are not set to be initial parameters of one-step surface estimation model when training. In graph 1702, an x-axis represents a measured average height of a region of samples and a y-axis represents an inferred average height of the target region using one-step surface estimation system without using weights of a pre-trained surface estimation model. In FIG. 17C, a line 1710 indicates an ideal line having slope 1. In graph 1702, each dot 1741 indicates an inferred average height value for a target structure having a corresponding measured average height. Similar to FIG. 17A, dots are grouped into three groups G1, G2, and G3. Line 1740 represents a linear line of best fit of a plurality of dots 1741. In FIG. 17C, line 1740 has slope 0.93, and a RMSE of inferred results is 3.43. It is known based on comparison between graph 1701 of FIG. 17B and graph 1702 of FIG. 17C, utilizing parameters (e.g., weights) of a pre-trained surface estimation model (e.g., first surface estimation model 1420) as initial parameters of second surface estimation model 1440 can significantly improve inference performance of a resultant surface estimation system.

While some embodiments of the present disclosure and performance thereof are explained focusing on height information with respect to FIGS. 14A to 17C, it will be appreciated that the present disclosure is applicable to compensate any topological information of interest that may be lost by an unsupervised domain adaptation technique.

Figure 18:
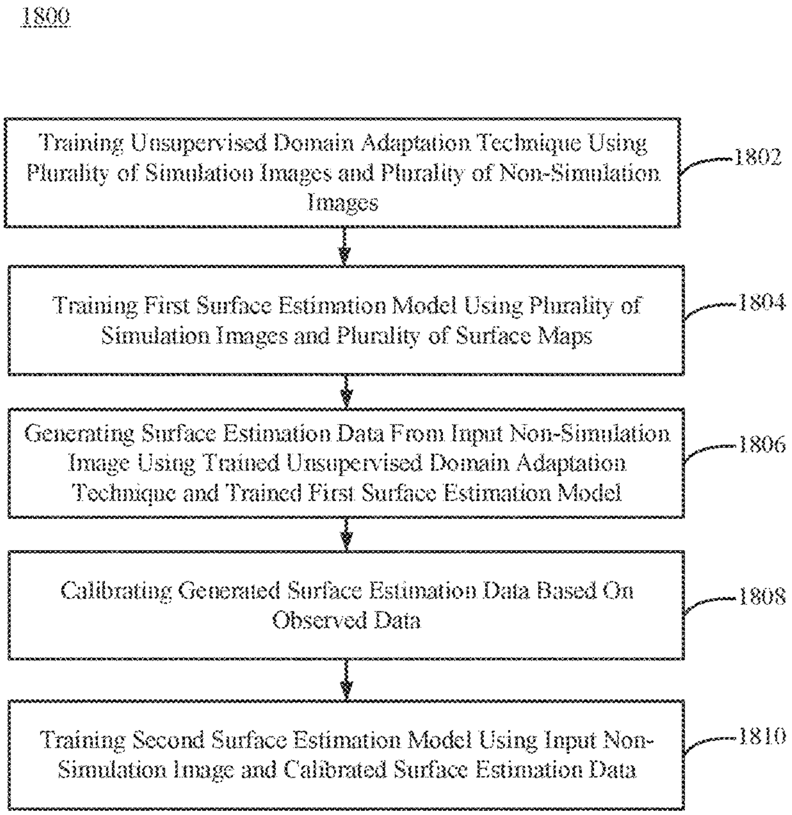
FIG. 18 is a flowchart illustrating an example method for training a surface estimation model based on domain adaptation technique, consistent with some embodiments of the present disclosure.

FIG. 18 is a flowchart illustrating an example method for training a surface estimation model based on domain adaptation technique, consistent with some embodiments of the present disclosure. Method 1800 may be performed by a controller that may be coupled with the charged-particle inspection apparatus. For example, the controller may be controller 109 in FIG. 2. The controller may be programmed to implement method 1800. The method 1800 will be explained referring to FIG. 14A for illustration purposes.

At step 1802, the controller may train an unsupervised domain adaptation technique using a plurality of simulation images and a plurality of non-simulation image. According to some embodiments of the present disclosure, an unsupervised domain adaptation technique (e.g., domain adaptation technique 1410) can be a cycle-consistent generative adversarial network (e.g., a cycle-consistent GAN described in association with FIGS. 5-9). In some embodiments, an unsupervised domain adaptation technique can be trained according to method 1000 for image analysis illustrated in association with FIG. 10, and thus detailed explanations for training domain adaptation technique 1410 will be omitted here.

At step 1804, the controller may train a first surface estimation model using a plurality of simulation images and a plurality of surface maps. In some embodiments, a plurality of surface maps 1403 can be associated with a plurality of simulation images 1402 for training first surface estimation model 1420. For example, surface map 1403 can be paired with corresponding simulation image 1402 for training first surface estimation model 1420. According to some embodiments, first surface estimation model 1420 can be a convolutional neural network (CNN). Consistent with some embodiments of the present disclosure, first surface estimation model 1420 can be trained using paired simulation image 1402 and surface map 1403 under supervised learning. In some embodiments, training of first surface estimation model 1420 can be performed for a plurality of pairs of simulation image 1402 and corresponding surface map 1403. Once the training process ends, the trained first surface estimation model 1420 can be used to predict surface estimation data corresponding to an input image.

At step 1806, the controller may generate surface estimation data from an input non-simulation image using the unsupervised domain adaptation technique trained at step 1802 and the first surface estimation model trained at step 1804. At step 1806, trained domain adaptation technique 1410 is configured to receive input non-simulation image 1404 and to predict a domain-adapted image 1411. Input non-simulation image 1404 may be similar to inspection image 802 described in association with FIG. 8, and domain-adapted image 1411 may be similar to domain-adapted image 804 described in association with FIG. 8. Trained first surface estimation model 1420 is configured to receive domain-adapted image 1411, which is predicted by domain adaptation technique 1410, and to generate predicted surface estimation data 1421.

At step 1808, the controller may calibrate generated surface estimation data based on observed data. In some embodiments, observed data 1405 is paired with input non-simulation image 1404 and is measured data of structure(s) of a sample, which is measured by input non-simulation image 1404. In some embodiments, observed data 1405 can be obtained from one or more metrology tools. The metrology tool can be an optical metrology tool configured to measure structure(s) of the patterned substrate and extract depth information based on diffraction-based measurements of the patterned substrate, an atomic force microscope (AFM), or a transmission electron microscopy (TEM). For example, observed data 1405 comprises height profile of the structure(s) captured by an atomic force microscope tool, or shape parameter data captured by an optical scatterometry tool (e.g., Yieldstar). In some embodiments, the metrology tool can be an optical metrology tool configured to measure structure(s) of the patterned substrate and extract depth information based on diffraction-based measurement of the patterned substrate. In some embodiments, observed data 1405 can include one-dimensional height data of the structure traced from input non-simulation image 1404. In some embodiments, observed data 1405 can include two-dimensional height data of the structure(s) traced from input non-simulation image 1404. In some embodiments, observed data 1405 can include shape parameters obtained from the optical metrology tool used to measure structure(s) of the patterned substrate. At step 1808, predicted surface estimation data 1421 is adjusted by comparing predicted surface estimation data 1421 and observed data 1405.

At step 1810, the controller may train a second surface estimation model using an input non-simulation image and surface estimation data calibrated at step 1808. According to some embodiments, second surface estimation model 1440 can be a convolutional neural network (CNN). According to some embodiments of the present disclosure, second surface estimation model 1440 can be trained using input data and output data of pipelined process 1441. In some embodiments, second surface estimation model 1440 can be trained using paired input non-simulation image 1404 and calibrated surface map 1431 under supervised learning. In some embodiments, training of second surface estimation model 1440 can be performed for a plurality of pairs of input non-simulation image 1404 and corresponding calibrated surface map 1431. In some embodiments, second surface estimation model 1440 is set to have parameters of trained first surface estimation model 1420 at the outset of training second surface estimation model 1440. In some embodiments, by utilizing parameters (e.g., weights) of a neural network included in trained first surface estimation model 1420 as initial weights of second surface estimation model 1440, training time of second surface estimation model 1440 can be reduced and even prediction performance of second surface estimation model 1440 can be improved. Once the training process ends, the trained second surface estimation model 1440 can be used to predict surface estimation data directly from an input non-simulation image.

Consistent with some embodiments of this disclosure, besides steps 1802-1810, the controller may further generate, using second surface estimation model 1440 trained at step 1810 using an inspection image as an input, surface estimation data of a sample. In some embodiments, an inspection image can be similar to inspection image 802 described in association with FIG. 8. In some embodiments, the controller can predict, using the trained second surface estimation model, surface estimation data directly from an inspection image.

A non-transitory computer readable medium may be provided that stores instructions for a processor (for example, processor of controller 109 of FIG. 1) to carry out image processing such as method 1000 of FIG. 10, method 1200 of FIG. 12, method 1300 of FIG. 13, method 1800 of FIG. 18, data processing, database management, graphical display, operations of an image inspection apparatus or another imaging device, detecting a defect on a sample, or the like. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The embodiments can further be described using the following clauses:

1. A computer-implemented method for image analysis, the method comprising:
obtaining a plurality of simulation images and a plurality of non-simulation images both associated with a sample under inspection, at least one of the plurality of simulation images being a simulation image of a location on the sample not imaged by any of the plurality of non-simulation images; and
training an unsupervised domain adaptation technique using the plurality of simulation images and the plurality of non-simulation images as inputs to reduce a difference between first intensity gradients of the plurality of simulation images and second intensity gradients of the plurality of non-simulation images.
2. The computer-implemented method of clause 1, wherein the plurality of non-simulation images are generated by a charged-particle inspection apparatus inspecting the sample, and the plurality of simulation images are generated by a simulation technique configured to generate graphical representations of inspection images.
3. The computer-implemented method of clause 2, wherein the inspection images are generated by the charged-particle inspection apparatus inspecting the sample.
4. The computer-implemented method of clause 2, wherein the plurality of non-simulation images is generated by the charged-particle inspection apparatus using a plurality of parameter sets, and each of the plurality of non-simulation images is generated using one of the plurality of parameter sets.

5. The computer-implemented method of clauses 1, wherein at least one of the plurality of simulation images is generated by the simulation technique using none of the plurality of parameter sets.

6. The computer-implemented method of any of clauses 1-5, wherein the plurality of non-simulation images comprise an image artifact not representing a defect in the sample, and the plurality of simulation images do not comprise the image artifact.

7. The computer-implemented method of clause 6, wherein the image artifact comprises at least one of an edge blooming effect including asymmetry or an intensity gradient exceeding a predetermined value.

8. The computer-implemented method of any of clauses 1-7, wherein the plurality of non-simulation images comprise a first geometric feature, the plurality of simulation images comprise a second geometric feature different from the first geometric feature, and a value representing similarity between the first geometric feature and the second geometric feature is within a preset range.

9. The computer-implemented method of any of clauses 1-8, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

10. The computer-implemented method of clause 9, wherein the cycle-consistent domain adaptation technique further comprises at least one of an adversarial loss, a cycle-consistency loss, or an identity mapping loss for the training.

11. The computer-implemented method of any of clauses 1-10, further comprising:

obtaining an inspection image of a sample generated by a charged-particle inspection apparatus, wherein the inspection image is a non-simulation image and comprises an image artifact not representing a defect in the sample; and generating, using the trained unsupervised domain adaptation technique, a domain-adapted image using the inspection image as an input, wherein the domain-adapted image attenuates the image artifact.

12. The computer-implemented method of any of clauses 1-11, further comprising:

obtaining a simulation image of a sample generated by a simulation technique configured to generate graphical representations of inspection images; and generating, using the trained unsupervised domain adaptation technique, a domain-adapted image using the simulation image as an input, wherein the domain-adapted image adds or enhances an image artifact not representing a defect in the sample.

13. The computer-implemented method of clause 12, wherein the inspection images are generated by the charged-particle inspection apparatus inspecting the sample.

14. The computer-implemented method of any of clauses 11-13, wherein the image artifact is caused by a physics effect during inspection of the sample by the charged-particle inspection apparatus, the physics effect comprises at least one of an edge blooming effect or a charging effect, and the image artifact comprises at least one of asymmetry in edge blooming intensities of a line caused by the edge blooming effect or an intensity gradient caused by the charging effect.

15. The computer-implemented method of any of clauses 1-14, wherein the unsupervised domain adaptation technique comprises a cycle-consistent generative adversarial network.

16. A system, comprising:

an image inspection apparatus configured to scan a sample and generate a non-simulation image of the sample; and a controller including circuitry, configured for:

obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference between first intensity gradients of the plurality of simulation images and second intensity gradients of the plurality of non-simulation images.

17. The system of clause 16, wherein the plurality of non-simulation images are generated by the image inspection apparatus inspecting the sample, and the plurality of simulation images are generated by a simulation technique configured to generate graphical representations of inspection images.

18. The system of clause 17, wherein the inspection images are generated by the charged-particle inspection apparatus inspecting the sample.

19. The system of clause 17, wherein the plurality of non-simulation images is generated by the charged-particle inspection apparatus using a plurality of parameter sets, and each of the plurality of non-simulation images is generated using one of the plurality of parameter sets.

20. The system of clause 17, wherein at least one of the plurality of simulation images is generated by the simulation technique using none of the plurality of parameter sets.

21. The system of any of clauses 16-20, wherein the plurality of non-simulation images comprise an image artifact not representing a defect in the sample, and the plurality of simulation images do not comprise the image artifact.

22. The system of clause 21, wherein the image artifact comprises at least one of an edge blooming effect including asymmetry or an intensity gradient exceeding a predetermined value.

23. The system of any of clauses 16-22, wherein the plurality of non-simulation images comprise a first geometric feature, the plurality of simulation images comprise a second geometric feature different from the first geometric feature, and a value representing similarity between the first geometric feature and the second geometric feature is within a preset range.

24. The system of any of clauses 16-23, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

25. The system of clause 24, wherein the cycle-consistent domain adaptation technique further comprises at least one of an adversarial loss, a cycle-consistency loss, or an identity mapping loss for the training.

26. The system of any of clauses 16-25, wherein the controller is further configured for: obtaining an inspection image of the sample generated by the image inspection apparatus, wherein the inspection image is a non-simulation image and comprises an image artifact not representing a defect in the sample; and generating, using the trained unsupervised domain adaptation technique, a domain-adapted image using the inspection image as an input, wherein the domain-adapted image attenuates the image artifact.

27. The system of any of clauses 16-26, wherein the controller is further configured for: obtaining a simulation image of the sample generated by a simulation technique configured to generate graphical representations of inspection images; and generating, using the trained unsupervised domain adaptation technique, a domain-adapted image using the simulation image as an input, wherein the domain-adapted image adds or enhances an image artifact not representing a defect in the sample.

28. The system of clause 27, wherein the inspection images are generated by the charged-particle inspection apparatus inspecting the sample.

29. The system of any of clauses 26-28, wherein the image artifact is caused by a physics effect during inspection of the sample by the image inspection apparatus, the physics effect comprises at least one of an edge blooming effect or a charging effect, and the image artifact comprises at least one of asymmetry in edge blooming intensities of a line caused by the edge blooming effect or an intensity gradient caused by the charging effect.

30. The system of any of clauses 16-29, wherein the unsupervised domain adaptation technique comprises a cycle-consistent generative adversarial network.

31. A non-transitory computer-readable medium that stores a set of instructions that is executable by at least one processor of an apparatus to cause the apparatus to perform a method, the method comprising:

obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference between first intensity gradients of the plurality of simulation images and second intensity gradients of the plurality of non-simulation images.

32. The non-transitory computer-readable medium of clause 31, wherein the plurality of non-simulation images are generated by a charged-particle inspection apparatus inspecting the sample, and the plurality of simulation images are generated by a simulation technique configured to generate graphical representations of inspection images.

33. The non-transitory computer-readable medium of clause 32, wherein the inspection images are generated by the charged-particle inspection apparatus inspecting the sample.

34. The non-transitory computer-readable medium of clause 32, wherein the plurality of non-simulation images is generated by the charged-particle inspection apparatus using a plurality of parameter sets, and each of the plurality of non-simulation images is generated using one of the plurality of parameter sets.

35. The non-transitory computer-readable medium of clause 32, wherein at least one of the plurality of simulation images is generated by the simulation technique using none of the plurality of parameter sets.

36. The non-transitory computer-readable medium of any of clauses 31-35, wherein the plurality of non-simulation images comprise an image artifact not representing a defect in the sample, and the plurality of simulation images do not comprise the image artifact.

37. The non-transitory computer-readable medium of clause 36, wherein the image artifact comprises at least one of an edge blooming effect including asymmetry or an intensity gradient exceeding a predetermined value.

38. The non-transitory computer-readable medium of any of clauses 31-37, wherein the plurality of non-simulation images comprise a first geometric feature, the plurality of simulation images comprise a second geometric feature different from the first geometric feature, and a value representing similarity between the first geometric feature and the second geometric feature is within a preset range.

39. The non-transitory computer-readable medium of any of clauses 31-38, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

40. The non-transitory computer-readable medium of clause 39, wherein the cycle-consistent domain adaptation technique further comprises at least one of an adversarial loss, a cycle-consistency loss, or an identity mapping loss for the training.

41. The non-transitory computer-readable medium of any of clauses 31-40, wherein the set of instructions that is executable by at least one processor of the apparatus to cause the apparatus to further perform:

obtaining an inspection image of a sample generated by a charged-particle inspection apparatus, wherein the inspection image is a non-simulation image and comprises an image artifact not representing a defect in the sample; and generating, using the trained unsupervised domain adaptation technique, a domain-adapted image using the inspection image as an input, wherein the domain-adapted image attenuates the image artifact.

42. The non-transitory computer-readable medium of any of clauses 31-41, wherein the set of instructions that is executable by at least one processor of the apparatus to cause the apparatus to further perform:

obtaining a simulation image of a sample generated by a simulation technique configured to generate graphical representations of inspection images; and generating, using the trained unsupervised domain adaptation technique, a domain-adapted image using the simulation image as an input, wherein the domain-adapted image adds or enhances an image artifact not representing a defect in the sample.

43. The non-transitory computer-readable medium of clause 42, wherein the inspection images are generated by the charged-particle inspection apparatus inspecting the sample.

44. The non-transitory computer-readable medium of any of clauses 41-43, wherein the image artifact is caused by a physics effect during inspection of the sample by the charged-particle inspection apparatus, the physics effect comprises at least one of an edge blooming effect or a charging effect, and the image artifact comprises at least one of asymmetry in edge blooming intensities of a line caused by the edge blooming effect or an intensity gradient caused by the charging effect.

45. The non-transitory computer-readable medium of any of clauses 31-44, wherein the unsupervised domain adaptation technique comprises a cycle-consistent generative adversarial network.

46. A computer-implemented method of critical dimension matching for a charged-particle inspection apparatus, the method comprising:

obtaining a set of reference inspection images for regions on a sample, each of the set of reference inspection images being associated with one of the regions;

generating a set of inspection images of the sample using the charged-particle inspection apparatus to inspect the regions on the sample;

determining, based on the set of inspection images, a first set of inspection images for training a machine learning model; and training the machine learning model using the set of reference inspection images and the first set of inspection images as inputs, wherein the machine learning model is configured to receive an inspection image and output a predicted image, and the predicted image comprises a first image feature existing in the set of reference inspection images and a second image feature existing in the set of inspection images.

47. The computer-implemented method of clause 46, further comprising:

before training the machine learning model, adjusting, for each inspection image of the first set of inspection images, a field of view (FOV) of the inspection image to match a reference FOV associated with the set of reference inspection images.

48. The computer-implemented method of clause 47, wherein adjusting the FOV of the inspection image to match the FOV associated with the set of reference inspection images comprises:

adjusting the FOV of the inspection image to cause the FOV of the inspection image and the reference FOV to include the same number of lines.

49. The computer-implemented method of any of clauses 47-48, further comprising:

determining the set of reference inspection images using a process of record before obtaining the set of reference inspection images; and determining the reference FOV using the process of record.

50. The computer-implemented method of any of clauses 46-49, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

51. The computer-implemented method of any of clauses 46-50, wherein determining the first set of inspection images comprises:

dividing, in a random manner, the set of inspection images into the first set of inspection images and a second set of inspection images.

52. The computer-implemented method of clauses 51, further comprising:

generating, using the trained machine learning model, a domain-adapted image using a particular inspection image of the second set of inspection images as an input, wherein the domain-adapted image comprises a third image feature existing in the set of reference inspection images and a fourth image feature existing in the particular inspection image.

53. The computer-implemented method of any of clauses 51-52, further comprising:

generating, using the trained machine learning model, a domain-adapted image using a particular reference inspection image of the set of reference inspection images as an input, wherein the domain-adapted image comprises a fifth image feature existing in the second set of inspection images and a sixth image feature existing in the particular reference inspection image.

54. The computer-implemented method of any of clauses 46-48, wherein the machine learning model comprises a generative adversarial network.

55. The computer-implemented method of any of clauses 46-54, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

56. The computer-implemented method of any of clauses 46-55, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

57. The computer-implemented method of clause 56, wherein the machine learning model further comprises at least one of an adversarial loss, a cycle-consistency loss, or an identity mapping loss for the training.

58. A system, comprising:

an image inspection apparatus configured to scan a sample and generate an inspection image of the sample; and a controller including circuitry, configured for:

obtaining a set of reference inspection images for regions on the sample, each of the set of reference inspection images being associated with one of the regions;

generating a set of inspection images of the sample using the image inspection apparatus to inspect the regions on the sample;

determining, based on the set of inspection images, a first set of inspection images for training a machine learning model;

training the machine learning model using the set of reference inspection images and the first set of inspection images as inputs, wherein the machine learning model is configured to receive an inspection image and output a predicted image, and the predicted image comprises a first image feature existing in the set of reference inspection images and a second image feature existing in the set of inspection images.

59. The system of clause 58, wherein the controller is further configured for:

before training the machine learning model, adjusting, for each inspection image of the first set of inspection images, a field of view (FOV) of the inspection image to match a reference FOV associated with the set of reference inspection images.

60. The system of clause 59, wherein adjusting the FOV of the inspection image to match the FOV associated with the set of reference inspection images comprises:

adjusting the FOV of the inspection image to cause the FOV of the inspection image and the reference FOV to include the same number of lines.

61. The system of any of clauses 59-60, wherein the controller is further configured for:

determining the set of reference inspection images using a process of record before obtaining the set of reference inspection images; and determining the reference FOV using the process of record.

62. The system of any of clauses 58-61, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

63. The system of any of clauses 58-62, wherein determining the first set of inspection images comprises:

dividing, in a random manner, the set of inspection images into the first set of inspection images and a second set of inspection images.

64. The system of clauses 63, wherein the controller is further configured for:

generating, using the trained machine learning model, a domain-adapted image using a particular inspection image of the second set of inspection images as an input, wherein the domain-adapted image comprises a third image feature existing in the set of reference inspection images and a fourth image feature existing in the particular inspection image.

65. The system of any of clauses 63-64, wherein the controller is further configured for:

generating, using the trained machine learning model, a domain-adapted image using a particular reference inspection image of the set of reference inspection images as an input, wherein the domain-adapted image comprises a fifth image feature existing in the second set of inspection images and a sixth image feature existing in the particular reference inspection image.

66. The system of any of clauses 58-60, wherein the machine learning model comprises a generative adversarial network.

67. The system of any of clauses 58-66, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

68. The system of any of clauses 58-67, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

69. The system of clause 68, wherein the machine learning model further comprises at least one of an adversarial loss, a cycle-consistency loss, or an identity mapping loss for the training.

70. A non-transitory computer-readable medium that stores a set of instructions that is executable by at least one processor of an apparatus to cause the apparatus to perform a method, the method comprising:

obtaining a set of reference inspection images for regions on a sample, each of the set of reference inspection images being associated with one of the regions;

generating a set of inspection images of the sample using a charged-particle inspection apparatus to inspect the regions on the sample;

determining, based on the set of inspection images, a first set of inspection images for training a machine learning model;

training the machine learning model using the set of reference inspection images and the first set of inspection images as inputs, wherein the machine learning model is configured to receive an inspection image and output a predicted image, and the predicted image comprises a first image feature existing in the set of reference inspection images and a second image feature existing in the set of inspection images.

71. The non-transitory computer-readable medium of clause 70, wherein the set of instructions that is executable by at least one processor of the apparatus to cause the apparatus to further perform:

before training the machine learning model, adjusting, for each inspection image of the first set of inspection images, a field of view (FOV) of the inspection image to match a reference FOV associated with the set of reference inspection images.

72. The non-transitory computer-readable medium of clause 71, wherein adjusting the FOV of the inspection image to match the FOV associated with the set of reference inspection images comprises:

adjusting the FOV of the inspection image to cause the FOV of the inspection image and the reference FOV to include the same number of lines.

73. The non-transitory computer-readable medium of any of clauses 71-72, wherein the set of instructions that is executable by at least one processor of the apparatus to cause the apparatus to further perform:

determining the set of reference inspection images using a process of record before obtaining the set of reference inspection images; and determining the reference FOV using the process of record.

74. The non-transitory computer-readable medium of any of clauses 70-73, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

75. The non-transitory computer-readable medium of any of clauses 70-74, wherein determining the first set of inspection images comprises:

dividing, in a random manner, the set of inspection images into the first set of inspection images and a second set of inspection images.

76. The non-transitory computer-readable medium of clauses 75, wherein the set of instructions that is executable by at least one processor of the apparatus to cause the apparatus to further perform:

generating, using the trained machine learning model, a domain-adapted image using a particular inspection image of the second set of inspection images as an input, wherein the domain-adapted image comprises a third image feature existing in the set of reference inspection images and a fourth image feature existing in the particular inspection image.

77. The non-transitory computer-readable medium of any of clauses 75-76, wherein the set of instructions that is executable by at least one processor of the apparatus to cause the apparatus to further performs:

generating, using the trained machine learning model, a domain-adapted image using a particular reference inspection image of the set of reference inspection images as an input, wherein the domain-adapted image comprises a fifth image feature existing in the second set of inspection images and a sixth image feature existing in the particular reference inspection image.

78. The non-transitory computer-readable medium of any of clauses 70-72, wherein the machine learning model comprises a generative adversarial network.

79. The non-transitory computer-readable medium of any of clauses 70-78, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

80. The non-transitory computer-readable medium of any of clauses 70-79, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

81. The non-transitory computer-readable medium of clause 80, wherein the machine learning model further comprises at least one of an adversarial loss, a cycle-consistency loss, or an identity mapping loss for the training.

82. A computer-implemented method, the method comprising:

generating an inspection image using a charged-particle inspection apparatus to inspect a region on a sample;

generating, using a machine learning model, a predicted image using the inspection image as an input; and determining a metrology characteristic in the region based on the predicted image.

83. The computer-implemented method of clause 82, wherein accuracy of the metrology characteristic is higher than accuracy of a metrology characteristic determined in the region based on the inspection image.

84. The computer-implemented method of clause 82, wherein accuracy of the metrology characteristic is higher than accuracy of a same metrology characteristic determined based on the inspection image.

85. The computer-implemented method of any of clauses 82-83, wherein the metrology characteristic comprises at least one of a critical dimension, an edge placement error, or an overlap.

86. The computer-implemented method of any of clauses 82-85, further comprising:

obtaining a reference inspection image of the region; and generating, using the machine learning model, a domain-adapted image using the reference inspection image as an input, wherein the domain-adapted image comprises a first image feature existing in the reference inspection image and a second image feature existing in the inspection image.

87. The computer-implemented method of clause 86, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

88. The computer-implemented method of any of clauses 82-87, wherein the machine learning model comprises a generative adversarial network.

89. The computer-implemented method of any of clauses 82-88, further comprising:

obtaining a set of reference inspection images for regions on the sample, each of the set of reference inspection images being associated with one of the regions;

generating a set of inspection images of the sample using the charged-particle inspection apparatus to inspect the regions on the sample;

determining, based on the set of inspection images, a first set of inspection images for training the machine learning model; and training the machine learning model using the set of reference inspection images and the first set of inspection images as inputs.

90. The computer-implemented method of clause 89, further comprising:

before training the machine learning model, adjusting, for each inspection image of the first set of inspection images, a field of view (FOV) of the inspection image to match a reference FOV associated with the set of reference inspection images.

91. The computer-implemented method of clause 90, wherein adjusting the FOV of the inspection image to match the FOV associated with the set of reference inspection images comprises: adjusting the FOV of the inspection image to cause the FOV of the inspection image and the reference FOV to include the same number of lines.

92. The computer-implemented method of any of clauses 89-91, further comprising:

determining the set of reference inspection images using a process of record before obtaining the set of reference inspection images; and determining the reference FOV using the process of record.

93. The computer-implemented method of any of clauses 89-92, wherein determining the first set of inspection images comprises:

dividing, in a random manner, the set of inspection images into the first set of inspection images and a second set of inspection images.

94. The computer-implemented method of any of clauses 89-93, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

95. The computer-implemented method of any of clauses 89-94, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

96. The computer-implemented method of clause 95, wherein the machine learning model further comprises at least one of an adversarial loss, a cycle-consistency loss, or an identity mapping loss for the training.

97. A system, comprising:

a charged-particle inspection apparatus configured to scan a sample; and a controller including circuitry, configured for:

generating an inspection image using the charged-particle inspection apparatus to inspect a region on the sample;

generating, using a machine learning model, a predicted image using the inspection image as an input; and determining a metrology characteristic in the region based on the predicted image.

98. The system of clause 97, wherein accuracy of the metrology characteristic is higher than accuracy of a metrology characteristic determined in the region based on the inspection image.

99. The system of any of clauses 97-98, wherein the metrology characteristic comprises at least one of a critical dimension, an edge placement error, or an overlap.

100. The system of any of clauses 97-99, wherein the controller is further configured for:

obtaining a reference inspection image of the region; and generating, using the machine learning model, a domain-adapted image using the reference inspection image as an input, wherein the domain-adapted image comprises a first image feature existing in the reference inspection image and a second image feature existing in the inspection image.

101. The system of clause 100, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

102. The system of any of clauses 97-101, wherein the machine learning model comprises a generative adversarial network.

103. The system of any of clauses 97-102, wherein the controller is further configured for: obtaining a set of reference inspection images for regions on the sample, each of the set of reference inspection images being associated with one of the regions;

generating a set of inspection images of the sample using the charged-particle inspection apparatus to inspect the regions on the sample;

determining, based on the set of inspection images, a first set of inspection images for training the machine learning model; and training the machine learning model using the set of reference inspection images and the first set of inspection images as inputs.

104. The system of clause 103, wherein the controller is further configured for:

before training the machine learning model, adjusting, for each inspection image of the first set of inspection images, a field of view (FOV) of the inspection image to match a reference FOV associated with the set of reference inspection images.

105. The system of clause 104, wherein adjusting the FOV of the inspection image to match the FOV associated with the set of reference inspection images comprises:

adjusting the FOV of the inspection image to cause the FOV of the inspection image and the reference FOV to include the same number of lines.

106. The system of any of clauses 103-105, wherein the controller is further configured for:

determining the set of reference inspection images using a process of record before obtaining the set of reference inspection images; and determining the reference FOV using the process of record.

107. The system of any of clauses 103-106, wherein determining the first set of inspection images comprises:

dividing, in a random manner, the set of inspection images into the first set of inspection images and a second set of inspection images.

108. The system of any of clauses 103-107, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

109. The system of any of clauses 103-108, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

110. The system of clause 109, wherein the machine learning model further comprises at least one of an adversarial loss, a cycle-consistency loss, or an identity mapping loss for the training.

111. A non-transitory computer-readable medium that stores a set of instructions that is executable by at least one processor of an apparatus to cause the apparatus to perform a method, the method comprising:

generating an inspection image using a charged-particle inspection apparatus to inspect a region on a sample;

generating, using a machine learning model, a predicted image using the inspection image as an input; and determining a metrology characteristic in the region based on the predicted image.

112. The non-transitory computer-readable medium of clause 111, wherein accuracy of the metrology characteristic is higher than accuracy of a metrology characteristic determined in the region based on the inspection image.

113. The non-transitory computer-readable medium of any of clauses 111-112, wherein the metrology characteristic comprises at least one of a critical dimension, an edge placement error, or an overlap.

114. The non-transitory computer-readable medium of any of clauses 111-113, wherein the set of instructions that is executable by at least one processor of the apparatus to cause the apparatus to further perform:

obtaining a reference inspection image of the region; and generating, using the machine learning model, a domain-adapted image using the reference inspection image as an input, wherein the domain-adapted image comprises a first image feature existing in the reference inspection image and a second image feature existing in the inspection image.

115. The non-transitory computer-readable medium of clause 114, wherein the first image feature comprises at least one of contrast or a noise distribution, and the second image feature comprises at least one of a total number of lines in the inspection image, spacings between the lines, distortion at edges of the lines, shapes of the lines, a critical dimension determined from the inspection image, or a pitch determined from the inspection image.

116. The non-transitory computer-readable medium of any of clauses 111-115, wherein the machine learning model comprises a generative adversarial network.

117. The non-transitory computer-readable medium of any of clauses 111-116, wherein the set of instructions that is executable by at least one processor of the apparatus to cause the apparatus to further perform:

obtaining a set of reference inspection images for regions on the sample, each of the set of reference inspection images being associated with one of the regions;

generating a set of inspection images of the sample using the charged-particle inspection apparatus to inspect the regions on the sample;

determining, based on the set of inspection images, a first set of inspection images for training the machine learning model; and training the machine learning model using the set of reference inspection images and the first set of inspection images as inputs.

118. The non-transitory computer-readable medium of clause 117, wherein the set of instructions that is executable by at least one processor of the apparatus to cause the apparatus to further perform: before training the machine learning model, adjusting, for each inspection image of the first set of inspection images, a field of view (FOV) of the inspection image to match a reference FOV associated with the set of reference inspection images.

119. The non-transitory computer-readable medium of clause 118, wherein adjusting the FOV of the inspection image to match the FOV associated with the set of reference inspection images comprises: adjusting the FOV of the inspection image to cause the FOV of the inspection image and the reference FOV to include the same number of lines.

120. The non-transitory computer-readable medium of any of clauses 117-119, wherein the set of instructions that is executable by at least one processor of the apparatus to cause the apparatus to further perform:

determining the set of reference inspection images using a process of record before obtaining the set of reference inspection images; and determining the reference FOV using the process of record.

121. The non-transitory computer-readable medium of any of clauses 117-120, wherein determining the first set of inspection images comprises:

dividing, in a random manner, the set of inspection images into the first set of inspection images and a second set of inspection images.

122. The non-transitory computer-readable medium of any of clauses 117-121, wherein the machine learning model comprises a critical dimension matching loss for the training, the critical dimension matching loss represents an average difference between a critical dimension determined from the predicted image and a critical dimension determined from a reference inspection image, wherein the reference inspection image and the inspection image are both associated with one of the regions on the sample.

123. The non-transitory computer-readable medium of any of clauses 117-122, wherein the machine learning model comprises a noise distribution loss for the training, the noise distribution loss represents an average difference between a noise distribution determined from the predicted image and a noise distribution determined from a reference inspection image, wherein the reference inspection image and the inspection image are both associated with one of the regions on the sample.

124. The non-transitory computer-readable medium of clause 123, wherein the machine learning model further comprises at least one of an adversarial loss, a cycle-consistency loss, or an identity mapping loss for the training.

125. A computer-implemented method for image analysis, the method comprising:

training an unsupervised domain adaptation technique using a first set of simulation images and a first set of non-simulation images;

training a first surface estimation model using a second set of simulation images and a set of surface maps corresponding to the second set of simulation images;

using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model;

calibrating the generated surface estimation data based on observed data corresponding to the input non-simulation image; and training a second surface estimation model using the input non-simulation image and the calibrated surface estimation data.

126. The method of clause 125, wherein the observed data is determined based on data from a metrology tool for a sample, and wherein the observed data includes height profile data, depth data, shape parameter data, side wall angle data, or critical dimension data of structures on the sample.

127. The method of clause 125 or 126, wherein the first surface estimation model includes a neural network, and wherein weights of the trained first surface estimation model are set to be initial weights of a neural network of the second surface estimation model when training.

128. The method of any one of clauses 125 to 127, further comprising:

obtaining an inspection image of a sample generated by a charged-particle inspection apparatus; and generating, using the trained second surface estimation model using the inspection image as an input, surface estimation data of the sample.

129. The method of any one of clauses 125 to 128, wherein the non-simulation images are generated by a charged-particle inspection apparatus, and the simulation images are generated by a simulation technique configured to generate graphical representations of inspection images.

130. The method of any one of clauses 125-129, wherein training the unsupervised domain adaptation technique includes training the unsupervised domain adaptation technique to reduce a difference between first intensity gradients of the first set of simulation images and second intensity gradients of the first set of non-simulation images.

131. The method of any one of clauses 125-130, wherein the unsupervised domain adaptation technique comprises a cycle-consistent domain adaptation technique, and wherein:

the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

132. A system, comprising:

an image inspection apparatus configured to scan a sample and generate a non-simulation image of the sample; and a controller including circuitry, configured for training an unsupervised domain adaptation technique using a first set of simulation images and a first set of non-simulation images;

training a first surface estimation model using a second set of simulation images and a set of surface maps corresponding to the second set of simulation images;

using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model;

calibrating the generated surface estimation data based on observed data corresponding to the input non-simulation image; and training a second surface estimation model using the input non-simulation image and the calibrated surface estimation data.

133. The system of clause 132, wherein the observed data is determined based on data from a metrology tool for a sample, and wherein the observed data includes height profile data, depth data, shape parameter data, side wall angle data, or critical dimension data of structures on the sample.

134. The system of clause 132 or 133, wherein the first surface estimation model includes a neural network, and wherein weights of the trained first surface estimation model are set to be initial weights of a neural network of the second surface estimation model when training.

135. The system of any one of clauses 132 to 134, the controller is further configured for:

obtaining an inspection image of a sample generated by the charged-particle inspection apparatus; and generating, using the trained second surface estimation model using the inspection image as an input, surface estimation data of the sample.

136. The system of any one of clauses 132 to 135, wherein the non-simulation images are generated by the charged-particle inspection apparatus, and the simulation images are generated by a simulation technique configured to generate graphical representations of inspection images.

137. The system of any one of clauses 132-136, wherein training the unsupervised domain adaptation technique includes training the unsupervised domain adaptation technique to reduce a difference between first intensity gradients of the first set of simulation images and second intensity gradients of the first set of non-simulation images.

138. The system of any one of clauses 132-137, wherein the unsupervised domain adaptation technique comprises a cycle-consistent domain adaptation technique, and wherein:

the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

139. A non-transitory computer-readable medium that stores a set of instructions that is executable by at least one processor of an apparatus to cause the apparatus to perform a method, the method comprising:

training an unsupervised domain adaptation technique using a first set of simulation images and a first set of non-simulation images;

training a first surface estimation model using a second set of simulation images and a set of surface maps corresponding to the second set of simulation images;

using the trained domain adaptation technique to generate a domain-adapted image by inputting an input non-simulation image to the trained domain adaptation technique, and using the trained first surface estimation model to generate surface estimation data by inputting the domain-adapted image to the trained first surface estimation model;

calibrating the generated surface estimation data based on observed data corresponding to the input non-simulation image; and training a second surface estimation model using the input non-simulation image and the calibrated surface estimation data.

140. The non-transitory computer-readable medium of clause 139, wherein the observed data is determined based on data from a metrology tool for a sample, and wherein the observed data includes height profile data, depth data, shape parameter data, side wall angle data, or critical dimension data of structures on the sample.

141. The non-transitory computer-readable medium of clause 139 or 140, wherein the first surface estimation model includes a neural network, and wherein weights of the trained first surface estimation model are set to be initial weights of a neural network of the second surface estimation model when training.

142. The non-transitory computer-readable medium of any one of clauses 139 to 141, wherein the set of instructions that is executable by at least one processor of the apparatus to cause the apparatus to further perform:

obtaining an inspection image of a sample generated by a charged-particle inspection apparatus; and generating, using the trained second surface estimation model using the inspection image as an input, surface estimation data of the sample.

143. The non-transitory computer-readable medium of any one of clauses 139 to 142, wherein the non-simulation images are generated by a charged-particle inspection apparatus, and the simulation images are generated by a simulation technique configured to generate graphical representations of inspection images.

144. The non-transitory computer-readable medium of any one of clauses 139-143, wherein training the unsupervised domain adaptation technique includes training the unsupervised domain adaptation technique to reduce a difference between first intensity gradients of the first set of simulation images and second intensity gradients of the first set of non-simulation images.

145. The non-transitory computer-readable medium of any one of clauses 139-144, wherein the unsupervised domain adaptation technique comprises a cycle-consistent domain adaptation technique, and wherein:

the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

146. A computer-implemented method for image analysis, the method comprising:

obtaining an inspection image of a sample generated by a charged-particle inspection apparatus; and generating, using a second surface estimation model using the inspection image as an input, surface estimation data of the sample, wherein the second surface estimation model is pretrained by:

using an unsupervised domain adaptation technique to generate a domain-adapted image by inputting an input non-simulation image to the domain adaptation technique, and using a first surface estimation model to generate surface estimation data by inputting the domain-adapted image to the first surface estimation model;

calibrating the generated surface estimation data based on observed data corresponding to the input non-simulation image; and training the second surface estimation model using the input non-simulation image and the calibrated surface estimation data.

147. The method of clause 146, wherein the observed data is determined based on data from a metrology tool for a sample, and wherein the observed data includes height profile data, depth data, shape parameter data, side wall angle data, or critical dimension data of structures on the sample.

148. The method of clause 146 or 147, wherein the first surface estimation model includes a neural network, and wherein weights of the trained first surface estimation model are set to be initial weights of a neural network of the second surface estimation model when training.

149. The method of any one of clauses 146 to 148, wherein the unsupervised domain adaptation technique is pretrained by: training the unsupervised domain adaptation technique using a first set of simulation images and a first set of non-simulation images to reduce a difference between first intensity gradients of the first set of simulation images and second intensity gradients of the first set of non-simulation images.

150. The method of any one of clauses 146 to 149, wherein the first surface estimation model is pretrained by training a first surface estimation model using a second set of simulation images and a set of surface maps corresponding to the second set of simulation images.

151. The method of clause 149 or 150, wherein the non-simulation images are generated by a charged-particle inspection apparatus, and the simulation images are generated by a simulation technique configured to generate graphical representations of inspection images.

152. The method of clause 149, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

153. A system, comprising:

an image inspection apparatus configured to scan a sample and generate a non-simulation image of the sample; and a controller including circuitry, configured for:

obtaining an inspection image of a sample generated by the charged-particle inspection apparatus; and generating, using a second surface estimation model using the inspection image as an input, surface estimation data of the sample, wherein the second surface estimation model is pretrained by:

using an unsupervised domain adaptation technique to generate a domain-adapted image by inputting an input non-simulation image to the domain adaptation technique, and using a first surface estimation model to generate surface estimation data by inputting the domain-adapted image to the first surface estimation model;

calibrating the generated surface estimation data based on observed data corresponding to the input non-simulation image; and training the second surface estimation model using the input non-simulation image and the calibrated surface estimation data.

154. The system of clause 153, wherein the observed data is determined based on data from a metrology tool for a sample, and wherein the observed data includes height profile data, depth data, shape parameter data, side wall angle data, or critical dimension data of structures on the sample.

155. The system of clause 153 or 154, wherein the first surface estimation model includes a neural network, and wherein weights of the trained first surface estimation model are set to be initial weights of a neural network of the second surface estimation model when training.

156. The system of any one of clauses 153 to 155, wherein the unsupervised domain adaptation technique is pretrained by: training the unsupervised domain adaptation technique using a first set of simulation images and a first set of non-simulation images to reduce a difference between first intensity gradients of the first set of simulation images and second intensity gradients of the first set of non-simulation images.

157. The system of any one of clauses 153 to 156, wherein the first surface estimation model is pretrained by training a first surface estimation model using a second set of simulation images and a set of surface maps corresponding to the second set of simulation images.

158. The system of clause 156 or 157, wherein the non-simulation images are generated by a charged-particle inspection apparatus, and the simulation images are generated by a simulation technique configured to generate graphical representations of inspection images.

159. The system of clause 156, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

160. A non-transitory computer-readable medium that stores a set of instructions that is executable by at least one processor of an apparatus to cause the apparatus to perform a method, the method comprising:

obtaining an inspection image of a sample generated by a charged-particle inspection apparatus; and generating, using a second surface estimation model using the inspection image as an input, surface estimation data of the sample, wherein the second surface estimation model is pretrained by:

using an unsupervised domain adaptation technique to generate a domain-adapted image by inputting an input non-simulation image to the domain adaptation technique, and using a first surface estimation model to generate surface estimation data by inputting the domain-adapted image to the first surface estimation model;

calibrating the generated surface estimation data based on observed data corresponding to the input non-simulation image; and training the second surface estimation model using the input non-simulation image and the calibrated surface estimation data.

161. The non-transitory computer-readable medium of clause 160, wherein the observed data is determined based on data from a metrology tool for a sample, and wherein the observed data includes height profile data, depth data, shape parameter data, side wall angle data, or critical dimension data of structures on the sample.

162. The non-transitory computer-readable medium of clause 160 or 161, wherein the first surface estimation model includes a neural network, and wherein weights of the trained first surface estimation model are set to be initial weights of a neural network of the second surface estimation model when training.

163. The non-transitory computer-readable medium of any one of clauses 160 to 162, wherein the unsupervised domain adaptation technique is pretrained by: training the unsupervised domain adaptation technique using a first set of simulation images and a first set of non-simulation images to reduce a difference between first intensity gradients of the first set of simulation images and second intensity gradients of the first set of non-simulation images.

164. The non-transitory computer-readable medium of any one of clauses 160 to 163, wherein the first surface estimation model is pretrained by training a first surface estimation model using a second set of simulation images and a set of surface maps corresponding to the second set of simulation images.

165. The non-transitory computer-readable medium of clause 163 or 164, wherein the non-simulation images are generated by a charged-particle inspection apparatus, and the simulation images are generated by a simulation technique configured to generate graphical representations of inspection images.

166. The non-transitory computer-readable medium of clause 163, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

It will be appreciated that the embodiments of the present disclosure are not limited to the exact construction that has been described above and illustrated in the accompanying drawings, and that various modifications and changes may be made without departing from the scope thereof.

The invention claimed is:

1. A computer-implemented method for image analysis, the method comprising:

obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference between first intensity gradients of the plurality of simulation images and second intensity gradients of the plurality of non-simulation images.

2. The computer-implemented method of claim 1, wherein the plurality of non-simulation images are generated by a charged-particle inspection apparatus inspecting the sample, and the plurality of simulation images are generated by a simulation technique configured to generate graphical representations of inspection images.

3. The computer-implemented method of claim 2, wherein the inspection images are generated by the charged-particle inspection apparatus inspecting the sample.

4. The computer-implemented method of claim 2, wherein the plurality of non-simulation images is generated by the charged-particle inspection apparatus using a plurality of parameter sets, and each of the plurality of non-simulation images is generated using one of the plurality of parameter sets.

5. The computer-implemented method of claim 4, wherein at least one of the plurality of simulation images is generated by the simulation technique using none of the plurality of parameter sets.

6. The computer-implemented method of claim 1, wherein the plurality of non-simulation images comprise an image artifact not representing a defect in the sample, and the plurality of simulation images do not comprise the image artifact.

7. The computer-implemented method of claim 6, wherein the image artifact comprises at least one of an edge blooming effect including asymmetry or an intensity gradient exceeding a predetermined value.

8. The computer-implemented method of claim 1, wherein the plurality of non-simulation images comprise a first geometric feature, the plurality of simulation images comprise a second geometric feature different from the first geometric feature, and a value representing similarity between the first geometric feature and the second geometric feature is within a preset range.

9. The computer-implemented method of claim 1, wherein the unsupervised domain adaptation technique comprises a cycle-consistent domain adaptation technique, and wherein the cycle-consistent domain adaptation technique comprises an edge-preserving loss for the training, the edge-preserving loss is a sum of a first value and a second value, the first value represents an average of geometry difference between a simulation image of the plurality of simulation images and a first domain-adapted image generated by the cycle-consistent domain adaptation technique using the simulation image as an input, and the second value represents an average of geometry difference between a non-simulation image of the plurality of non-simulation images and a second domain-adapted image generated by the cycle-consistent domain adaptation technique using the non-simulation image as an input.

10. The computer-implemented method of claim 9, wherein the cycle-consistent domain adaptation technique further comprises at least one of an adversarial loss, a cycle-consistency loss, or an identity mapping loss for the training.

11. The computer-implemented method of claim 1, further comprising:

obtaining an inspection image of a sample generated by a charged-particle inspection apparatus, wherein the inspection image is a non-simulation image and comprises an image artifact not representing a defect in the sample; and generating, using the trained unsupervised domain adaptation technique, a domain-adapted image using the inspection image as an input, wherein the domain-adapted image attenuates the image artifact.

12. The computer-implemented method of claim 1, further comprising:

obtaining a simulation image of a sample generated by a simulation technique configured to generate graphical representations of inspection images; and generating, using the trained unsupervised domain adaptation technique, a domain-adapted image using the simulation image as an input, wherein the domain-adapted image adds or enhances an image artifact not representing a defect in the sample.

13. The computer-implemented method of claim 12, wherein the inspection images are generated by a charged-particle inspection apparatus inspecting the sample.

14. The computer-implemented method of claim 11, wherein the image artifact is caused by a physics effect during inspection of the sample by the charged-particle inspection apparatus, the physics effect comprises at least one of an edge blooming effect or a charging effect, and the image artifact comprises at least one of asymmetry in edge blooming intensities of a line caused by the edge blooming effect or an intensity gradient caused by the charging effect.

15. The computer-implemented method of claim 1, wherein the unsupervised domain adaptation technique comprises a cycle-consistent generative adversarial network.

16. A system, comprising:

an image inspection apparatus configured to scan a sample and generate a non-simulation image of the sample; and a controller including circuitry, configured for:

obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference between first intensity gradients of the plurality of simulation images and second intensity gradients of the plurality of non-simulation images.

17. The system of claim 16, wherein the plurality of non-simulation images are generated by the image inspection apparatus inspecting the sample, and the plurality of simulation images are generated by a simulation technique configured to generate graphical representations of inspection images.

18. The system of claim 17, wherein the inspection images are generated by the image inspection apparatus inspecting the sample.

19. The system of claim 17, wherein the plurality of non-simulation images is generated by the image inspection apparatus using a plurality of parameter sets, and each of the plurality of non-simulation images is generated using one of the plurality of parameter sets.

20. A non-transitory computer-readable medium that stores a set of instructions that is executable by at least one processor of an apparatus to cause the apparatus to perform operations comprising:

obtaining a plurality of simulation images and a plurality of non-simulation images both associated with a sample under inspection, at least one of the plurality of simulation images being a simulation image of a location on the sample not imaged by any of the plurality of non-simulation images; and training an unsupervised domain adaptation technique using the plurality of simulation images and the plurality of non-simulation images as inputs to reduce a difference between first intensity gradients of the plurality of simulation images and second intensity gradients of the plurality of non-simulation images.

* * * * *